US012634837B2

(12) United States Patent
Huang

(10) Patent No.: US 12,634,837 B2
(45) Date of Patent: May 19, 2026

(54) METHOD AND APPARATUS FOR GENERATING POWER HEADROOM REPORT IN A WIRELESS COMMUNICATION SYSTEM

(71) Applicant: ASUS Technology Licensing Inc., Taipei (TW)

(72) Inventor: Chun-Wei Huang, Taipei (TW)

(73) Assignee: ASUS Technology Licensing Inc., Taipei City (TW)

( * ) Notice: Subject to any disclaimer, the term of this patent is extended or adjusted under 35 U.S.C. 154(b) by 301 days.

(21) Appl. No.: 18/138,768

(22) Filed: Apr. 25, 2023

(65) Prior Publication Data

US 2023/0354215 A1 Nov. 2, 2023

Related U.S. Application Data

(60) Provisional application No. 63/335,240, filed on Apr. 27, 2022.

(51) Int. Cl.
H04W 72/231 (2023.01)
H04L 5/00 (2006.01)
(Continued)

(52) U.S. Cl.
CPC ......... H04W 52/365 (2013.01); H04L 5/0053 (2013.01); H04W 72/1268 (2013.01); H04W 72/232 (2023.01)

(58) Field of Classification Search
CPC ............. H04W 52/365; H04W 72/232; H04W 72/046; H04W 72/231; H04W 72/21
See application file for complete search history.

(56) References Cited

U.S. PATENT DOCUMENTS

2022/0322245 A1 10/2022 Park et al.
2023/0140036 A1* 5/2023 Elshafie ............ H04W 72/1268
370/329
(Continued)

FOREIGN PATENT DOCUMENTS

WO 2022147823 A1 7/2022
WO 2022150611 A1 7/2022
WO 2022203467 A1 9/2022

OTHER PUBLICATIONS

3GPP TSG RAN WG1 Meeting#90bis, R1-1718228 Title:Power control framework for PUSCH (Year: 2017).*
(Continued)

*Primary Examiner* — Faruk Hamza
*Assistant Examiner* — Abusayeed M Haque
(74) *Attorney, Agent, or Firm* — Cooper Legal Group LLC

(57) ABSTRACT

A method and apparatus are disclosed. In an example, a User Equipment (UE) triggers a first Power Headroom Report (PHR). The UE receives one or more uplink grants indicative of a first Physical Uplink Shared Channel (PUSCH) and a second PUSCH on a second serving cell, wherein the first PUSCH at least partially overlaps with the second PUSCH in time domain. The UE selects the first PUSCH, from among the first PUSCH and the second PUSCH, based on one or more first characteristics of the first PUSCH and/or one or more second characteristics of the second PUSCH. The UE determines the first PHR for the second serving cell based on the first PUSCH. The UE transmits a PHR Medium Access Control (MAC) Control Element (CE), include the first PHR, to a network node that configured the UE to report one PHR for one serving cell.

20 Claims, 24 Drawing Sheets

(51) Int. Cl.
  *H04W 52/36*     (2009.01)
  *H04W 72/1268*   (2023.01)
  *H04W 72/21*     (2023.01)
  *H04W 72/232*    (2023.01)

(56) References Cited

U.S. PATENT DOCUMENTS

| | | | | |
|---|---|---|---|---|
| 2023/0239866 A1* | 7/2023 | Elshafie | ................ | H04W 72/20 |
| | | | | 370/329 |
| 2023/0284134 A1* | 9/2023 | Takeda | .............. | H04W 52/0216 |
| | | | | 370/311 |
| 2023/0403702 A1* | 12/2023 | Su | ......................... | H04L 1/1896 |
| 2025/0031155 A1* | 1/2025 | Yuan | ................... | H04W 52/365 |

OTHER PUBLICATIONS

3GPP TSG-RAN WG2 Meeting#106, R2-1906730 Title:Impact fro LBT on power headroom reposting functionality (Year: 2019).*

* cited by examiner

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |
| P | V | PH (Type X, Serving Cell 1) | | | | | |
| MPE or R | | $P_{CMAX,f,c}$ 3 | | | | | |

...

| P | V | PH (Type X, Serving Cell n) | | | | | |
|---|---|---|---|---|---|---|---|
| MPE or R | | $P_{CMAX,f,c}$ m | | | | | |

FIG. 7

| R | Serving Cell ID | | | | | DL BWP ID | | Oct 1 |
|---|---|---|---|---|---|---|---|---|
| R | R | R | R | R | R | UL BWP ID | | Oct 2 |
| $P_1$ | $P_2$ | $P_3$ | $P_4$ | $P_5$ | $P_6$ | $P_7$ | $P_8$ | Oct 3 |
| D/L | TCI state ID 1 | | | | | | | Oct 4 |
| D/L | TCI state ID 2 | | | | | | | Oct 5 |

...

| D/L | TCI state ID N | Oct N+3 |
|---|---|---|

| P | V | PH 1 (Type 1, PCell) | Oct 1 |
|---|---|---|---|
| R | V | PH 2 (Type 1, PCell) | Oct 2 |
| MPE or R | $P_{CMAX,f,c}$ | | Oct 3 |

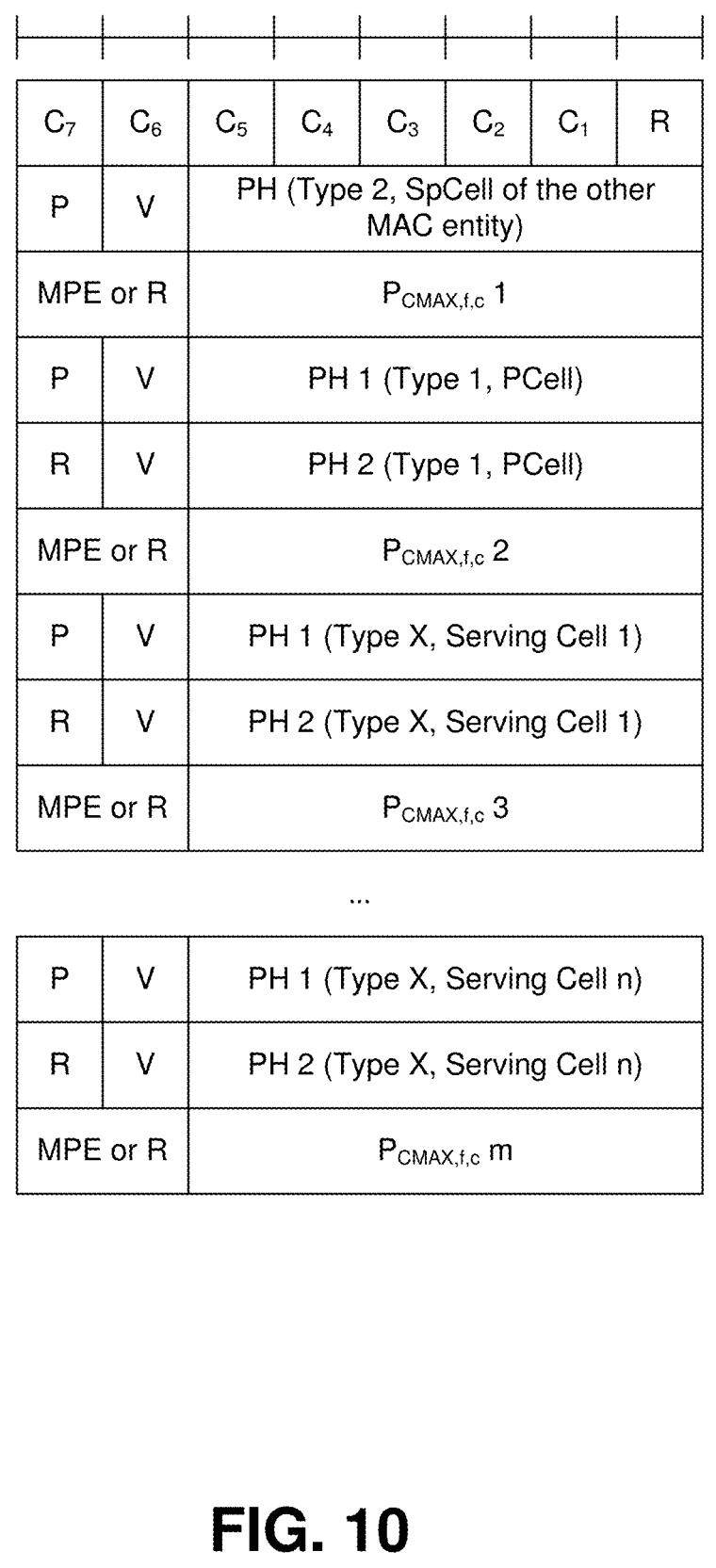

| C₇ | C₆ | C₅ | C₄ | C₃ | C₂ | C₁ | R |
|---|---|---|---|---|---|---|---|

| | | | | | | | |
|---|---|---|---|---|---|---|---|
| P | V | PH (Type 2, SpCell of the other MAC entity) | | | | | |
| MPE or R | | $P_{CMAX,f,c}$ 1 | | | | | |
| P | V | PH 1 (Type 1, PCell) | | | | | |
| R | V | PH 2 (Type 1, PCell) | | | | | |
| MPE or R | | $P_{CMAX,f,c}$ 2 | | | | | |
| P | V | PH 1 (Type X, Serving Cell 1) | | | | | |
| R | V | PH 2 (Type X, Serving Cell 1) | | | | | |
| MPE or R | | $P_{CMAX,f,c}$ 3 | | | | | |

...

| P | V | PH 1 (Type X, Serving Cell n) | | | | | |
|---|---|---|---|---|---|---|---|
| R | V | PH 2 (Type X, Serving Cell n) | | | | | |
| MPE or R | | $P_{CMAX,f,c}$ m | | | | | |

FIG. 10

Figure 11:
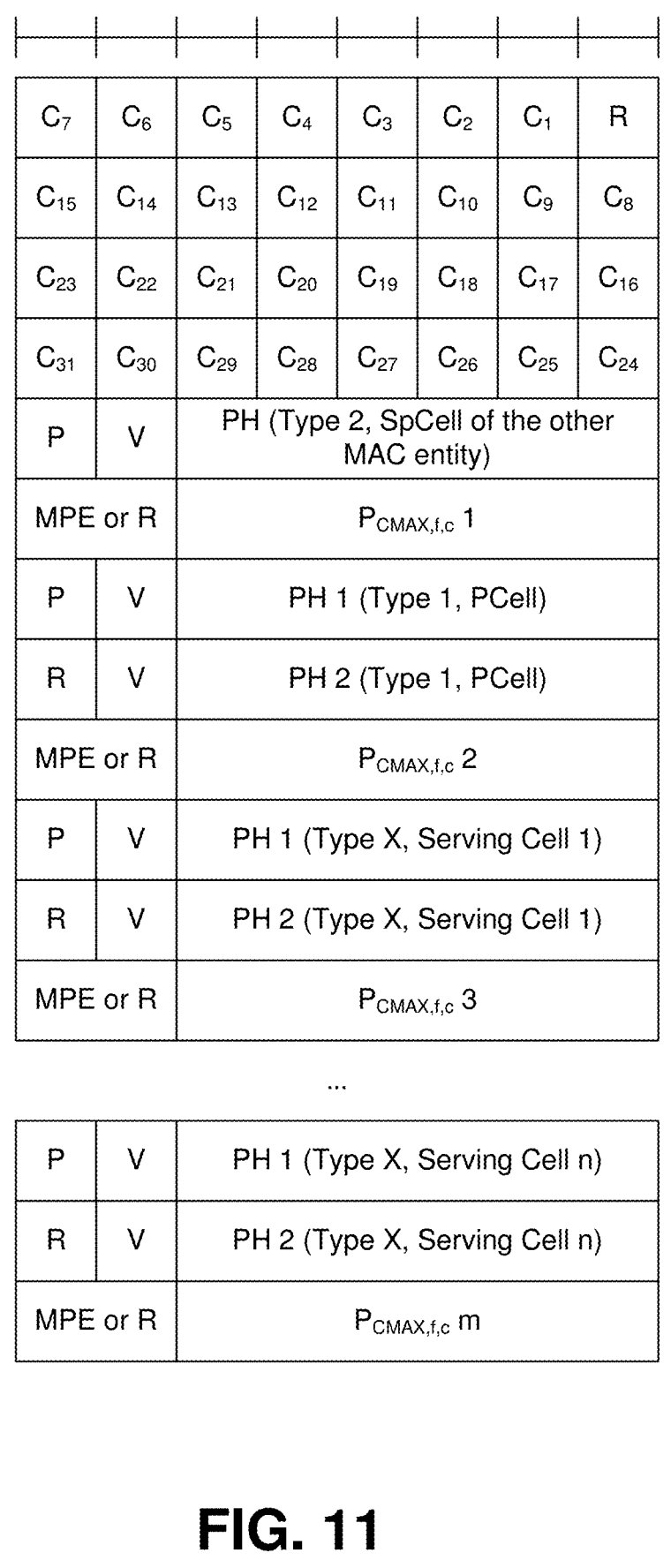

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of the other MAC entity) | | | | | |
| MPE or R | | $P_{CMAX,f,c}$ 1 | | | | | |
| P | V | PH 1 (Type 1, PCell) | | | | | |
| R | V | PH 2 (Type 1, PCell) | | | | | |
| MPE or R | | $P_{CMAX,f,c}$ 2 | | | | | |
| P | V | PH 1 (Type X, Serving Cell 1) | | | | | |
| R | V | PH 2 (Type X, Serving Cell 1) | | | | | |
| MPE or R | | $P_{CMAX,f,c}$ 3 | | | | | |

...

| P | V | PH 1 (Type X, Serving Cell n) |
|---|---|---|
| R | V | PH 2 (Type X, Serving Cell n) |
| MPE or R | | $P_{CMAX,f,c}$ m |

Figure 21:
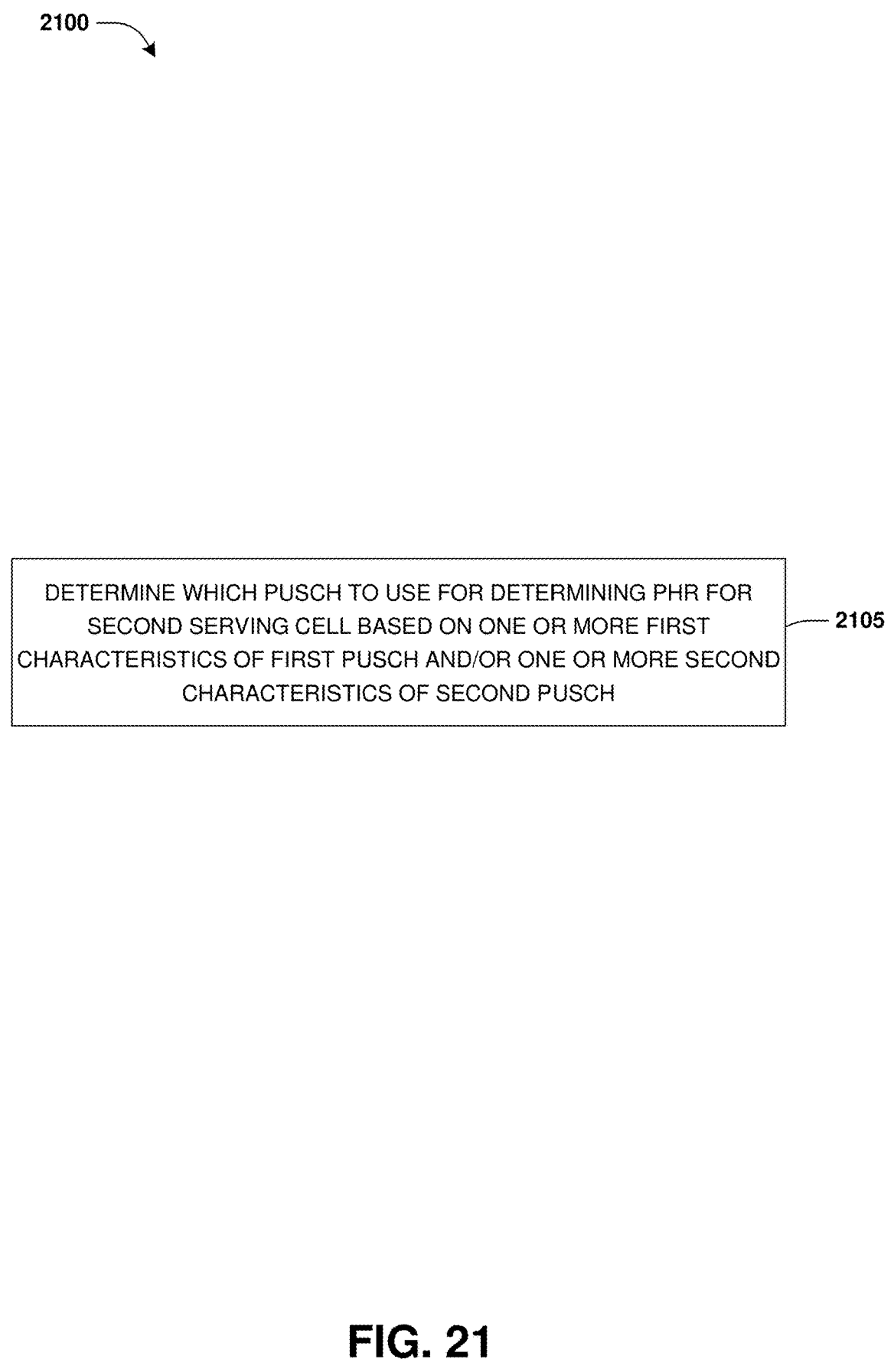

DETERMINE WHICH PUSCH TO USE FOR DETERMINING PHR FOR SECOND SERVING CELL BASED ON ONE OR MORE FIRST CHARACTERISTICS OF FIRST PUSCH AND/OR ONE OR MORE SECOND CHARACTERISTICS OF SECOND PUSCH    — 2105

Figure 22:
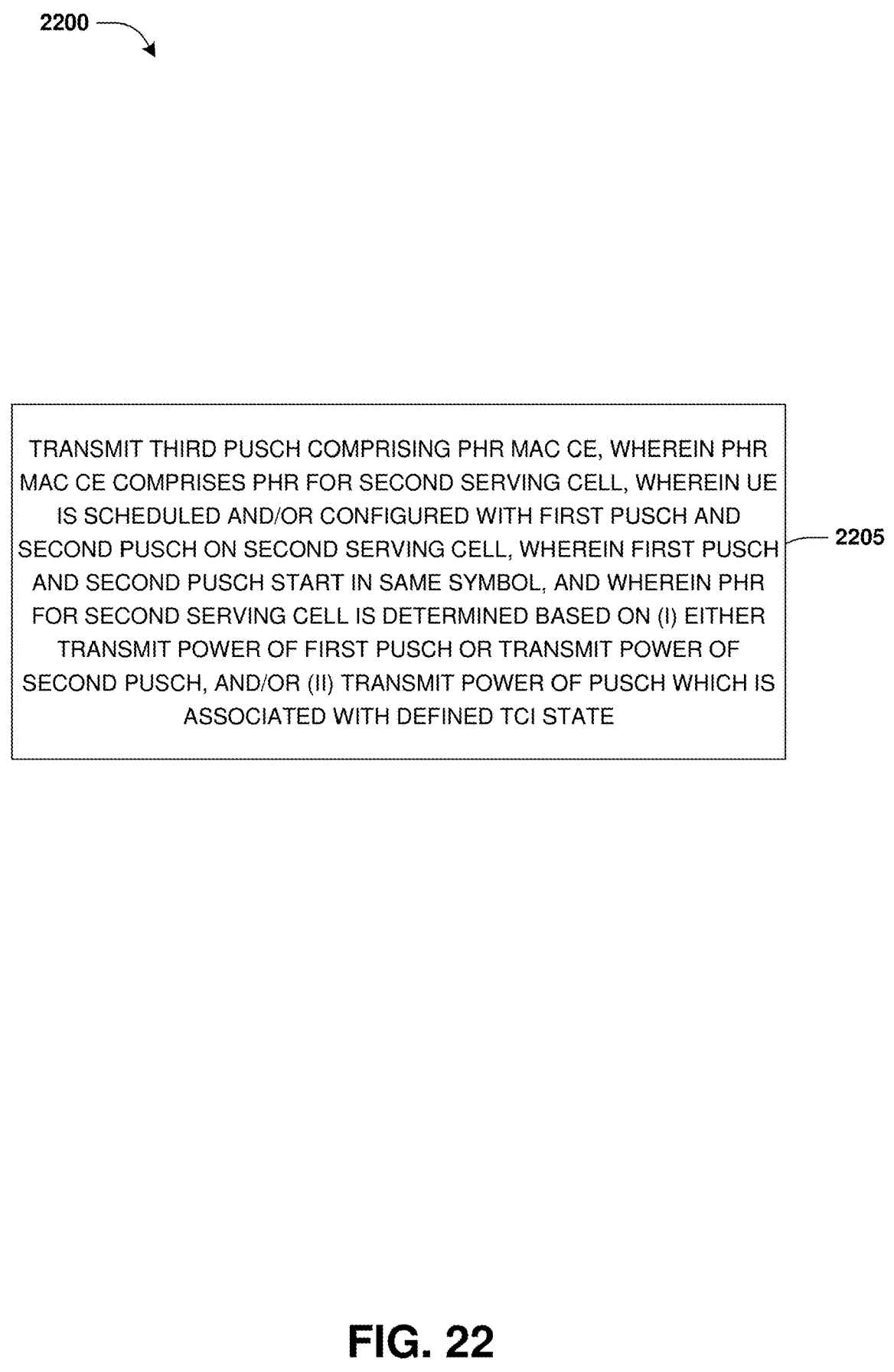

TRANSMIT THIRD PUSCH COMPRISING PHR MAC CE, WHEREIN PHR MAC CE COMPRISES PHR FOR SECOND SERVING CELL, WHEREIN UE IS SCHEDULED AND/OR CONFIGURED WITH FIRST PUSCH AND SECOND PUSCH ON SECOND SERVING CELL, WHEREIN FIRST PUSCH AND SECOND PUSCH START IN SAME SYMBOL, AND WHEREIN PHR FOR SECOND SERVING CELL IS DETERMINED BASED ON (I) EITHER TRANSMIT POWER OF FIRST PUSCH OR TRANSMIT POWER OF SECOND PUSCH, AND/OR (II) TRANSMIT POWER OF PUSCH WHICH IS ASSOCIATED WITH DEFINED TCI STATE

RECEIVE INFORMATION OF CAPABILITY FROM UE, WHEREIN INFORMATION OF CAPABILITY INDICATES UE SUPPORTS CONCURRENT UL TRANSMISSION — 2305

CONFIGURE UE WITH CONCURRENT UL TRANSMISSION ON SECOND SERVING CELL, WHEREIN SECOND SERVING CELL IS CONFIGURED IN SECOND CELL GROUP WITH CONFIGURATION OF REPORTING TWO PHRS FOR ONE SERVING CELL — 2310

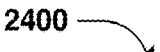

2400

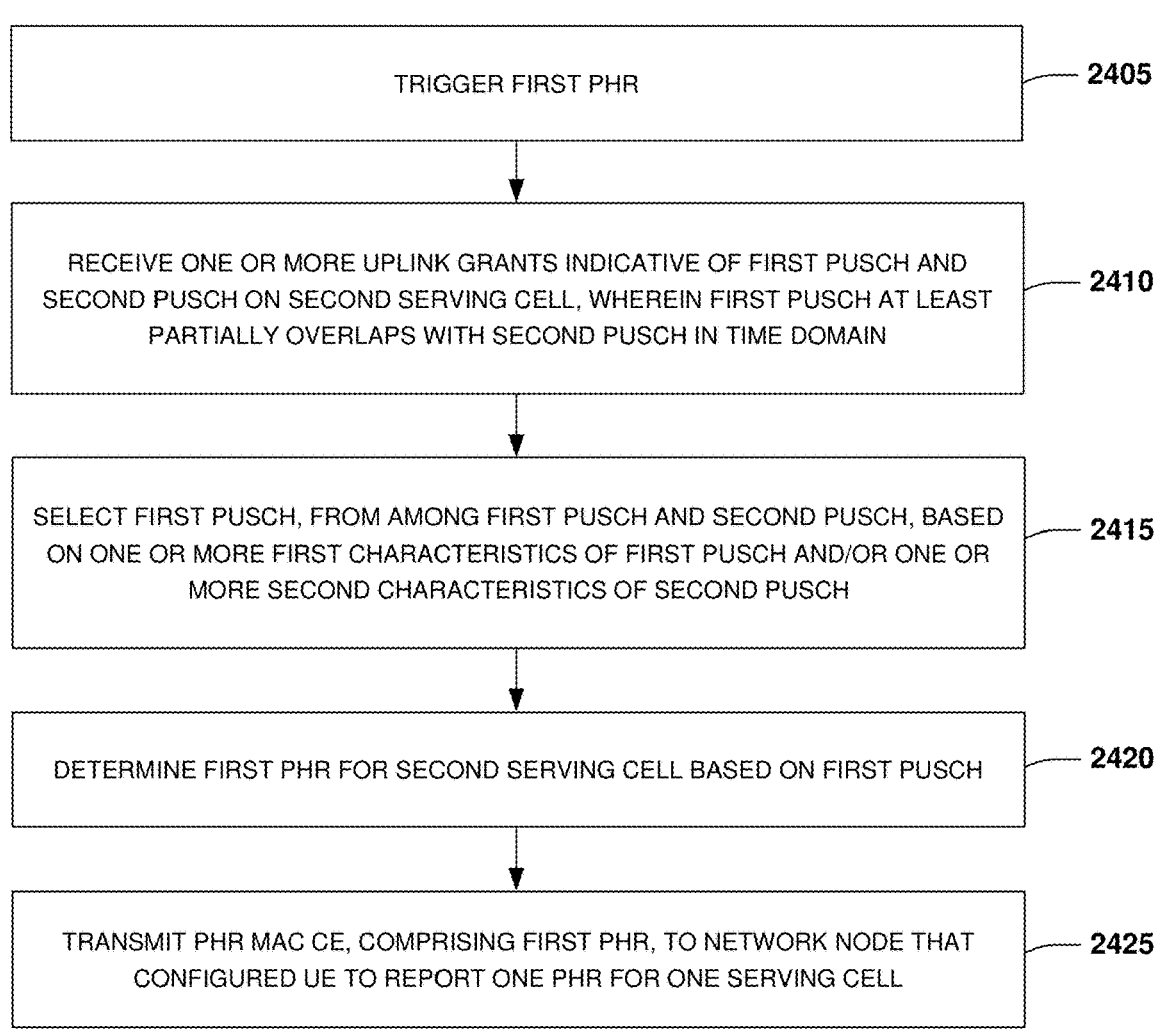

TRIGGER FIRST PHR — 2405

RECEIVE ONE OR MORE UPLINK GRANTS INDICATIVE OF FIRST PUSCH AND SECOND PUSCH ON SECOND SERVING CELL, WHEREIN FIRST PUSCH AT LEAST PARTIALLY OVERLAPS WITH SECOND PUSCH IN TIME DOMAIN — 2410

SELECT FIRST PUSCH, FROM AMONG FIRST PUSCH AND SECOND PUSCH, BASED ON ONE OR MORE FIRST CHARACTERISTICS OF FIRST PUSCH AND/OR ONE OR MORE SECOND CHARACTERISTICS OF SECOND PUSCH — 2415

DETERMINE FIRST PHR FOR SECOND SERVING CELL BASED ON FIRST PUSCH — 2420

TRANSMIT PHR MAC CE, COMPRISING FIRST PHR, TO NETWORK NODE THAT CONFIGURED UE TO REPORT ONE PHR FOR ONE SERVING CELL — 2425

Figure 25:
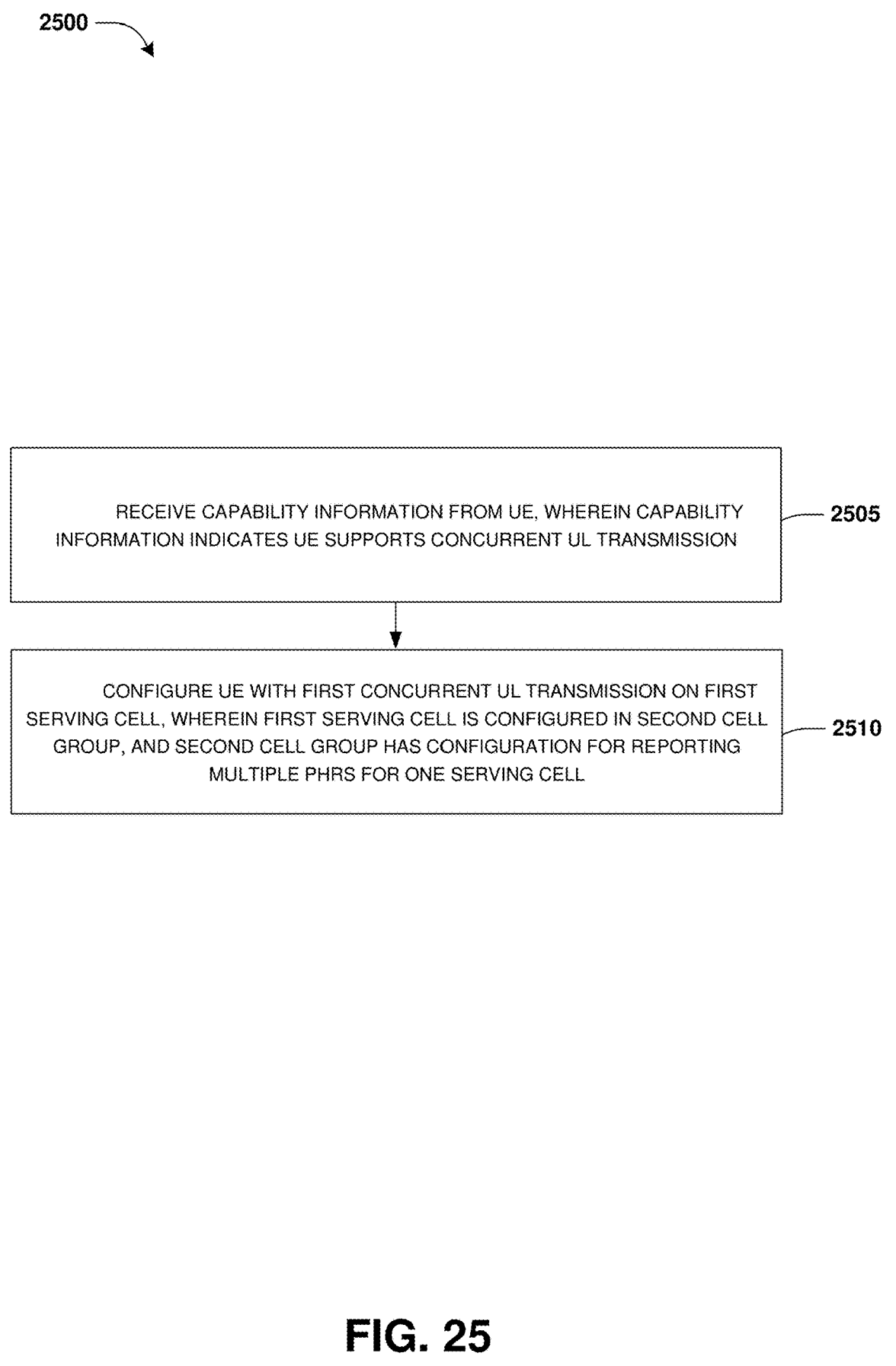

RECEIVE CAPABILITY INFORMATION FROM UE, WHEREIN CAPABILITY INFORMATION INDICATES UE SUPPORTS CONCURRENT UL TRANSMISSION — 2505

CONFIGURE UE WITH FIRST CONCURRENT UL TRANSMISSION ON FIRST SERVING CELL, WHEREIN FIRST SERVING CELL IS CONFIGURED IN SECOND CELL GROUP, AND SECOND CELL GROUP HAS CONFIGURATION FOR REPORTING MULTIPLE PHRS FOR ONE SERVING CELL — 2510

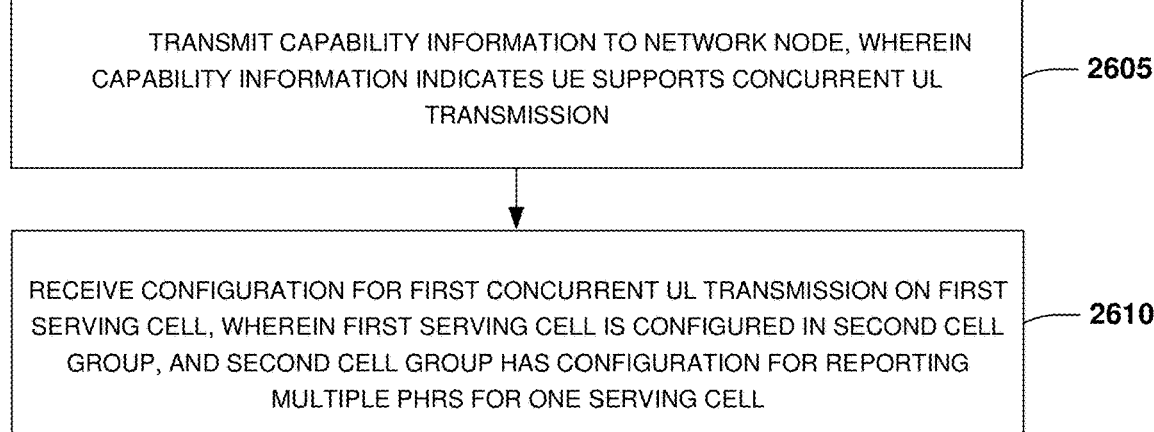

TRANSMIT CAPABILITY INFORMATION TO NETWORK NODE, WHEREIN CAPABILITY INFORMATION INDICATES UE SUPPORTS CONCURRENT UL TRANSMISSION — 2605

RECEIVE CONFIGURATION FOR FIRST CONCURRENT UL TRANSMISSION ON FIRST SERVING CELL, WHEREIN FIRST SERVING CELL IS CONFIGURED IN SECOND CELL GROUP, AND SECOND CELL GROUP HAS CONFIGURATION FOR REPORTING MULTIPLE PHRS FOR ONE SERVING CELL — 2610

FIG. 26

METHOD AND APPARATUS FOR GENERATING POWER HEADROOM REPORT IN A WIRELESS COMMUNICATION SYSTEM

CROSS-REFERENCE TO RELATED APPLICATIONS

The present application claims the benefit of U.S. Provisional Patent Application Ser. No. 63/335,240 filed on Apr. 27, 2022, the entire disclosure of which is incorporated herein in its entirety by reference.

FIELD

This disclosure generally relates to wireless communication networks, and more particularly, to a method and apparatus for generating power headroom report in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE triggers a first Power Headroom Report (PHR). The UE receives one or more uplink grants indicative of a first Physical Uplink Shared Channel (PUSCH) and a second PUSCH on a second serving cell, wherein the first PUSCH at least partially overlaps with the second PUSCH in time domain. The UE selects the first PUSCH, from among the first PUSCH and the second PUSCH, based on one or more first characteristics of the first PUSCH and/or one or more second characteristics of the second PUSCH. The UE determines the first PHR for the second serving cell based on the first PUSCH. The UE transmits a PHR Medium Access Control (MAC) Control Element (CE), comprising the first PHR, to a network node that configured the UE to report one PHR for one serving cell.

In an example from the perspective of a network node, the network node receives a capability information from a UE, wherein the capability information indicates the UE supports concurrent uplink (UL) transmission. The network node configures the UE with a first concurrent UL transmission on a first serving cell. The first serving cell is configured in a second cell group. The second cell group has a configuration for reporting multiple PHRs for one serving cell.

In an example from the perspective of a UE, the UE transmits a capability information to a network node, wherein the capability information indicates the UE supports concurrent UL transmission. The UE receives a configuration for a first concurrent UL transmission on a first serving cell. The first serving cell is configured in a second cell group. The second cell group has a configuration for reporting multiple PHRs for one serving cell.

BRIEF DESCRIPTION OF THE DRAWINGS

FIG. 7 illustrates a multiple entry PHR MAC CE according to one exemplary embodiment.

FIG. 10 illustrates an enhanced multiple entry PHR MAC CE according to one exemplary embodiment.

FIG. 11 illustrates an enhanced multiple entry PHR MAC CE according to one exemplary embodiment.

FIG. 21 is a flow chart according to one exemplary embodiment.

FIG. 22 is a flow chart according to one exemplary embodiment.

FIG. 24 is a flow chart according to one exemplary embodiment.

FIG. 25 is a flow chart according to one exemplary embodiment.

FIG. 26 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.321 V17.0.0 (2022-03) 3rd Generation Partnership Project; Technical Specification Group Radio Access Network; NR; Medium Access Control (MAC) protocol specification (Release 17); 3GPP TS 38.331 V17.0.0 (2022-03) 3rd Generation Partnership Project; Technical Specification Group Radio Access Network; NR; Radio Resource Control (RRC) protocol specification (Release 17); 3GPP TS 38.212 V17.1.0 (2022-03) 3rd Generation Partnership Project; Technical Specification Group Radio Access Network; NR; Multiplexing and channel coding (Release 17); 3GPP TS 38.213 V17.1.0 (2022-03) 3rd Generation Partnership Project; Technical Specification Group Radio Access Network; NR; Physical layer procedures for control (Release 17); 3GPP TS 38.214 V17.1.0 (2022-03) 3rd Generation Partnership Project; Technical Specification Group Radio Access Network; NR; Physical layer procedures for data (Release 17); Final Report of 3GPP TSG RAN WG1 #104-e v1.0.0 (Online meeting, 25 Jan.-5Feb. 2021); R1-2009060, Asia Pacific Telecom; R1-2008573, LG; 3GPP TS 38.101-2 V17.2.0 (2021-06) 3rd Generation Partnership Project; Technical Specification Group Radio Access Network; NR; User Equipment (UE) radio transmission and reception; Part 2: Range 2 Standalone (Release 17); RP-213598, Samsung. The standards and documents listed above are hereby expressly incorporated by reference in their entirety.

Figure 1:
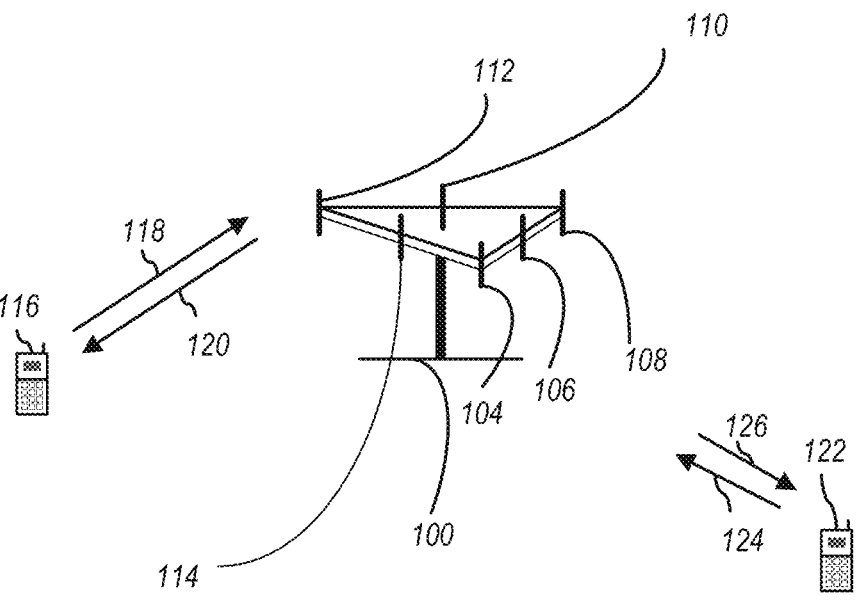
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
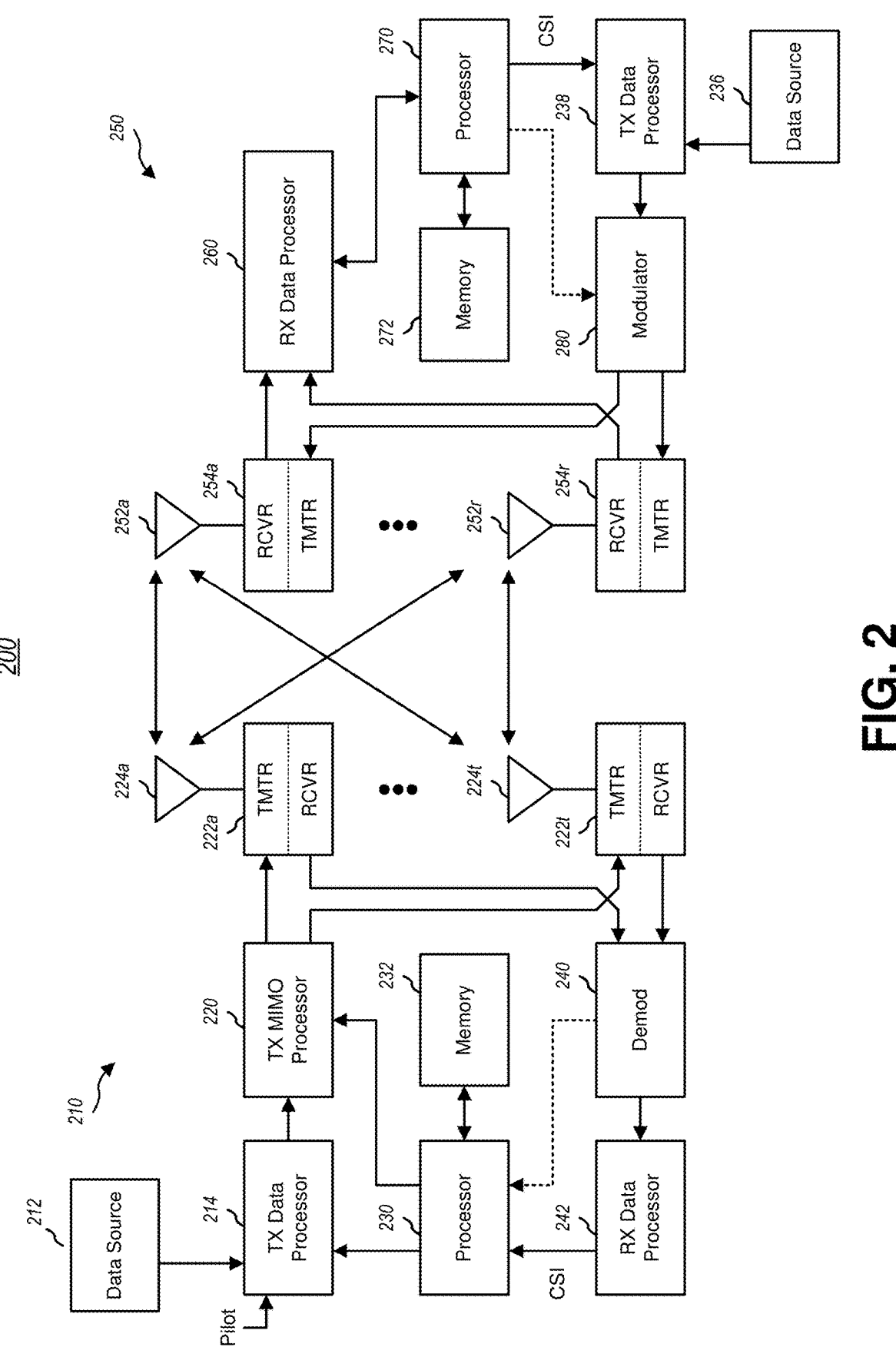
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
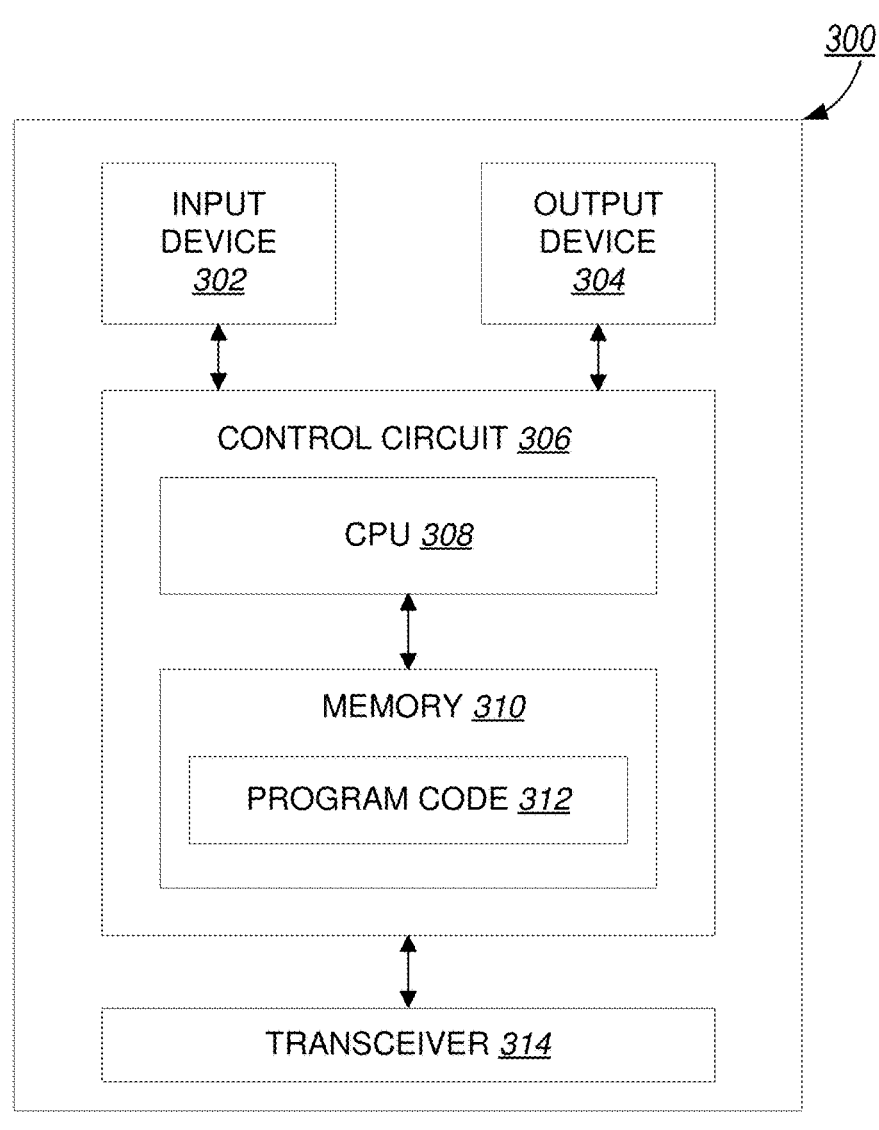
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
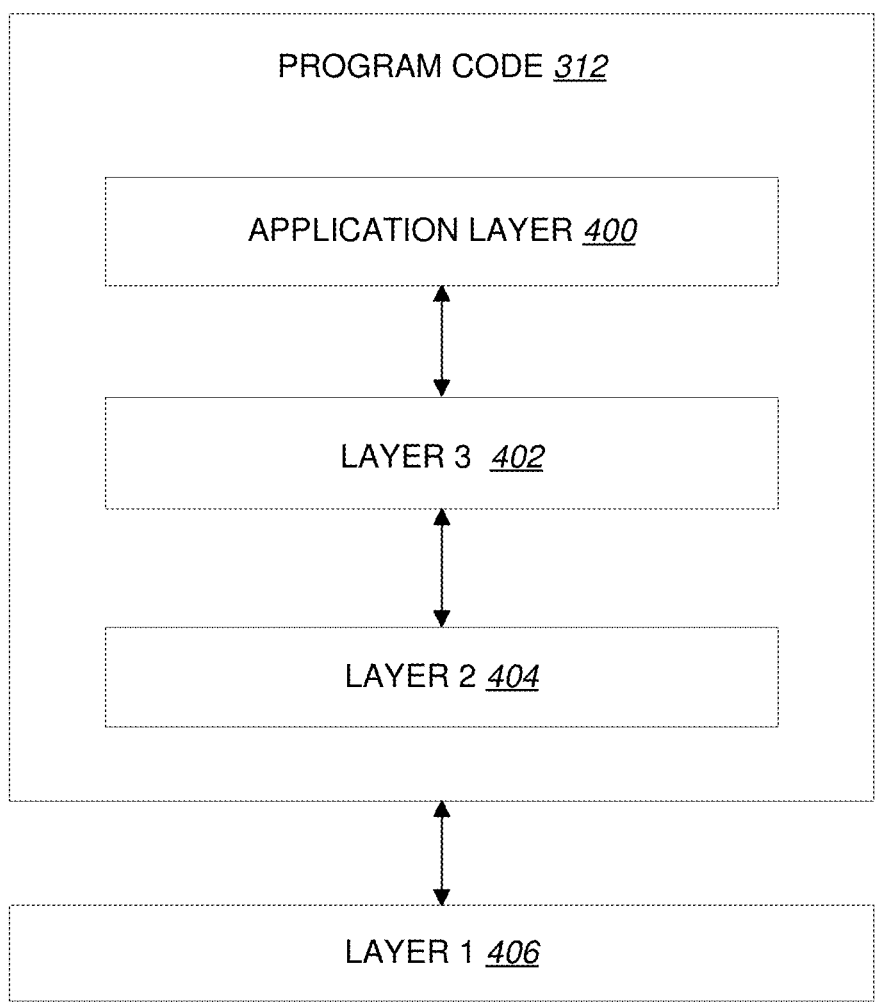
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 5:
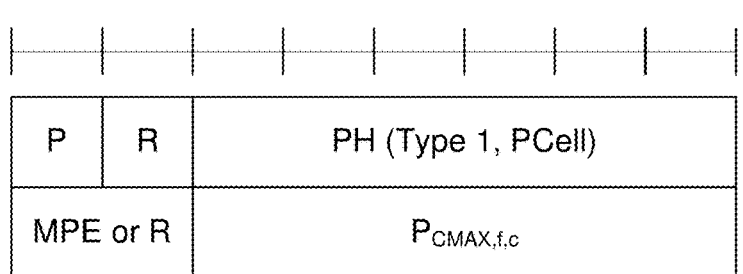
FIG. 5 illustrates a single entry Power Headroom Reporting (PHR) Medium Access Control (MAC) Control Element (CE) according to one exemplary embodiment.
Figure 6:
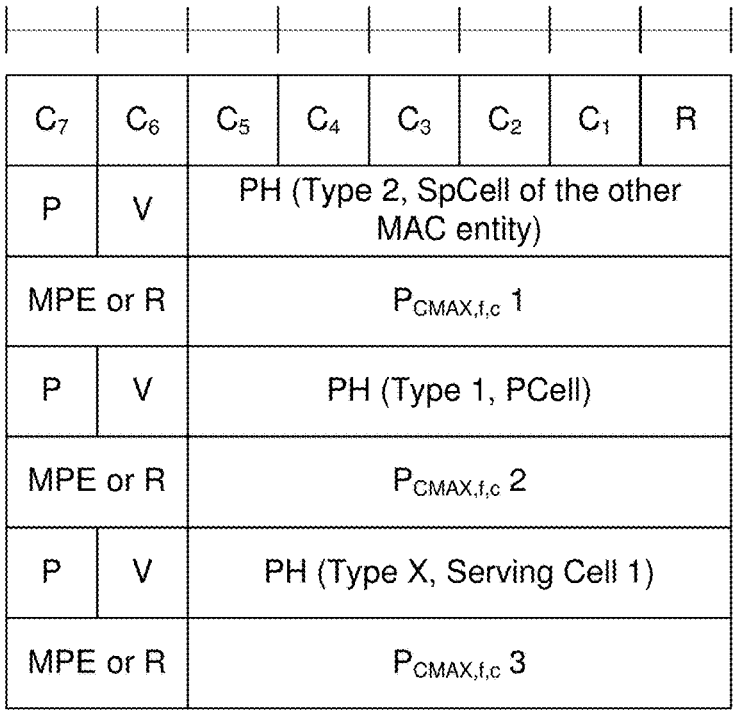
FIG. 6 illustrates a multiple entry PHR MAC CE according to one exemplary embodiment.
Figure 8:
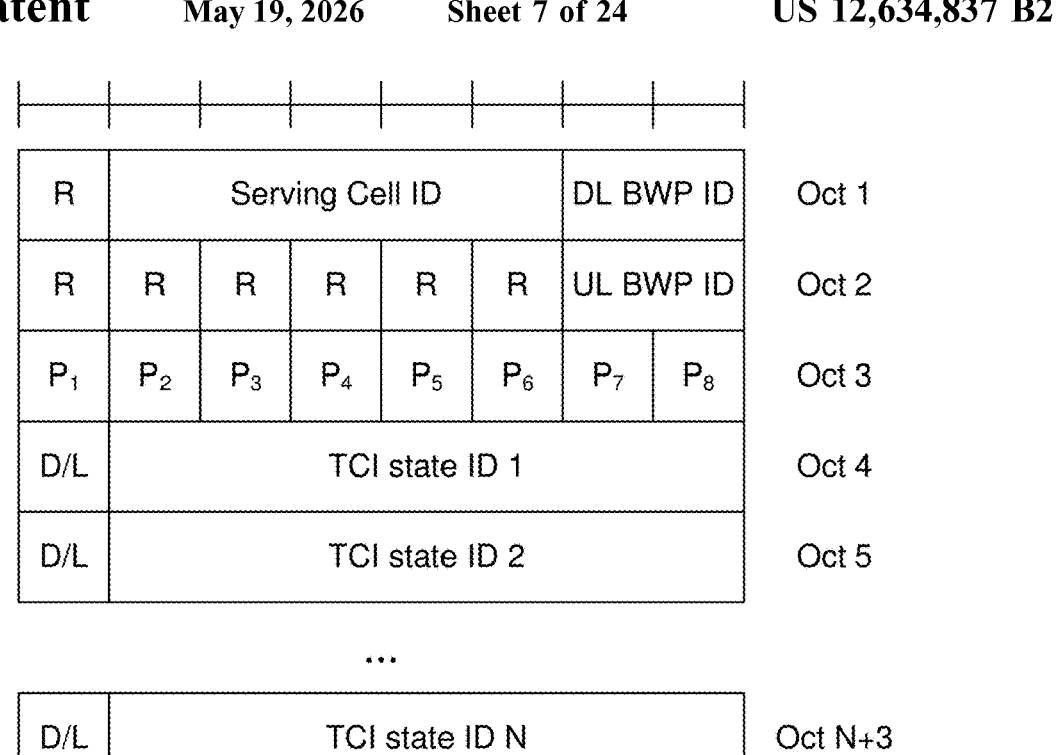
FIG. 8 illustrates a unified Transmission Configuration Indicator (TCI) state activation and/or deactivation MAC CE according to one exemplary embodiment.
Figure 9:
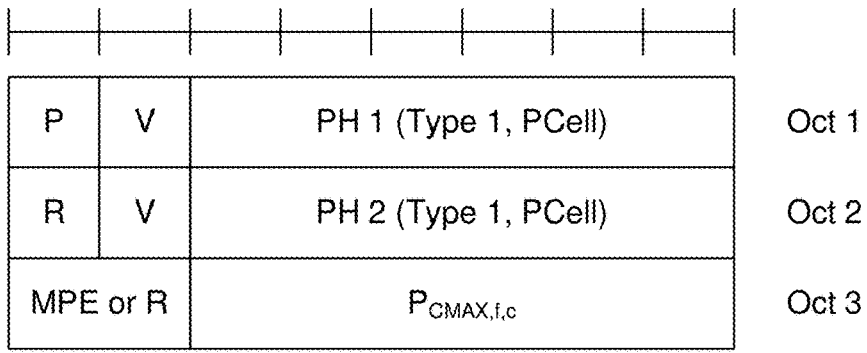
FIG. 9 illustrates an enhanced single entry PHR MAC CE for multiple TRP MAC CE according to one exemplary embodiment.

3GPP TS 38.321 V17.0.0 discusses one or more procedures associated with power headroom reporting and/or Medium Access Control (MAC) Control Element (CE) for unified Transmission Configuration Indicator (TCI) state, and power headroom report (PHR). Notably, FIG. 6.1.3.8-1 of Section 6.1.3.8 of 3GPP TS 38.321 V17.0.0, entitled "Single Entry PHR MAC CE", is reproduced herein as FIG. 5. FIG. 6.1.3.9-1 of Section 6.1.3.9 of 3GPP TS 38.321 V17.0.0, entitled "Multiple Entry PHR MAC CE with the highest ServCellIndex of Serving Cell with configured uplink is less than 8", is reproduced herein as FIG. 6. FIG. 6.1.3.9-2 of Section 6.1.3.9 of 3GPP TS 38.321 V17.0.0, entitled "Multiple Entry PHR MAC CE with the highest ServCellIndex of Serving Cell with configured uplink is equal to or higher than 8", is reproduced herein as FIG. 7. FIG. 6.1.3.47-1 of Section 6.1.3.47 of 3GPP TS 38.321 V17.0.0, entitled "Unified TCI state activation/deactivation MAC CE", is reproduced herein as FIG. 8. FIG. 6.1.3.50-1 of Section 6.1.3.50 of 3GPP TS 38.321 V17.0.0, entitled "Enhanced Single Entry PHR for multiple TRP MAC CE", is reproduced herein as FIG. 9. FIG. 6.1.3.51-1 of Section 6.1.3.51 of 3GPP TS 38.321 V17.0.0, entitled "Enhanced Multiple Entry PHR for multiple TRP MAC CE with the highest ServCellIndex of Serving Cell with configured uplink is less than 8", is reproduced herein as FIG. 10. FIG. 6.1.3.51-2 of Section 6.1.3.51 of 3GPP TS 38.321 V17.0.0, entitled "Enhanced Multiple Entry PHR for multiple TRP MAC CE with the highest ServCellIndex of Serving Cell with configured uplink is equal to or higher than 8", is reproduced herein as FIG. 11. One or more parts of 3GPP TS 38.321 V17.0.0 are quoted below:

5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

. . .

RRC controls Power Headroom reporting by configuring the following parameters:

phr-PeriodicTimer;

phr-ProhibitTimer;

phr-Tx-PowerFactorChange;

phr-Type2OtherCell;

phr-ModeOtherCG;

multiplePHR;

. . .

numberOfN;

. . .

A Power Headroom Report (PHR) shall be triggered if any of the following events occur:

phr-ProhibitTimer expires or has expired and the path loss has changed more than phr-Tx-PowerFactorChange dB for at least one RS used as pathloss reference for one activated Serving Cell of any MAC entity of which the active DL BWP is not dormant BWP since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in TS 38.331 [5].

phr-Periodic Timer expires;

upon configuration or reconfiguration of the power headroom reporting functionality by upper layers, which is not used to disable the function;

activation of an SCell of any MAC entity with configured uplink of which firstActiveDownlinkBWP-Id is not set to dormant BWP;

activation of an SCG;

addition of the PSCell except if the SCG is deactivated (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPRc as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

Upon switching of activated BWP from dormant BWP to non-dormant DL BWP of an SCell of any MAC entity with configured uplink;

. . .

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

If the MAC entity has UL resources allocated for a new transmission the MAC entity shall:

1> if it is the first UL resource allocated for a new transmission since the last MAC reset:

2> start phr-Periodic Timer.

1> if the Power Headroom reporting procedure determines that at least one PHR has been triggered and not cancelled; and 1> if the allocated UL resources can accommodate the MAC CE for PHR which the MAC entity is configured to transmit, plus its subheader, as a result of LCP as defined in clause 5.4.3.1:

2> if multiplePHR with value true is configured:

3> for each activated Serving Cell with configured uplink associated with any MAC entity of which the active DL BWP is not dormant BWP; and 3> for each activated Serving Cell with configured uplink associated with E-UTRA MAC entity:

4> obtain the value of the Type 1 or Type 3 power headroom for the corresponding uplink carrier as specified in clause 7.7 of TS 38.213 [6] for NR Serving Cell and clause 5.1.1.2 of TS 36.213 [17] for E-UTRA Serving Cell;

4> if this MAC entity has UL resources allocated for transmission on this Serving Cell; or 4> if the other MAC entity, if configured, has UL resources allocated for transmission on this Serving Cell and phr-ModeOtherCG is set to real by upper layers:

5> obtain the value for the corresponding $P_{CMAX,f,c}$ field from the physical layer.

5> if mpe-Reporting-FR2 is configured and this Serving Cell operates on FR2 and this Serving Cell is associated to this MAC entity:

6> obtain the value for the corresponding MPE field from the physical layer.

. . .

3> instruct the Multiplexing and Assembly procedure to generate and transmit the Multiple Entry PHR MAC CE as defined in clause 6.1.3.9 based on the values reported by the physical layer.

2> else (i.e. Single Entry PHR format is used):

3> obtain the value of the Type 1 power headroom from the physical layer for the corresponding uplink carrier of the PCell;

3> obtain the value for the corresponding $P_{CMAX,f,c}$ field from the physical layer;

3> if mpe-Reporting-FR2 is configured and this Serving Cell operates on FR2:

4> obtain the value for the corresponding MPE field from the physical layer.

3> instruct the Multiplexing and Assembly procedure to generate and transmit the Single Entry PHR MAC CE as defined in clause 6.1.3.8 based on the values reported by the physical layer.

2> if this PHR report is an MPE P-MPR report:

3> start or restart the mpe-ProhibitTimer;

3> cancel triggered MPE P-MPR reporting for Serving Cells included in the PHR MAC CE.

2> start or restart phr-PeriodicTimer;

2> start or restart phr-ProhibitTimer;

2> cancel all triggered PHR(s).

. . .

6.1.3.8 Single Entry PHR MAC CE

The Single Entry PHR MAC CE is Identified by a MAC Subheader with LCID as Specified in Table 6.2.1-2.

It has a fixed size and consists of two octets defined as follows (6.1.3.8-1):

R: Reserved bit, set to 0;

Power Headroom (PH): This field indicates the power headroom level. The length of the field is 6 bits. The reported PH and the corresponding power headroom levels are shown in Table 6.1.3.8-1 below (the corresponding measured values in dB are specified in TS 38.133 [11]);

. . .

$P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in Table 6.1.3.8-2 (the corresponding measured values in dBm are specified in TS 38.133 [11]);

6.1.3.8-1: Single Entry PHR MAC CE

TABLE 6.1.3.8-1

| Power Headroom levels for PHR | |
| --- | --- |
| PH | Power Headroom Level |
| 0 | POWER_HEADROOM_0 |
| 1 | POWER_HEADROOM_1 |
| 2 | POWER_HEADROOM_2 |
| 3 | POWER_HEADROOM_3 |
| . . . | . . . |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

| Nominal UE transmit power level for PHR | |
| --- | --- |
| $P_{CMAX,f,c}$ | Nominal UE transmit power level |
| 0 | PCMAX_C_00 |
| 1 | PCMAX_C_01 |
| 2 | PCMAX_C_02 |
| . . . | . . . |
| 61 | PCMAX_C_61 |
| 62 | PCMAX_C_62 |
| 63 | PCMAX_C_63 |

TABLE 6.1.3.8-3

| Effective power reduction for MPE P-MPR | |
| --- | --- |
| MPE | Measured P-MPR value |
| 0 | P-MPR_00 |
| 1 | P-MPR_01 |
| 2 | P-MPR_02 |
| 3 | P-MPR_03 |

6.1.3.9 Multiple Entry PHR MAC CE

The Multiple Entry PHR MAC CE is identified by a MAC subheader with LCID as specified in Table 6.2.1-2.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

$C_i$: This field indicates the presence of a PH field for the Serving Cell with ServCellIndex i as specified in TS 38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported;

R: Reserved bit, set to 0;

V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted;

Power Headroom (PH): This field indicates the power headroom level. The length of the field is 6 bits. The reported PH and the corresponding power headroom levels are shown in Table 6.1.3.8-1 (the corresponding measured values in dB for the NR Serving Cell are specified in TS 38.133 [11] while the corresponding measured values in dB for the E-UTRA Serving Cell are specified in TS 36.133 [12]);

. . .

$P_{CMAX,f,c}$: If present, this field indicates the $P_{CMAX,f,c}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in Table 6.1.3.8-2 (the corresponding measured values in dBm for the NR Serving Cell are specified in TS 38.133 [11] while the corresponding measured values in dBm for the E-UTRA Serving Cell are specified in TS 36.133 [12]);

. . .

6.1.3.9-1: Multiple Entry PHR MAC CE with the Highest ServCellIndex of Serving Cell with Configured Uplink is Less than 8

6.1.3.9-2: Multiple Entry PHR MAC CE with the Highest ServCellIndex of Serving Cell with Configured Uplink is Equal to or Higher than 8

6.1.3.47 Unified TCI States Activation/Deactivation MAC CE

The Unified TCI States Activation/Deactivation MAC CE is identified by a MAC subheader with eLCID as specified in Table 6.2.1-1b. It has a variable size consisting of following fields:

Serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331 [5], this MAC CE applies to all the Serving Cells in the set simultaneous U-TCI-UpdateList1, simultaneous U-TCI-UpdateList2, simultaneousU-TCI-UpdateList3 or simultaneousU-TCI-UpdateList4, respectively;

DL BWP ID: This field indicates a DL BWP for which the MAC CE applies as the codepoint of the DCI bandwidth part indicator field as specified in TS 38.212 [9]. The length of the BWP ID field is 2 bits;

UL BWP ID: This field indicates a UL BWP for which the MAC CE applies as the codepoint of the DCI bandwidth part indicator field as specified in TS 38.212 [9]. The length of the BWP ID field is 2 bits;

$P_i$: This field indicates whether each TCI codepoint has multiple TCI states or single TCI state. If $P_i$ field set to 1, it indicates that $i^{th}$ TCI codepoint includes the DL TCI state and the UL TCI state. If $P_i$ field set to 0, it indicates that $i^{th}$ TCI codepoint includes only the DL TCI state or the UL TCI state;

D/U: This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink;

TCI state ID: This field indicates the TCI state identified by TCI-StateId as specified in TS 38.331 [5]. If D/U is set to 1, 7-bits length TCI state ID i.e. TCI-StateId as specified in TS 38.331 [5] is used. If D/U is set to 0, the most significant bit of TCI state ID is considered as the reserved bit and remainder 6 bits indicate the UL-TCIState-Id as specified in TS 38.331 [5]. The maximum number of activated TCI states is 16;

R: Reserved bit, set to 0.

6.1.3.47-1: Unified TCI State Activation/Deactivation MAC CE 6.1.3.50 Enhanced Single Entry PHR for Multiple TRP MAC CE The Enhanced Single Entry PHR for multiple TRP MAC CE is identified by a MAC subheader with eLCID as specified in Table 6.2.1-2b.

The two PHs together with two $P_{CMAX,f,c}$ for the Serving Cell are reported if UE is configured with twoPHRMode with the multiple TRP PUSCH repetition feature is configured.

It has a fixed size and consists of four octets defined as follows (6.1.3.50-1):

R: Reserved bit, set to 0;

Power Headroom i (PH i): This field indicates the power headroom level, where i is the index of the TRP. The length of the field is 6 bits. The reported PH and the corresponding power headroom levels are shown in Table 6.1.3.8-1 below (the corresponding measured values in dB are specified in TS 38.133 [11]);

V: This field indicates if the PH value for the corresponding TRP is based on a real transmission or a reference format. For Type 1 PH, the V field set to 0 indicates real transmission on PUSCH and the V field set to 1 indicates that a PUSCH reference format is used;

$P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in Table 6.1.3.8-2 (the corresponding measured values in dBm are specified in TS 38.133 [11]);

6.1.3.50-1: Enhanced Single Entry PHR for Multiple TRP MAC CE 6.1.3.51 Enhanced Multiple Entry PHR for Multiple TRP MAC CE The Enhanced Multiple Entry PHR for multiple TRP MAC CE is identified by a MAC subheader with eLCID as specified in Table 6.2.1-2b.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The two PHs together with two $P_{CMAX,f,c}$ for the Serving Cell are reported if UE is configured with twoPHRMode with the multiple TRP PUSCH repetition feature is configured.

The Enhanced Multiple Entry PHR for multiple TRP MAC CEs are defined as follows:

$C_i$: This field indicates the presence of a PH field for the Serving Cell with ServCellIndex i as specified in TS 38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported;

R: Reserved bit, set to 0;

V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted;

Power Headroom i (PH i): This field indicates the power headroom level, where i is the index of the TRP. The length of the field is 6 bits. The reported PH and the corresponding power headroom levels are shown in Table 6.1.3.8-1 (the corresponding measured values in dB for the NR Serving Cell are specified in TS 38.133

[11] while the corresponding measured values in dB for the E-UTRA Serving Cell are specified in TS 36.133 [12]);

. . .

$P_{CMAX,f,c}$: If present, this field indicates the $P_{CMAX,f,c}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in Table 6.1.3.8-2 (the corresponding measured values in dBm for the NR Serving Cell are specified in TS 38.133 [11] while the corresponding measured values in dBm for the E-UTRA Serving Cell are specified in TS 36.133 [12]);

6.1.3.51-1: Enhanced Multiple Entry PHR for Multiple TRP MAC CE with the Highest ServCellIndex of Serving Cell with Configured Uplink is Less than 8

6.1.3.51-2: Enhanced Multiple Entry PHR for Multiple TRP MAC CE with the Highest ServCellIndex of Serving Cell with Configured Uplink is Equal to or Higher than 8

3GPP TS 38.331 V17.0.0 discusses Radio Resource Control (RRC) configuration. One or more parts of 3GPP TS 38.331 V17.0.0 are quoted below:

BWP-UplinkDedicated

The IE BWP-UplinkDedicated is used to configure the dedicated (UE specific) parameters of an uplink BWP.

| BWP-UplinkDedicated information element |
| --- |

```
-- ASN1START
-- TAG-BWP-UPLINKDEDICATED-START
BWP-UplinkDedicated ::=                    SEQUENCE {
    pucch-Config                               SetupRelease { PUCCH-Config }
OPTIONAL,   -- Need M
    pusch-Config                               SetupRelease { PUSCH-Config }
OPTIONAL,   -- Need M
    configuredGrantConfig                      SetupRelease {
ConfiguredGrantConfig }                                     OPTIONAL,   -
- Need M
    srs-Config                                 SetupRelease { SRS-Config }
OPTIONAL,   -- Need M
    pucch-ConfigurationList-r16                SetupRelease { PUCCH-
ConfigurationList-r16 }                                    OPTIONAL,   -- Need
M
    ul-TCIState                                CHOICE {
        lists                                      SEQUENCE {
            ul-TCIState-ToAddModList-r17               SEQUENCE (SIZE
(1..maxULTCI-r17)) OF UL-TCIState-r17                      OPTIONAL,   -- Need N
            ul-TCIState-ToReleaseList-r17              SEQUENCE (SIZE
(1..maxULTCI-r17)) OF UL-TCIState-Id-r17                   OPTIONAL    -- Need N
        },
        refUnifiedTCIStateList-r17                 RefUnifiedTCIStateList-r17
    }
OPTIONAL,   -- Need R
    ul-powerControl-r17                        Uplink-powerControlId-r17
OPTIONAL,   -- Need R
    ]]
}
``` ul-powerControl
Configures power control parameters for PUCCH, PUSCH and SRS when
UE is configured with unifiedtci-StateType. The field is present
here only if UL power control is not configured for any UL TCI
state and DLorJoint-TCIState.
ul-TCIState-ToAddModList
Indicates a lits of UL TCI states for PUCCH, PUSCH and SRS
when UE is configured with unified TCI state operation as
specified in TS 38.xxx CellGroupConfig
The CellGroupConfig IE is used to configure a master cell
group (MCG) or secondary cell group (SCG). A cell group
comprises of one MAC entity, a set of logical channels with
associated RLC entities and of a primary cell (SpCell) and
one or more secondary cells (SCells).

```
CellGroupConfig ::=              SEQUENCE {
...
mac-CellGroupConfig             MAC-CellGroupConfig
OPTIONAL,   -- Need M
physicalCellGroupConfig         PhysicalCellGroupConfig
OPTIONAL,   -- Need M
...
SpCellConfig ::=                SEQUENCE {
    servCellIndex               ServCellIndex
OPTIONAL,   -- Cond SCG
    reconfigurationWithSync     ReconfigurationWithSync
OPTIONAL,   -- Cond ReconfWithSync
    spCellConfigDedicated       ServingCellConfig
OPTIONAL,   -- Need M
    ...,
}
SCellConfig ::=                SEQUENCE {
    sCellIndex                 SCellIndex,
    sCellConfigCommon          ServingCellConfigCommon
OPTIONAL,   -- Cond SCellAdd
    sCellConfigDedicated       ServingCellConfig
OPTIONAL,   -- Cond SCellAddMod
    sCellState-r16             ENUMERATED {activated}
OPTIONAL,   -- Cond SCellAddSync
    ]]
}
```

ServCellIndex
The IE ServCellIndex concerns a short identity, used to
uniquely identify a serving cell (i.e. the PCell, the PSCell or
an SCell) across the cell groups. Value 0 applies for the
PCell, while the SCellindex that has previously been
assigned applies for SCells.

| ServCellIndex information element |
| --- |
| -- ASN1START |
| -- TAG-SERVCELLINDEX-START |

-continued

| ServCellIndex information element |
| --- |
| ServCellIndex ::=        INTEGER (0..maxNrofServingCells-1) |
| -- TAG-SERVCELLINDEX-STOP |
| -- ASN1STOP |

Note: For carrier aggregation, there could be up to 16
serving cells including PCell. For dual connectivity, there
could be up to 32 serving cells.
MAC-CellGroupConfig
The IE MAC-CellGroupConfig is used to configure MAC
parameters for a cell group, including DRX.

```
MAC-CellGroupConfig information element

-- ASN1START
-- TAG-MAC-CELLGROUPCONFIG-START
MAC-CellGroupConfig ::=     SEQUENCE {
    drx-Config              SetupRelease { DRX-Config }
OPTIONAL,   -- Need M
    schedulingRequestConfig  SchedulingRequestConfig
OPTIONAL,   -- Need M
    bsr-Config              BSR-Config
OPTIONAL,   -- Need M
    tag-Config              TAG-Config
OPTIONAL,   -- Need M
    phr-Config              SetupRelease { PHR-Config }
OPTIONAL,   -- Need M
```

PHR-Config
The IE PHR-Config is used to configure parameters for
power headroom reporting.

```
PHR-Config information element

-- ASN1START
-- TAG-PHR-CONFIG-START
PHR-Config ::=              SEQUENCE {
    phr-PeriodicTimer       ENUMERATED {sf10, sf20, sf50,
sf100, sf200, sf500, sf1000, infinity},
    phr-ProhibitTimer       ENUMERATED {sf0, sf10, sf20,
sf50, sf100,sf200, sf500, sf1000},
    phr-Tx-PowerFactorChange  ENUMERATED {dB1, dB3, dB6,
infinity},
    multiplePHR             BOOLEAN,
    ...,
    [[
    twoPHRMode-r17          ENUMERATED {enabled}
OPTIONAL    -- Need R
    ]]
}
-- TAG-PHR-CONFIG-STOP
-- ASN1STOP
```

| PHR-Config field descriptions |
| --- |
| multiplePHR |
| Indicates if power headroom shall be reported using the Single Entry PHR MAC control |
| element or Multiple Entry PHR MAC control element defined in TS 38.321 [3]. True means to |
| use Multiple Entry PHR MAC control element and False means to use the Single Entry PHR |
| MAC control element defined in TS 38.321 [3]. The network configures this field to true for |
| MR-DC and UL CA for NR, and to false in all other cases. |
| phr-Periodic Timer |
| Value in number of subframes for PHR reporting as specified in TS 38.321 [3]. Value sf10 |
| corresponds to 10 subframes, value sf20 corresponds to 20 subframes, and so on. |
| phr-ProhibitTimer |
| Value in number of subframes for PHR reporting as specified in TS 38.321 [3]. Value sf0 |
| corresponds to 0 subframe, value sf10 corresponds to 10 subframes, value sf20 corresponds |
| to 20 subframes, and so on. |

-continued

---

PHR-Config field descriptions

--- phr-Tx-PowerFactorChange
Value in dB for PHR reporting as specified in TS 38.321 [3]. Value dB1 corresponds to 1 dB,
dB3 corresponds to 3 dB and so on. The same value applies for each serving cell (although
the associated functionality is performed independently for each cell).
twoPHRMode
Indicates if the power headroom shall be reported as two PHRs (each PHR associated with a
SRS resource set) is enabled or not.

---

ControlResourceSet
The IE ControlResourceSet is used to configure a time/
frequency control resource set (CORESET) in which to
search for downlink control information (see TS 38.213 [15]
[13], clause 10.1).

---

ControlResourceSet information element

---

```
-- ASN1START
-- TAG-CONTROLRESOURCESET-START
ControlResourceSet ::=              SEQUENCE {
    controlResourceSetId            ControlResourceSetId,
    frequencyDomainResources        BIT STRING (SIZE (45)),
    duration                        INTEGER
(1..maxCoReSetDuration),
    tci-StatesPDCCH-ToAddList         SEQUENCE(SIZE (1..maxNrofTCI-
StatesPDCCH)) OF TCI-StateId OPTIONAL, -- Cond NotSIB1-initialBWP
    tci-StatesPDCCH-ToReleaseList     SEQUENCE(SIZE (1..maxNrofTCI-
StatesPDCCH)) OF TCI-StateId OPTIONAL, -- Cond NotSIB1-initialBWP
    tci-PresentInDCI                  ENUMERATED {enabled}
OPTIONAL,   -- Need S
    tci-PresentDCI-1-2-r16            INTEGER (1..3)
OPTIONAL,   -- Need S
    coresetPoolIndex-r16              INTEGER (0..1)
OPTIONAL,   -- Need S
    controlResourceSetId-v1610        ControlResourceSetId-v1610
OPTIONAL    -- Need S
    ]],
    [[
    followUnifiedTCIstate-r17         ENUMERATED {enabled}
OPTIONAL    -- Need R
    ]]
}
-- TAG-CONTROLRESOURCESET-STOP
-- ASN1STOP
```

---

ControlResourceSet field descriptions

---

. . .
controlResourceSetId
Identifies the instance of the ControlResourceSet IE. Value 0 identifies the common
CORESET configured in MIB and in ServingCellConfigCommon (controlResourceSetZero)
and is hence not used here in the ControlResourceSet IE. Other values identify CORESETs
configured by dedicated signalling or in SIB1. The controlResourceSetId is unique among the
BWPs of a serving cell.
If the field controlResourceSetId-v1610 is present, the UE shall ignore the
controlResourceSetId field (without suffix).
coresetPoolIndex
The index of the CORESET pool for this CORESET as specified in TS 38.213 [13] (clauses 9
and 10) and TS 38.214 [19] (clauses 5.1 and 6.1). If the field is absent, the UE applies the
value 0.
duration
Contiguous time duration of the CORESET in number of symbols (see TS 38.211 [16], clause
7.3.2.2).
followUnifiedTCIstate
When set to enabled, for PDCCH reception on this CORESET, the UE applies the "indicated"
Rel-17 DL only or joint TCI as specified in TS 38.214 clause 5.1.5.
. . .
tci-PresentInDCI
This field indicates if TCI field is present or absent in DCI format 1_1. When the field is absent -continued

| ControlResourceSet field descriptions |
|---| the UE considers the TCI to be absent/disabled. In case of cross carrier scheduling, the
network sets this field to enabled for the ControlResourceSet used for cross carrier
scheduling in DCI format 1_1 in the scheduling cell if enableDefaultBeamForCCS is not
configured (see TS 38.214 [19], clause 5.1.5).
tci-StatesPDCCH-ToAddList
A subset of the TCI states defined in pdsch-Config included in the BWP-DownlinkDedicated
corresponding to the serving cell and to the DL BWP to which the ControlResourceSet belong
to. They are used for providing QCL relationships between the DL RS(s) in one RS Set (TCI-
State) and the PDCCH DMRS ports (see TS 38.213 [13], clause 6.). The network configures
at most maxNrofTCI-StatesPDCCH entries.

PUSCH-PowerControl                                              15
The IE PUSCH-PowerControl is used to configure UE
specific power control parameter for PUSCH.

| PUSCH-PowerControl information element |
|---|

```
-- ASN1START
-- TAG-PUSCH-POWERCONTROL-START
PUSCH-PowerControl ::=                   SEQUENCE {
   tpc-Accumulation                        ENUMERATED { disabled }
OPTIONAL,    -- Need S
   msg3-Alpha                              Alpha
OPTIONAL,    -- Need S
   p0-NomainalWithoutGrant                 INTEGER (–202..24)
OPTIONAL,    -- Need M
   p0-AlphaSets                            SEQUENCE (SIZE (1..maxNrofP0-
PUSCH-AlphaSets)) OF P0-PUSCH-AlphaSet        OPTIONAL,    -- Need M
   pathlossReferneceRSToAddModList         SEQUENCE (SIZE
(1..maxNrofPUSCH-PathlossReferenceRSs))      OF PUSCH-PathlossReferenceRS
OPTIONAL,    -- Need N
   pathlossReferenceRSToReleaseList        SEQUENCE (SIZE
(1..maxNrofPUSCH-PathlossReferenceRSs))      OF PUSCH-PathlossReferenceRS-
Id
OPTIONAL,    -- Need N
   twoPUSCH-PC-AdjustmentStates            ENUMERATED {twoStates}
OPTIONAL,    -- Need S
   deltaMCS                                ENUMERATED {enabled}
OPTIONAL,    -- Need S
   sri-PUSCH-MappingToAddModList           SEQUENCE (SIZE (1..maxNrofSRI-
PUSCH-Mappings)) OF SRI-PUSCH-PowerControl
OPTIONAL,    -- Need N
   sri-PUSCH-MappingToReleaseList          SEQUENCE (SIZE (1..maxNrofSRI-
PUSCH-Mappings)) OF SRI-PUSCH-PowerControlId
OPTIONAL    -- Need N
}
P0-PUSCH-AlphaSet ::=                    SEQUENCE {
   p0-PUSCH-AlphaSetId                     P0-PUSCH-AlphaSetId,
   p0                                      INTEGER (–16..15)
OPTIONAL,    -- Need S
   alpha                                   Alpha
OPTIONAL    -- Need S
}
P0-PUSCH-AlphaSetId ::=                  INTEGER (0..maxNrofP0-PUSCH-
AlphaSets-1)
PUSCH-PathlossReferenceRS ::=            SEQUENCE {
   pusch-PathlossReferenceRS-Id            PUSCH-PathlossReferenceRS-Id,
   referenceSignal                         CHOICE {
      ssb-Index                               SSB-Index,
      csi-RS-Index                            NZP-CSI-RS-ResourceId
   }
}
PUSCH-PathlossReferenceRS-r16 ::=        SEQUENCE {
   pusch-PathlossReferenceRS-Id-r16        PUSCH-PathlossReferenceRS-Id-
v1610,
   referenceSignal-r16                     CHOICE {
      ssb-Index-r16                           SSB-Index,
      csi-RS-Index-r16                        NZP-CSI-RS-ResourceId
   }
}
PUSCH-PathlossReferenceRS-Id ::=         INTEGER (0..maxNrofPUSCH-
PathlossReferenceRSs-1)
PUSCH-PathlossReferenceRS-Id-v1610 ::= INTEGER (maxNrofPUSCH-
PathlossReferenceRSs..maxNrofPUSCH-PathlossReferenceRSs-1-r16)
```

-continued

| PUSCH-PowerControl information element |
|---|

```
SRI-PUSCH-PowerControl ::=              SEQUENCE {
   sri-PUSCH-PowerControlId              SRI-PUSCH-PowerControlId,
   sri-PUSCH-PathlossReferenceRS-Id      PUSCH-PathlossRefrenceRS-Id,
   sri-P0-PUSCH-AlphaSetId               P0-PUSCH-AlphaSetId,
   sri-PUSCH-ClosedLoopIndex             ENUMERATED { i0, i1 }
}
SRI-PUSCH-PowerControlId ::=            INTEGER (0..maxNrofSRI-PUSCH-
Mappings-1)
PUSCH-PowerControl-v1610 ::=            SEQUENCE {
   pathlossReferenceRSToAddModListSizeExt-v1610  SEQUENCE (SIZE
(1..maxNrofPUSCH-PathlossReferenceRSsDiff-r16)) OF PUSCH-
PathlossReferenceRS-r16
OPTIONAL,   -- Need N
   pathlossReferenceRSToReleaseListSizeExt-v1610  SEQUENCE (SIZE
(1..maxNrofPUSCH-PathlossReferenceRSsDiff-r16)) OF PUSCH-
PathlossReferenceRS-Id-v1610
OPTIONAL,   -- Need N
   p0-PUSCH-SetList-r16                  SEQUENCE (SIZE (1..maxNrofSRI-
PUSCH-Mappings)) OF P0-PUSCH-Set-r16    OPTIONAL,   -- Need R
      olpc-ParamterSet                   SEQUENCE {
         olpc-ParameterSetDCI-0-1-r16          INTEGER (1..2)
OPTIONAL,   -- Need R
         olpc-ParameterSetDCI-0-2-r16          INTEGER (1..2)
OPTIONAL    -- Need R
      }
OPTIONAL,   -- Need M
      ...,
      [[
      sri-PUSCH-MappingToAddModList2-r17       SEQUENCE (SIZE (1..maxNrofSRI-
PUSCH-Mappings)) OF SRI-PUSCH-PowerControl
OPTIONAL,    -- Need N
      p0-PUSCH-Set-List2-17              SEQUENCE (SIZE (1..maxNrofSRI-
PUSCH-Mappings)) OF P0-PUSCH-Set-r16    OPTIONAL    -- Need R
      ]]
}
P0-PUSCH-Set-r16 ::=                    SEQUENCE {
   p0-PUSCH-SetId-r16                    P0-PUSCH-Set-Id-r16,
   p0-List-r16                          SEQUENCE (SIZE (1..maxNrofP0-
PUSCH-Set-r16)) OF P0-PUSCH-r16         OPTIONAL,   -- Need R
   ...
}
P0-PUSCH-SetId-r16 ::=                  INTEGER (0..maxNrofSRI-PUSCH-
Mappings-1)
P0-PUSCH-r16 ::=                        INTEGER (-16..15)
-- TAG-PUSCH-POWERCONTROL-STOP
-- ASN1STOP
```

| P0-PUSCH-AlphaSet field descriptions |
|---| alpha
alpha value for PUSCH with grant (except msg3) (see TS 38.213 [13],
clause 7.1). When the field is absent the UE applies the value 1.
p0
P0 value for PUSCH with grant (except msg3) in steps of 1 dB (see TS
38.213 [13], clause 7.1). When the field is absent the UE applies the
value 0.

| P0-PUSCH-Set field descriptions |
|---| p0-List
Configuration of {p0-PUSCH, p0-PUSCH} sets for PUSCH. If SRI is present in the DCI, then
one p0-PUSCH can be configured in P0-PUSCH-Set. If SRI is not present in the DCI, and
both olpc-ParameterSetDCI-0-1 and olpc-ParameterSetDCI-0-2 are configured to be 1 bit,
then one p0-PUSCH can be configured in P0-PUSCH-Set. If SRI is not present in the DCI,
and if any of olpc-ParameterSetDCI-0-1 and olpc-ParameterSetDCI-0-2 is configured to be 2
bits, then two p0-PUSCH values can be configured in P0-PUSCH-Set (see TS 38.213 [13]
clause 7 and TS 38.212 [17] clause 7.3.1).
p0-PUSCH-SetId
Configure the index of a p0-PUSCH-Set (see TS 38.213 [13] clause 7 and TS 38.212 [17]
clause 7.3.1).

PUSCH-PowerControl field descriptions olpc-ParameterSetDCI-0-1, olpc-ParameterSetDCI-0-2
Configures the number of bits for Open-loop power control parameter set indication for DCI
format 0_1/0_2 in case SRI is not configured in the DCI. 2 bits is applicable only if SRI is not
present in the DCI format 0_1. The field olpc-ParameterSetDCI-0-1 applies to DCI format 0_1
and the field olpc-ParameterSetDCI-0-2 applies to DCI format 0_2 (see TS 38.212 [17],
clause 7.3.1 and TS 38.213 [13], clause 11).
p0-AlphaSets
configuration {p0-pusch, alpha} sets for PUSCH (except msg3 and msgA PUSCH), i.e., {
{p0, alpha, index1}, {p0, alpha, index2}, . . .} (see TS 38.213 [13], clause 7.1). When no set is
configured, the UE uses the P0-nominal for msg3 PUSCH, P0-UE is set to 0 and alpha is set
according to msg3-Alpha configured for msg3 PUSCH.
p0-NominalWithoutGrant
P0 value for UL grant-free/SPS based PUSCH. Value in dBm. Only even values (step size 2)
allowed (see TS 38.213 [13], clause 7.1).
p0-PUSCH-SetList
Configure one additional P0-PUSCH-Set per SRI. If present, the one bit or 2 bits in the DCI is
used to dynamically indicate among the P0 value from the existing P0-PUSCH-AlphaSet and
the P0 value(s) from the P0-PUSCH-Set (See TS 38.212 [17], clause 7.3.1 and TS 38.213
[13], clause 17).
p0-PUSCH-SetList2
For indicating per-TRP OLPC set in DCI format 0_1/0_2 with the legacy field, a second p0-
PUSCH-SetList-r16 is used. When this field is present the p0-PUSCH-SetList2 corresponds
to the first SRS resource set (see TS 38.213).
pathlossReferenceRSToAddModList, pathlossReferenceRSToAddModListSizeExt
A set of Reference Signals (e.g. a CSI-RS config or a SS block) to be used for PUSCH path
loss estimation. The set consists of Reference Signals configured using
pathLossReferenceRSToAddModList and Reference Signals configured using
pathlossReferenceRSToAddModListSizeExt. Up to maxNrofPUSCH-PathlossReferenceRSs
may be configured (see TS 38.213 [13], clause 7.1).
pathlossReferenceRSToReleaseList, pathlossReferenceRSToReleaseListSizeExt
Lists of reference symbols for PUSCH path loss estimation to be released by the UE.
sri-PUSCH-Mapping ToAddModList
A list of SRI-PUSCH-PowerControl elements among which one is selected by the SRI field in
DCI (see TS 38.213 [13], clause 7.1).
sri-PUSCH-MappingToAddModList2
A list of SRI-PUSCH-PowerControl elements for second SRS-resource set, among which one
is selected by the SRI field in DCI (see TS 38.213 [13], clause 7.1). When this field is present
the sri-PUSCH-Mapping ToAddModList corresponds to the first SRS resource set for PUSCH.
tpc-Accumulation
If enabled, UE applies TPC commands via accumulation. If not enabled, UE applies the TPC
command without accumulation. If the field is absent, TPC accumulation is enabled (see TS
38.213 [13], clause 7.1).
twoPUSCH-PC-AdjustmentStates
Number of PUSCH power control adjustment states maintained by the UE (i.e., fc(i)). If the
field is present (n2) the UE maintains two power control states (i.e., fc(i, 0) and fc(i, 1)). If the
field is absent, it maintains one power control state (i.e., fc(i, 0)) (see TS 38.213 [13], clause
7.1).

SRI-PUSCH-PowerControl field descriptions sri-P0-PUSCH-AlphaSetId

The ID of a P0-PUSCH-AlphaSet as configured in p0-AlphaSets in

PUSCH-PowerControl.

sri-PUSCH-ClosedLoopIndex

The index of the closed power control loop associated with this

SRI-PUSCH-PowerControl.

sri-PUSCH-PathlossReferenceRS-Id

The ID of PUSCH-PathlossReferenceRS as configured in the pathlossReferenceRSToAddModList in PUSCH-PowerControl.

sri-PUSCH-PowerControlId

The ID of this SRI-PUSCH-PowerControl configuration. It is used as the codepoint (payload) in the SRI DCI field.

TCI-State

The IE TCI-State associates one or two DL reference signals
with a corresponding quasi-colocation (QCL) type. If addi-
tionalPCI is configured for the reference signal, same value
is configured for both DL reference signals.

TCI-State information element

```
-- ASN1START
-- TAG-TCI-STATE-START
TCI-State ::=                  SEQUENCE {
    tci-StateId                TCI-StateId,
    qcl-Type1                  QCL-Info,
    qcl-Type2                  QCL-Info
OPTIONAL,    -- Need R
    ...
}
QCL-Info ::=                   SEQUENCE {
    cell                       ServCellIndex
OPTIONAL,    -- Need R
    bwp-Id                     BWP-Id
OPTIONAL, -- Cond CSI-RS-Indicated
    referenceSignal            CHOICE {
        csi-rs                     NZP-CSI-RS-ResourceId,
        ssb                        SSB-Index
    },
    qcl-Type                   ENUMERATED {typeA, typeB,
typeC, typeD},
    ...,
    [[
    additionalPCI-r17          AdditionalPCIIndex-r17
OPTIONAL    -- Need R
```

-continued

| TCI-State information element |
|---|

```
    ]]
}
DLorJoint-TCIState-r17 ::=      SEQUENCE {
    tci-StateUnifiedId-r17          TCI-StateId,
    qcl-Type1-r17                   QCL-Info,
    qcl-Type2-r17                   QCL-Info
OPTIONAL,   -- Need R
    ul-powerControl-r17             Uplink-powerControlId-r17
OPTIONAL,   -- Need R
    pathlossReferenceRS-Id-r17      PUSCH-PathlossReferenceRS-Id
OPTIONAL    -- Need S
           -- Editor's Note: Check if new id -r17 is needed to cover
full ID range
}
UL-TCIState-r17 ::=             SEQUENCE {
    ul-TCIState-Id-r17              UL-TCIState-Id-r17,
    servingCellId-r17               ServCellIndex
OPTIONAL,   -- Need S
    referenceSignal-r17             CHOICE {
        ssb-Index-r17                   SSB-Index,
        csi-RS-Index-r17                NZP-CSI-RS-
ResourceId,
        srs-r17                         PUCCH-SRS
    },
    additionalPCI-r17               AdditionalPCIIndex-r17
OPTIONAL,   -- Need R
    ul-powerControl-r17             Uplink-powerControlId-r17
OPTIONAL,   -- Need R
    pathlossReferenceRS-Id-r17      PUSCH-PathlossReferenceRS-Id
OPTIONAL    -- Need S
           -- Editor's Note: Check if new id -r17 is needed to cover
full ID range
}
-- TAG-TCI-STATE-STOP
-- ASN1STOP
```

| QCL-Info field descriptions |
|---| bwp-Id
The DL BWP which the RS is located in.
cell
The UE's serving cell in which the referenceSignal is configured. If the
field is absent, it applies to the serving cell in which the TCI-State is
configured. The RS can be located on a serving cell other than the serving
cell in which the TCI-State is configured only if the qcl-Type is configured
as typeC or typeD. See TS 38.214 [19] clause 5.1.5.
referenceSignal
Reference signal with which quasi-collocation information is provided as
specified in TS 38.214 [19] clause 5.1.5.
qcl-Type
QCL type as specified in TS 38.214 [19] clause 5.1.5.

Uplink-PowerControl
The IE Uplink-PowerControl is used to configure UE spe-
cific power control parameter for PUSCH, PUCCH and
SRS.

| Uplink-PowerControl information element |
|---|

```
    -- ASN1START
    -- TAG-UPLINK-POWERCONTROL-START
    Uplink-powerControl-r17 ::= SEQUENCE {
        ul-powercontrolId-r17          Uplink-powerControlId-r17
    OPTIONAL,   -- Need R
        p0AlphaSetforPUSCH-r17         P0AlphaSet-r17
    OPTIONAL,   -- Need R
        p0AlphaSet forPUCCH-r17        P0AlphaSet-r17
    OPTIONAL,   -- Need R
        p0AlphaSetforSRS-r17           P0AlphaSet-r17
    OPTIONAL    -- Need R
    }
```

| Uplink-PowerControl information element |
|---|

```
    P0AlphaSet-r17 ::=             SEQUENCE {
        p0-r17                         INTEGER (-16..15)
    OPTIONAL,   -- Need R
        alpha-r17                      Alpha
    OPTIONAL,   -- Need R
        closedLoopIndex-r17            ENUMERATED { i0, i1 }
    }
    Uplink-powerControlId-r17 ::= INTEGER(1.. maxULTCI-r17)
    -- TAG-UPLINK-POWERCONTROL-STOP
    -- ASN1STOP
```

| Uplink-PowerControl field descriptions |
|---|

UL-powerControl
Configures power control parameters for PUSCH, PUCCH and SRS.

3GPP TS 38.212 V17.1.0 discusses NR Downlink Control
Information (DCI) format. One or more parts of 3GPP TS
38.212 V17.1.0 are quoted below:
7.3.1 DCI Formats
The DCI formats defined in table 7.3.1-1 are supported.

TABLE 7.3.1-1

| DCI formats | |
|---|---|
| DCI format | Usage |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of one or multiple PDSCH in one cell, and/or triggering one shot HARQ-ACK codebook feedback |
| 1_2 | Scheduling of PDSCH in one cell |

7.3.1.1.2 Format 0_1
DCI format 0_1 is used for the scheduling of one or multiple
PUSCH in one cell, or indicating CG downlink feedback
information (CG-DFI) to a UE.
The following information is transmitted by means of the
DCI format 0_1 with CRC scrambled by C-RNTI or CS-
RNTI or SP-CSI-RNTI or MCS-C-RNTI:
    Identifier for DCI formats—1 bit
        The value of this bit field is always set to 0, indicating
        an UL DCI format
    Carrier indicator—0 or 3 bits, as defined in Clause 10.1 of
        [5, TS38.213]. This field is reserved when this format
        is carried by PDCCH on the primary cell and the UE is
        configured for scheduling on the primary cell from an
        SCell, with the same number of bits as that in this
        format carried by PDCCH on the SCell for scheduling
        on the primary cell.
    DFI flag—0 or 1 bit
    . . .
If DCI format 0_1 is used for indicating CG-DFI, all the
remaining fields are set as follows:
    . . .
Otherwise, all the remaining fields are set as follows:
    UL/SUL indicator—0 bit for UEs not configured with
        supplementaryUplink in ServingCellConfig in the cell
        or UEs configured with supplementary Uplink in ServingCellConfig in the cell but only one carrier in the cell is configured for PUSCH transmission; otherwise, 1 bit as defined in Table 7.3.1.1.1-1.

Bandwidth part indicator—0, 1 or 2 bits as determined by the number of UL BWPs $n_{BWP,RRC}$ configured by higher layers, excluding the initial UL bandwidth part. The bitwidth for this field is determined as $[\log_2(n_{BWP})]$ bits, where

. . .

Frequency domain resource assignment—number of bits determined by the following, where $$N_{RB}^{UL,BWP}$$

is the size of the active UL bandwidth part:

Time domain resource assignment—0, 1, 2, 3, 4, 5, or 6 bits

. . .

Modulation and coding scheme—5 bits as defined in Clause 6.1.4.1 of [6, TS 38.214]

New data indicator—1 bit

Redundancy version—number of bits determined by the following:

2 bits as defined in Table 7.3.1.1.1-2 if the number of scheduled PUSCH indicated by the Time domain resource assignment field is 1;

. . .

HARQ process number—5 bits if higher layer parameter harq-ProcessNumberSizeDCI-0-1 is configured; otherwise 4 bits

. . .

TPC command for scheduled PUSCH—2 bits as defined in Clause 7.1.1 of [5, TS38.213]

Second TPC command for scheduled PUSCH—2 bits as defined in Clause 7.1.1 of [5, TS38.213] if higher layer parameter SecondTPCFieldDCI-0-1 is configured; 0 bit otherwise.

SRS resource set indicator—0 or 2 bits 2 bits according to Table 7.3.1.1.2-36 if
txConfig=nonCodeBook, and there are two SRS resource sets configured by srs-ResourceSetToAddModList and associated with the usage of value 'nonCodeBook', or
txConfig=codebook, and there are two SRS resource sets configured by srs-ResourceSetToAddModList and associated with usage of value 'codebook';

0 bit otherwise.

SRS resource indicator $$-\left\lceil \log_2\left( \sum_{k=1}^{min\{L_{max},N_{SRS}\}} \binom{N_{SRS}}{k} \right) \right\rceil$$

or $\lceil \log_2(N_{SRS}) \rceil$ bits, where $N_{SRS}$ is the number of configured SRS resources in the SRS resource set indicated by SRS resource set indicator field if present; otherwise $N_{SRS}$ is the number of configured SRS resources in the SRS resource set configured by higher layer parameter srs-ResourceSetToAddModList and associated with the higher layer parameter usage of value 'codeBook' or 'nonCodeBook',

28

$$\left\lceil \log_2\left( \sum_{k=1}^{min\{L_{max},N_{SRS}\}} \binom{N_{SRS}}{k} \right) \right\rceil$$

bits according to Tables 7.3.1.1.2-28/29/30/31 if the higher layer parameter txConfig=nonCodebook, where $N_{SRS}$ is the number of configured SRS resources in the SRS resource set indicated by SRS resource set indicator field if present, otherwise $N_{SRS}$ is the number of configured SRS resources in the SRS resource set configured by higher layer parameter srs-ResourceSetToAddModList and associated with the higher layer parameter usage of value 'nonCodeBook', and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS}) \rceil$ bits according to Tables 7.3.1.1.2-32, 7.3.1.1.2-32A and 7.3.1.1.2-32B if the higher layer parameter txConfig=codebook, where $N_{SRS}$ is the number of configured SRS resources in the SRS resource set indicated by SRS resource set indicator field if present, otherwise $N_{SRS}$ is the number of configured SRS resources in the SRS resource set configured by higher layer parameter srs-ResourceSetToAddModList and associated with the higher layer parameter usage of value 'codeBook'.

Second SRS resource indicator—0, $$\left\lceil \log_2\left( \max_{k\in\{1,2, ..., min\{L_{max},N_{SRS}\}\}} \binom{N_{SRS}}{k} \right) \right\rceil$$

or $\lceil \log_2(N_{SRS}) \rceil$ bits, $$\left\lceil \log_2\left( \max_{k\in\{1,2, ..., min\{L_{max},N_{SRS}\}\}} \binom{N_{SRS}}{k} \right) \right\rceil$$

bits according to Tables 7.3.1.1.2-28/29A/30A/31A with the same number of layers indicated by SRS resource indicator field if the higher layer parameter txConfig=nonCodebook and SRS resource set indicator field is present, where $N_{SRS}$ is the number of configured SRS resources in the second SRS resource set, and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$[\log_2(N_{SRS})]$ bits according to Tables 7.3.1.1.2-32, 7.3.1.1.2-32A and 7.3.1.1.2-32B if the higher layer parameter txConfig=codebook and SRS resource set indicator field is present, where $N_{SRS}$ is the number of configured SRS resources in the second SRS resource set.

0 bit otherwise.

TABLE 7.3.1.1.2-36

| | SRS resource set indication |
|---|---|
| Bit field mapped to index | SRS resource set indication |
| 0 | SRS resource indicator field and Precoding information and number of layers field are associated with the first SRS resource set; Second SRS resource indicator field and Second Precoding information field are reserved. |
| 1 | SRS resource indicator field and Precoding information and number of layers field are associated with the second SRS resource set; Second SRS resource indicator field and Second Precoding information field are reserved. |
| 2 | SRS resource indicator field and Precoding information and number of layers field are associated with the first SRS resource set; Second SRS resource indicator field and Second Precoding information field are associated with the second SRS resource set. |
| 3 | SRS resource indicator field and Precoding information and number of layers field are associated with the first SRS resource set; Second SRS resource indicator field and Second Precoding information field are associated with the second SRS resource set. |

NOTE 1:

The first and the second SRS resource sets are respectively the ones with lower and higher srs-ResourceSetId of the two SRS resources sets configured by higher layer parameter srs-ResourceSetToAddModList or srs-ResourceSetToAddModListDCI-0-2, and associated with the higher layer parameter usage of value 'nonCodeBook' if txConfig = nonCodebook or 'codeBook' if txConfig = codebook. When only one SRS resource set is configured by higher layer parameter srs-ResourceSetToAddModList or srs-ResourceSet-ToAddModListDCI-0-2, and associated with the higher layer parameter usage of value 'codeBook' or 'nonCodeBook' respectively, the first SRS resource set is the SRS resource set. The association of the first and second SRS resource sets to PUSCH repetitions for each bit field index value is as defined in Clause 6.1.2.1 of [6, TS 38.214].

NOTE 2:

For DCI format 0_2, the first and second SRS resource sets configured by higher layer parameter srs-ResourceSetToAddModListDCI-0-2 are composed of the first $N_{SRS,0\_2}$ SRS resources together with other configurations in the first and second SRS resource sets configured by higher layer parameter srs-ResourceSetToAddModList, if any, and associated with the higher layer parameter usage of value 'codeBook' or 'nonCodeBook', respectively, except for the higher layer parameters 'srs-ResourceSetId' and 'srs-ResourceIdList'.

3GPP TS 38.213 V17.1.0 discusses PHR and/or power control. One or more parts of 3GPP TS 38.213 V17.1.0 are quoted below:

In the remaining of this clause, if a UE is provided DLor-Joint-TCIState or UL-TCIstate and for an indicated DLor-Joint-TCIState or UL-TCIstate as described in [6, TS 38.214]

in clauses 7.1.1, 7.2.1, and 7.3.1, the RS index $q_d$ for obtaining the downlink pathloss estimate for PUSCH, PUCCH, and SRS transmission is provided by PL-RS associated with or included in the indicated DLorJoint-TCIState or UL-TCIstate except for SRS transmission that is not provided useIndicatedTCIState in clause 7.1.1, if p0-Alpha-CLID-PUSCH-Set is provided, the values of $P_{O\_UE\_PUSCH,b,f,c}(j)$, $\alpha_{b,f,c}(j)$, and the PUSCH power control adjustment state l are provided by p0-Alpha-CLID-PUSCH-Set associated with the indicated DLorJoint-TCIState or UL-TCIstate in clause 7.2.1, if p0-Alpha-CLID-PUCCHSet is provided, the values of $P_{O\_PUCCH,b,f,c}(q_u)$ and the PUCCH power control adjustment state l are provided by p0-Alpha-CLID-PUCCH-Set associated with the indicated DLorJoint-TCIState or UL-TCIstate in clause 7.3.1, if p0-Alpha-CLID-SRS-Set is provided, if useIndicatedTCIState is provided for a SRS resource set, the values of $P_{O\_SRS,b,f,c}(q_s)$, $\alpha_{SRS,b,f,c}(q_s)$, and SRS power control adjustment state l are provided by p0-Alpha-CLID-SRS-Set associated with the indicated DLorJoint-TCIState or UL-TCIstate else, if useIndicatedTCIState is not provided for a SRS resource set and for a first SRS resource from the SRS resource set, the values of $P_{O\_SRS,b,f,c}(q_s)$, $\alpha_{SRS,b,f,c}(q_s)$, and SRS power control adjustment state l are provided by p0-Alpha-CLID-SRS-Set associated with DLorJoint-TCIState or UL-TCIState of an SRS resource with lowest SRS-ResourceId in the SRS resource set and a RS index q for obtaining a pathloss estimate for the SRS transmission is provided by PL-RS associated with or included in the indicated DLorJoint-TCIState or UL-TCIState of an SRS resource with lowest SRS-ResourceId in the SRS resource set 7.1.1 UE Behaviour If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i, j, q_d, l)$ in PUSCH transmission occasion i as $$P_{PUSCH,b,f,c}(i, j, q_d, l) =$$

$$\min\begin{Bmatrix} P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, , l) \end{Bmatrix}[dBm]$$

where, $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

$P_{O\_PUSCH,b,f,c}(j)$ is a parameter composed of the sum of a component $P_{O\_NOMINAL,PUSCH,f,c}(f)$ and a component $P_{O\_UE\_PUSCH,b,f,c}(j)$ where $j \in \{0, 1, \ldots, J-1\}$.

If a UE established dedicated RRC connection using a Type-1 random access procedure, as described in clause 8, and is not provided P0-PUSCH-AlphaSet or for a PUSCH (re)transmission corresponding to a RAR UL grant as described in clause 8.3, For $j \in \{2, \ldots, J-1\} = S_j$, a $P_{O\_NOMINAL,PUSCH,f,c}(j)$ value, applicable for all $j \in S_j$, is provided by p0-NominalWithGrant, or $P_{O\_NOMINAL,PUSCH,f,c}(j) = P_{O\_NOMINAL,PUSCH,f,c}(0)$ if p0-NominalWithGrant is not provided, for each carrier f of serving cell c and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c If the UE is provided by SRI-PUSCH-PowerControl more than one values of p0-PUSCH-AlphaSetId and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the value of $P_{O\_UE\_PUSCH,b,f,c}(j)$ from the p0-PUSCH-AlphaSetId value that is mapped to the SRI field value. If the UE is provided by SRI-PUSCH-PowerControl more than one values of p0-PUSCH-AlphaSetId if the DCI format scheduling the PUSCH transmission includes two SRI fields and the UE is provided two SRS resource sets in srs-ResourceSetToAddModList or srs-ResourceSetToAddModListDCI-0-2 with usage set to 'codebook' and if, the UE obtains a mapping from sri-PUSCH-PowerControlId in SRI-PUSCH-PowerControl between a set of values for the two SRI fields and a set of indexes provided by p0-PUSCH-AlphaSetId that map to a set of P0-PUSCH-AlphaSet values, and determines first and second values of $P_{O\_UE\_PUSCH,b,f,c}(j)$ from the p0-PUSCH-AlphaSetId values that are mapped to the values of the first and second SRI fields, respectively.

if the DCI format scheduling the PUSCH transmission includes two SRI fields and the UE is provided two SRS resource sets in srs-ResourceSetToAddModList or srs-ResourceSetToAddModListDCI-0-2 with usage set to 'nonCodebook', the UE obtains a mapping from sri-PUSCH-PowerControlId in SRI-PUSCH-PowerControl between a set of values for the first SRI field value and a set of indexes provided by p0-PUSCH-AlphaSetId that map to a set of P0-PUSCH-AlphaSet values, and determines the first value of $P_{O\_UE\_PUSCH,b,f,c}(j)$ from the p0-PUSCH-AlphaSetId value that is mapped to the first SRI field value, and a set of values associated with the second SRI field value for a same number of layers as indicated by the first SRI field [5, TS 38.212], and a set of indexes provided by p0-PUSCH-AlphaSetId that map to a set of P0-PUSCH-AlphaSet values, and determines the second value of $P_{O\_UE\_PUSCH,b,f,c}(j)$ from the p0-PUSCH-AlphaSetId value that is mapped to the second SRI field value corresponding to Tables 7.3.1.1.2-28/29/30/31 of [5, TS 38.212].

If the DCI format also includes an open-loop power control parameter set indication field and a value of the open-loop power control parameter set indication field is '1' and if the DCI format scheduling the PUSCH transmission includes an SRI field, the UE determines a value of $P_{O\_UE\_PUSCH,b,f,c}(j)$ from a first value in P0-PUSCH-Set with a p0-PUSCH-SetId value mapped to the SRI field value.

If the UE is provided by SRI-PUSCH-PowerControl more than one values of p0-PUSCH-AlphaSetId if a DCI format scheduling the PUSCH transmission includes two SRI fields and an open-loop power control parameter set indication field and the UE is provided two SRS resource sets in srs-ResourceSetToAddModList or srs-ResourceSetToAddModListDCI-0-2 with usage set to 'codebook' if a value of the open-loop power control parameter set indication field is '0', the UE determines two values of $P_{O\_UE\_PUSCH,b,f,c}(j)$ from the p0-PUSCH-AlphaSetId values in SRI-PUSCH-PowerControl that are mapped to the two SRI values corresponding to each SRS resource set with usage set to 'codebook'.

if a value of the open-loop power control parameter set indication field is '1', the UE determines two values of $P_{O\_UE\_PUSCH,b,f,c}(j)$ from first values in P0-PUSCH-Set in P0-PUSCH-SetList and P0-PUSCH-Set in P0-PUSCH-SetList2 with p0-PUSCH-SetId values mapped to the two SRI values corresponding to each SRS resource set with usage set to 'codebook', respectively.

if a DCI format scheduling the PUSCH transmission includes two SRI fields and an open-loop power control parameter set indication field and the UE is provided two SRS resource sets in srs-ResourceSetToAddModList or srs-ResourceSetToAddModListDCI-0-2 with usage set to 'nonCodebook', if a value of the open-loop power control parameter set indication field is '0', the UE determines two values of $P_{O\_UE\_PUSCH,b,f,c}(j)$ from the p0-PUSCH-AlphaSetId values in SRI-PUSCH-PowerControl that are mapped to the first SRI field value corresponding to the first SRS resource set with usage set to 'nonCodebook' and to a second value, that is associated with the second SRI field value corresponding to Tables 7.3.1.1.2-28/29/30/31 of [5, TS 38.212] for a same number of layers as indicated by the first SRI field value, corresponding to the second SRS resource set with usage set to 'nonCodebook'.

if a value of the open-loop power control parameter set indication field is '1', the UE determines two values of $P_{O\_UE\_PUSCH,b,f,c}(j)$ from first values in P0-PUSCH-Set in P0-PUSCH-SetList and P0-PUSCH-Set in P0-PUSCH-SetList2 with p0-PUSCH-SetId values mapped to the first SRI field value corresponding to the first SRS resource set with usage set to 'nonCodebook, and a second value, that is associated with the second SRS field value corresponding to Tables 7.3.1.1.2-28/29/30/31 of [5, TS 38.212] for a same number of layers as indicated by the first SRI field value, corresponding to the second SRS resource set with usage set to 'nonCodebook', respectively.

If the UE is not provided two SRS resource sets in srs-ResourceSetToAddModList or srs-ResourceSet-ToAddModListDCI-0-2 with usage set to 'codebook' or 'nonCodebook' and if the PUSCH transmission, except for the PUSCH retransmission corresponding to a RAR UL grant, is scheduled by a DCI format that does not include an SRI field, or if SRI-PUSCH-PowerControl is not provided to the UE, j=2, If P0-PUSCH-Set is provided to the UE and the DCI format includes an open-loop power control parameter set indication field, the UE determines a value of $P_{O\_UE\_PUSCH,b,f,c}$) from a first P0-PUSCH-AlphaSet in p0-AlphaSets if a value of the open-loop power control parameter set indication field is '0' or '00' a first value in P0-PUSCH-Set with the lowest p0-PUSCH-SetID value if a value of the open-loop power control parameter set indication field is '1' or '01' a second value in P0-PUSCH-Set with the lowest p0-PUSCH-SetID value if a value of the open-loop power control parameter set indication field is '10' else, the UE determines $P_{O\_UE\_PUSCH,b,f,c}(j)$ from the value of the first P0-PUSCH-AlphaSet in p0-AlphaSets If the UE is provided two SRS resource sets in srs-ResourceSetToAddModList or srs-ResourceSet-ToAddModListDCI-0-2 with usage set to 'codebook' or 'nonCodebook' and the PUSCH transmission is scheduled by a DCI format that does not include an SRI field and includes an SRS resource set indicator field with value 10 or 11

If P0-PUSCH-Set is provided to the UE and the DCI format includes an open-loop power control parameter set indication field, the UE determines first and second values of $P_{O\_UE\_PUSCH,b,f,c}(J)$ as first and second P0-PUSCH-AlphaSet in p0-AlphaSets if the open-loop power control parameter set indication value is '0' or '00' first value in P0-PUSCH-Set with the lowest p0-PUSCH-SetID value in p0-PUSCH-SetList and first value in P0-PUSCH-Set with the lowest p0-PUSCH-SetID value in p0-PUSCH-SetList2, respectively, if the open-loop power control parameter set indication value is '1' or '01' second value in P0-PUSCH-Set with the lowest p0-PUSCH-SetID value in p0-PUSCH-SetList and second value in P0-PUSCH-Set with the lowest p0-PUSCH-SetID in p0-PUSCH-SetList2, respectively, if the open-loop power control parameter set indication value is '10' or '11' else, the UE determines first and second values $P_{O\_UE\_PUSCH,b,f,c}(j)$ from the value of the first and second P0-PUSCH-AlphaSet in p0-AlphaSets, respectively For $\alpha_{b,f,c}(j)$ For $j \in S_j$, a set of $\alpha_{b,f,c}(j)$ values are provided by a set of alpha in P0-PUSCH-AlphaSet indicated by a respective set of p0-PUSCH-AlphaSetId for active UL BWP b of carrier f of serving cell c If the UE is provided SRI-PUSCH-PowerControl and more than one values of p0-PUSCH-AlphaSetId in p0-AlphaSets, if a DCI format scheduling the PUSCH transmission includes two SRI fields and the UE is provided two SRS resource sets in srs-ResourceSetToAddModList or srs-ResourceSet-ToAddModListDCI-0-2 with usage set to 'codebook', the UE obtains a mapping from sri-PUSCH-PowerControlId in SRI-PUSCH-PowerControl between a set of values for the two SRI fields and a set of indexes provided by P0-PUSCH-AlphaSetId that map to P0-PUSCH-AlphaSet values, and determines first and second values of $\alpha_{b,f,c}(j)$ from the P0-PUSCH-AlphaSetID values that are mapped to the values of the first and second SRI field values, respectively.

if a DCI format scheduling the PUSCH transmission includes two SRI fields and the UE is provided two SRS resource sets in srs-ResourceSetToAddModList or srs-ResourceSet-ToAddModListDCI-0-2 with usage set to 'nonCodebook', the UE obtains a mapping from sri-PUSCH-PowerControlId in SRI-PUSCH-PowerControl between a set of values for the first SRI field and a set of indexes provided by P0-PUSCH-AlphaSetId that map to P0-PUSCH-AlphaSet values, and determines first value of $\alpha_{b,f,c}(j)$ from the P0-PUSCH-AlphaSetID value that is mapped to the first SRI field value, and the second value, associated with the second SRI field value corresponding to Tables 7.3.1.1.2-28/29/30/31 of [5, TS 38.212] for a same number of layers as indicated by the first SRI field value, and a set of indexes provided by p0-PUSCH-AlphaSetId that map to a set of P0-PUSCH-AlphaSet values, and determines the second value of $\alpha_{b,f,c}(j)$ from the p0-PUSCH-AlphaSetId value that is mapped to the second SRI field value if a DCI format scheduling the PUSCH transmission includes one SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the values of $\alpha_{b,f,c}(j)$ from the p0-PUSCH-AlphaSetId value that is mapped to the SRI field value If the UE is not provided two SRS resource sets in srs-ResourceSetToAddModList or srs-ResourceSetToAddModListDCI-0-2 with usage set to 'codebook' or 'nonCodebook' and if the PUSCH transmission except for the PUSCH retransmission corresponding to a RAR UL grant is scheduled by a DCI format that does not include an SRI field, or if SRI-PUSCH-PowerControl is not provided to the UE, j=2, and the UE determines $\alpha_{b,f,c}(j)$ from the value of the first P0-PUSCH-AlphaSet in p0-AlphaSets If the UE is provided two SRS resource sets in srs-ResourceSetToAddModList or srs-ResourceSetToAddModListDCI-0-2 with usage set to 'codebook' or 'nonCodebook' and the PUSCH transmission is scheduled by a DCI format that does not include an SRI field and includes an SRS resource set indicator field with value 10 or 11, the UE determines $\alpha_{b,f,c}(j)$ from first and second P0-PUSCH-AlphaSet in p0-AlphaSets $$M_{RB,b,f,c}^{PUSCH}(i)$$

is the bandwidth of the PUSCH resource assignment expressed in number of resource blocks for PUSCH transmission occasion i on active UL BWP b of carrier f of serving cell c and μ is a SCS configuration defined in [4, TS 38.211]

$PL_{b,f,c}(q_d)$ is a downlink pathloss estimate in dB calculated by the UE using reference signal (RS) index q for the active DL BWP, as described in clause 12, of carrier f of serving cell c If the UE is not provided PUSCH-PathlossReferenceRS and enableDefaultBeamPL-ForSRS, or before the UE is provided dedicated higher layer parameters, the UE calculates $PL_{b,f,c}(q_d)$ using a RS resource from an SS/PBCH block with same SS/PBCH block index as the one the UE uses to obtain MIB If the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The UE identifies a RS resource index q in the set of RS resource indexes to correspond either to a SS/PBCH block index or to a CSI-RS resource index as provided by pusch-PathlossReferenceRS-Id in PUSCH-PathlossReferenceRS If the PUSCH transmission is scheduled by a RAR UL grant as described in clause 8.3, or for a PUSCH transmission for Type-2 random access procedure as described in clause 8.1A, the UE uses the same RS resource index $q_d$ as for a corresponding PRACH transmission If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field, or for first and second SRI fields if the UE is provided two SRS resource sets in srs-ResourceSetToAddModList or srs-ResourceSetToAddModListDCI-0-2 with usage set to 'codebook', or values for a first SRI field and values associated with a second SRI field value corresponding to Tables 7.3.1.1.2-28/29/30/31 of [5, TS 38.212] for a same number of layers as indicated by the first SRI field value if the UE is provided two SRS resource sets in srs-ResourceSetToAddModList or srs-ResourceSetToAddModListDCI-0-2 with usage set to 'nonCodebook', in a DCI format scheduling the PUSCH transmission and a set of PUSCH-PathlossReferenceRS-Id values and determines the RS resource index $q_d$, or respective first and second RS resource indexes $q_d$, from the value of PUSCH-PathlossReferenceRS-Id that is mapped to the SRI field value, or from the values of PUSCH-Pathloss-ReferenceRS-Id that are mapped to respective first and second SRI field values if the UE is provided two SRS resource sets in srs-ResourceSetToAddModList or srs-ResourceSetToAddModListDCI-0-2 with usage set to 'codebook', or from the values of PUSCH-PathlossReferenceRS-Id that are mapped to respective first SRI field value and a value associated with the second SRI field value corresponding to Tables 7.3.1.1.2-28/29/30/31 of [5, TS 38.212] for a same number of layers as indicated by the first SRI field value if the UE is provided two SRS resource sets in srs-ResourceSetToAddModList or srs-ResourceSetToAddModListDCI-0-2 with usage set to 'nonCodebook', where the RS resource is either on serving cell c or, if provided, on a serving cell indicated by a value of pathlossReferenceLinking

. . .

If the PUSCH transmission is not scheduled by DCI format 0_0, and if the UE is provided enableDefault-BeamPL-ForSRS and is not provided PUSCH-PathlossReferenceRS and PUSCH-PathlossReferenceRS-r16, the UE uses the same RS resource index $q_d$ as for an SRS resource set with an SRS resource associated with the PUSCH transmission If

. . .

the PUSCH transmission is scheduled by DCI format 0_1 or DCI format 0_2 that does not include an SRI field, or SRI-PUSCH-PowerControl is not provided to the UE, the UE determines a RS resource index q with a respective PUSCH-PathlossReferenceRS-Id value being equal to zero where the RS resource is either on serving cell c or, if provided, on a serving cell indicated by a value of pathlossReferenceLinking

. . .

. . .

$PL_{b,f,c}(q_d)$=referenceSignalPower−higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell

. . .

7.7 Power Headroom Report

The types of UE power headroom reports are the following. A Type 1 UE power headroom PH that is valid for PUSCH transmission occasion i on active UL BWP b of carrier f of serving cell C. A Type 3 UE power headroom PH that is valid for SRS transmission occasion i on active UL BWP b of carrier f of serving cell C.

A UE determines whether a power headroom report for an activated serving cell [11, TS 38.321] is based on an actual transmission or a reference format based on the higher layer signalling of configured grant and periodic/semi-persistent sounding reference signal transmissions and downlink control information the UE received until and including the PDCCH monitoring occasion where the UE detects the first DCI format scheduling an initial transmission of a transport block since a power headroom report was triggered if the power headroom report is reported on a PUSCH triggered by the first DCI format. Otherwise, a UE determines whether a power headroom report is based on an actual transmission or a reference format based on the higher layer signalling of configured grant and periodic/semi-persistent sounding reference signal transmissions and downlink control information the UE received until the first uplink symbol of a configured PUSCH transmission minus $T'_{proc,2}=T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the power headroom report is reported on the PUSCH using the configured grant.

7.7.1 Type 1 PH Report

If a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as $$PH_{type1,b,f,c}(i, j, q_d, l) = \qquad (i)$$

$$P_{CMAX,f,c}(i) - \{P_{O\_PUSCH,b,f,c}(j) + 10\log_{10}(2^\mu \cdot M^{PUCSH}_{RB,b,f,c}(i)) +$$

$$\alpha_{b,f,c}(j) \cdot PL_{b,f,c}(q_d) + \Delta_{TF,b,f,c}(i) + f_{b,f,c}(i, l)\}$$

[dB]
where $$P_{CMAX,f,c}(i),\ P_{O\_PUSCH,b,f,c}(j),\ M^{PUSCH}_{RB,b,f,c}(i),$$

$$\alpha_{b,f,c}(j),\ PL_{b,f,c}(q_d),\ \Delta_{TF,b,f,c}(i)\ \text{and}\ f_{b,f,c}(i, l)$$

are defined in clause 7.1.1.

If a UE is configured with multiple cells for PUSCH transmissions, where a SCS configuration $\mu_1$ on active UL BWP $b_1$ of carrier $f_1$ of serving cell $c_1$ is smaller than a SCS configuration $\mu_2$ on active UL BWP $b_2$ of carrier $f_2$ of serving cell $c_2$, and if the UE provides a Type 1 power headroom report in a PUSCH transmission in a slot on active UL BWP $b_1$ that overlaps with multiple slots on active UL BWP $b_2$, the UE provides a Type 1 power headroom report for the first PUSCH, if any, on the first slot of the multiple slots on active UL BWP $b_2$ that fully overlaps with the slot on active UL BWP $b_1$. If a UE is configured with multiple cells for PUSCH transmissions, where a same SCS configuration on active UL BWP $b_1$ of carrier $f_1$ of serving cell $c_1$ and active UL BWP $b_2$ of carrier $f_2$ of serving cell $c_2$, and if the UE provides a Type 1 power headroom report in a PUSCH transmission in a slot on active UL BWP $b_1$, the UE provides a Type 1 power headroom report for the first PUSCH, if any, on the slot on active UL BWP $b_2$ that overlaps with the slot on active UL BWP $b_1$.

. . .

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if the second PUSCH transmission is scheduled by a DCI format in a PDCCH received in a second PDCCH monitoring occasion, and the second PDCCH monitoring occasion is after a first PDCCH monitoring occasion where the UE detects the earliest DCI format scheduling an initial transmission of a transport block after a power headroom report was triggered or the second PUSCH transmission is after the first uplink symbol of the first PUSCH transmission minus $T'_{proc,2}=T_{proc,2}$ where $T_{proc,2}$ is determined according to [6, TS 38.214] assuming $d_{2,1=1}$, $d_{2,2=0}$, and with $\mu_{DL}$ corresponding to the subcarrier spacing of the active downlink BWP of the scheduling cell for a configured grant if the first PUSCH transmission is on a configured grant after a power headroom report was triggered.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i,j,q_d,l)=\tilde{P}_{CMAX,f,c}(i)-\{P_{O\_PUSCH,b,f,c}(j)+$$
$$\alpha_{b,f,c}(j)\cdot PL_{b,f,c}(q_d)+f_{b,f,c}(i,l)\} \qquad [dB]$$

where $\tilde{P}_{CMAX,f,c}(i)$ is computed assuming MPR=0 dB, A-MPR=0 dB, P-MPR=0 dB. $\Delta T_C=0$ dB. MPR, A-MPR, P-MPR and $\Delta T_C$ are defined in [8-1, TS 38.101-1], [8-2, TS38.101-2] and [8-3, TS 38.101-3]. The remaining parameters are defined in clause 7.1.1 where $P_{O\_PUSCH,b,f,c}(f)$ and $\alpha_{b,f,c}(j)$ are obtained using $P_{O\_NOMINAL,PUSCH,f,c}(0)$ and p0-PUSCH-AlphaSetId=0, $PL_{b,f,c}(q_d)$ is obtained using pusch-PathlossReferenceRS-Id=0, and l=0.

If a UE transmits a PUSCH associated with a RS resource index $q_d$, as described in clause 7.1.1, on active UL BWP b of carrier f of serving cell c in slot n and provides a Type 1 power headroom report for an actual PUSCH repetition associated with the RS resource index $q_d$, the Type 1 power headroom report is for the first PUSCH repetition associated with the RS resource index $q_d$ that overlaps with slot n.

If a UE transmits a PUSCH associated with a first RS resource index $q_d$, as described in clause 7.1.1, on active UL BWP b of carrier f of serving cell c in slot n and is provided twoPHRMode, the UE provides a Type 1 power headroom report for PUSCH repetition associated with a second RS resource index $q_d$, as described in clause 7.1.1, where if the UE provides a Type 1 power headroom report for an actual PUSCH repetition associated with the first RS resource index $q_d$, if the UE transmits PUSCH repetitions associated with the second RS resource index $q_d$ in slot n, the UE provides a Type 1 power headroom report for a first actual PUSCH repetition associated with the second RS resource index $q_d$ that overlaps with slot n otherwise, the UE provides a Type 1 power headroom report for a reference PUSCH transmission associated with the second RS resource index $q_d$ otherwise, if the UE provides a Type 1 power headroom report for a reference PUSCH transmission associated with the first RS resource index $q_d$, the UE provides a Type 1 power headroom report for a reference PUSCH transmission associated with the second RS resource index $q_d$ 3GPP TS 38.214 V17.1.0 discusses a mechanism for unified TCI framework and/or uplink transmission framework. One or more parts of 3GPP TS 38.214 V17.1.0 are quoted below:

5.1.5 Antenna Ports Quasi Co-Location

The UE can be configured with a list of up to M TCI-State configurations within the higher layer parameter PDSCH- Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'typeA': {Doppler shift, Doppler spread, average delay, delay spread}

'typeB': {Doppler shift, Doppler spread}

'typeC': {Doppler shift, average delay}

'typeD': {Spatial Rx parameter}

The UE can be configured with a list of up to 128 DLorJointTCIState configurations, within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS.

If the DLorJointTCIState or UL-TCIState configurations are absent in a BWP of the CC, the UE can apply the DLorJointTCIState or UL-TCIState configurations from a reference BWP of a reference CC. The UE is not expected to be configured with TCI-State, SpatialRelationInfo or PUCCH-SpatialRelationInfo, except SpatialRelationInfoPos in a CC in a band, if the UE is configured with DLorJointTCIState or UL-TCIState in any CC in the same band. The UE can assume that when the UE is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE is not configured with DLorJointTCIState or UL-TCIState in any CC within the same band in the CC list.

The UE receives an activation command, as described in clause 6.1.3.14 of [10, TS 38.321] or 6.1.3.x of [10, TS 38.321], used to map up to 8 TCI states and/or pairs of TCI states, with one TCI state for DL channels/signals and one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs.

When the bwp-id or cell for QCL-TypeA/D source RS in a QCL-Info of the TCI state configured with DLorJointTCIState is not configured, the UE assumes that QCL-TypeA/D source RS is configured in the CC/DL BWP where TCI state applies.

When tci-PresentlnDCI is set as 'enabled' or tci-PresentDCI-1-2 is configured for the CORESET, the UE with activated DLorJointTCIState or UL-TCIState receives DCI format 1_1/1_2 providing indicated DLorJointTCIState or UL-TCIState for a CC or all CCs in the same CC list configured by simultaneousTCI-UpdateList1-r17, simultaneousTCI-UpdateList2-r17, simultaneousTCI-UpdateList3-r17, simultaneousTCI-UpdateList4-r17. The DCI format 1_1/1_2 can be with or without, if applicable, DL assignment. If the DCI format 1_1/1_2/ is without DL assignment, the UE can assume the following:

CS-RNTI is used to scramble the CRC for the DCI

The values of the following DCI fields are set as follows:

RV=all '1's

MCS=all '1's

NDI=0

Set to all '0's for FDRA Type 0, or all '1's for FDRA Type 1, or all '0's for dynamicSwitch (same as in Table 10.2-4 of [6, TS 38.213]).

After a UE receives an initial higher layer configuration of more than one DLorJoint-TCIState and before application of an indicated TCI state from the configured TCI states:

The UE assumes that DM-RS of PDSCH and DM-RS of PDCCH and the CSI-RS applying the indicated TCI state are quasi co-located with the SS/PBCH block the UE identified during the initial access procedure After a UE receives an initial higher layer configuration of more than one DLorJoint-TCIState or UL-TCIState and before application of an indicated TCI state from the configured TCI states:

The UE assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during the initial access procedure After a UE receives a higher layer configuration of more than one DLorJoint-TCIState as part of a Reconfiguration with sync procedure as described in [12, TS 38.331] and before applying an indicated TCI state from the configured TCI states:

The UE assumes that DM-RS of PDSCH and DM-RS of PDCCH, and the CSI-RS applying the indicated TCI state are quasi co-located with the SS/PBCH block or the CSI-RS resource the UE identified during the random access procedure initiated by the Reconfiguration with sync procedure as described in [12, TS 38.331].

After a UE receives a higher layer configuration of more than one DLorJoint-TCIState or UL-TCIState as part of a Reconfiguration with sync procedure as described in [12, TS 38.331] and before applying an indicated TCI state from the configured TCI states:

The UE assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during random access procedure initiated by the Reconfiguration with sync procedure as described in [12, TS 38.331].

If a UE receives a higher layer configuration of a single DLorJoint-TCIState, that can be used as an indicated TCI state, the UE obtains the QCL assumptions from the configured TCI state for DM-RS of PDSCH and DM-RS of PDCCH, and the CSI-RS applying the indicated TCI state.

If a UE receives a higher layer configuration of a single DLorJoint-TCIState or UL-TCIState, that can be used as an indicated TCI state, the UE determines an UL TX spatial filter, if applicable, from the configured TCI state for dynamic-grant and configured-grant based PUSCH and PUCCH, and SRS applying the indicated TCI state.

When the UE would transmit the last symbol of a PUCCH with HARQ-ACK information corresponding to the DCI carrying the TCI State indication and without DL assignment, or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamApp-Time_r17 symbols after the last symbol of the PUCCH. The first slot and the BeamAppTime_r17 symbols are both determined on the carrier with the smallest SCS among the carrier(s) applying the beam indication.

. . .

If the UE is configured with [NumberOfAdditionalPCI] and with PDCCH-Config that contains two different values of coresetPoolIndex in ControlResourceSet, the UE receives an activation command for CORESET associated with each coresetPoolIndex, as described in clause 6.1.3.14 of [10, TS 38.321], used to map up to 8 TCI states to the codepoints of the DCI field 'Transmission Configuration Indication' in one CC/DL BWP. When a set of TCI state IDs are activated for a coresetPoolIndex, the activated TCI states corresponding to one coresetPoolIndex can be associated with one physical cell ID and activated TCI states corresponding to another coresetPoolIndex can be associated with another physical cell ID.

When a UE supports two TCI states in a codepoint of the DCI field 'Transmission Configuration Indication' the UE may receive an activation command, as described in clause 6.1.3.24 of [10, TS 38.321], the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in clause 6.1.3.14 and 6.1.3.24 of [10, TS38.321], only the first S activated codepoints are applied for DCI format 1_2.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after $$\text{slot } n + 3N_{slot}^{subframe,\mu} + \frac{2^\mu}{2^{\mu_{K\,mac}}} \cdot k_{mac}$$

where $\mu$ is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}$=0 if K-Mac is not provided. If tci-PresentInDCI is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

If a UE is configured with the higher layer parameter tci-PresentInDCI that is set as 'enabled' for the CORESET scheduling a PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORE-SET. If the PDSCH is scheduled by a DCI format not having the TCI field present, and the time offset between the reception of the DL DCI and the corresponding PDSCH of a serving cell is equal to or greater than a threshold time-DurationForQCL if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

. . .

6.1 UE Procedure for Transmitting the Physical Uplink Shared Channel

The UE can be configured with a list of up to 64 UL-TCIState configurations within the higher layer parameter BWP-UplinkDedicated. Each UL-TCIState configuration contains a parameter for configuring one reference signal, if applicable, for determining UL TX spatial filter for dynamic-grant and configured-grant based PUSCH and PUCCH resource in a CC, and SRS.

. . .

6.2.1 UE Sounding Procedure

When the UE is configured DLorJoint-TCIState or UL-TCIState, the UE can assume that SRS resource(s) in any SRS resource set, except SRS resource set for positioning and an SRS resource set configured with followUnifiedT-CIstate-r17, can be configured with DLorJoint-TCIState or UL-TCIState or updated as described in clause [6.1.3.X] of [10, TS 38.321] . . . .

If an SRS resource set, except an SRS resource set for positioning, is configured with [followUnifiedTCIstate-r17], the UE shall transmit the target SRS resource(s) within the SRS resource set according to the spatial relation, if applicable, with a reference to the RS used for determining UL TX spatial filter or the RS configured with qcl-Type set to 'typeD' in QCL-Info of the indicated DLorJoint-TCIState or UL-TCIState . . . .

Final Report of 3GPP TSG RAN WG1 #104-e v1.0.0 discusses panel selection and panel activation, and CSI measurement and/or CSI report. One or more parts of Final Report of 3GPP TSG RAN WG1 #104-e v1.0.0 are quoted below:

Conclusion

On Rel.17 enhancements to facilitate UL beam selection for MP-UE, the following terms are used at least for the purpose of discussion:

'Panel activation' (at least for DL/UL measurement): activating L out of P available UE panel(s) at least for the purpose of DL and UL beam measurements (e.g. reception of DL measurement RS, transmission of SRS)

'Panel selection' (for UL transmission): selecting 1 out of L activated UE panel(s) for the purpose of UL transmission Agreement On Rel.17 enhancement for facilitating fast uplink panel selection, Rel.17 TCI state update (based on MAC CE+DCI along with the necessary TCI state activation, or MAC CE only) can be used for UE UL panel selection:

Agreement

On Rel.17 enhancement for facilitating fast uplink panel selection, for discussion purpose, a panel entity corresponds to one or more RS resources:

For CSI/beam reporting, the RS resource is an RS associated with measurement and/or reporting For beam indication, the RS resource is a source RS for UL TX spatial filter information 3GPP TS 38.101-2 V17.2.0 discusses UE's transmit power and/or output power. One or more parts of 3GPP TS 38.101-2 V17.2.0 are quoted below:

6.2 Transmitter Power 6.2.1 UE Maximum Output Power 6.2.1.0 General

NOTE: Power class 1, 2, 3, and 4 are specified based on the assumption of certain UE types with specific device architectures. The UE types can be found in Table 6.2.1.0-1.

TABLE 6.2.1.0-1

| Assumption of UE Types | |
|---|---|
| UE Power class | UE type |
| 1 | Fixed wireless access (FWA) UE |
| 2 | Vehicular UE |
| 3 | Handheld UE |
| 4 | High power non-handheld UE |
| 5 | Fixed wireless access (FWA) UE |

Power class 3 is default power class.

6.2.4 Configured Transmitted Power

The UE can configure its maximum output power. The configured UE maximum output power $P_{CMAX,f,c}$ for carrier f of a serving cell c is defined as that available to the reference point of a given transmitter branch that corresponds to the reference point of the higher-layer filtered RSRP measurement as specified in TS 38.215 [11].

The configured UE maximum output power $P_{CMAX,f,c}$ for carrier f of a serving cell c shall be set such that the corresponding measured peak EIRP $P_{UMAX,f,c}$ is within the following bounds $$P_{Powerclass}+\Delta P_{IBE}\text{-MAX(MAX}(MPR_{f,c}, A\text{-}MPR_{f,c})+\\\Delta MB_{P,n}, P\text{-}MPR_{f,c})\text{-MAX}\{T(\text{MAX}(MPR_{f,c}, A\text{-}\\MPR_{f,c})), T(P\text{-}MPR_{f,c})\}\le P_{UMAX,f,c}\le EIRP_{max}$$

while the corresponding measured total radiated power $P_{TMAX,f,c}$ is bounded by $$P_{TMAX,f,c}\le TRP_{max}$$

with $P_{Powerclass}$ the UE power class as specified in subclause 6.2.1, $EIRP_{max}$ the applicable maximum EIRP as specified in sub-clause 6.2.1, $MPR_{f,c}$ as specified in subclause 6.2.2, A-$MPR_{f,c}$ as specified in sub-clause 6.2.3, $\Delta MB_{P,n}$ the peak EIRP relaxation as specified in clause 6.2.1 and $TRP_{max}$ the maximum TRP for the UE power class as specified in sub-clause 6.2.1. $\Delta P_{IBE}$ is 1.0 dB if UE declares support for mpr-PowerBoost-FR2-r16, UL transmission is QPSK, $MPR_{f,c}=0$ and when NS_200 applies and the network configures the UE to operate with mpr-PowerBoost-FR2-r16 otherwise $\Delta P_{IBE}$ is 0.0 dB. The requirement is verified in beam peak direction.

maxUplinkDutyCycle-FR2, as defined in TS 38.306 [14], is a UE capability to facilitate electromagnetic power density exposure requirements. This UE capability is applicable to all FR2 power classes.

If the field of UE capability maxUplinkDutyCycle-FR2 is present and the percentage of uplink symbols transmitted within any 1 s evaluation period is larger than maxUplinkDutyCycle-FR2, the UE follows the uplink scheduling and can apply $P\text{-}MPR_{f,c}$.

If the field of UE capability maxUplinkDutyCycle-FR2 is absent, the compliance to electromagnetic power density exposure requirements are ensured by means of scaling down the power density or by other means.

$P\text{-}MPR_{f,c}$ is the power management maximum output power reduction. The UE shall apply $P\text{-}MPR_{f,c}$ for carrier f of serving cell c only for the cases described below. For UE conformance testing $P\text{-}MPR_{f,c}$ shall be 0 dB.

a) ensuring compliance with applicable electromagnetic power density exposure requirements and addressing unwanted emissions/self desense requirements in case of simultaneous transmissions on multiple RAT(s) for scenarios not in scope of 3GPP RAN specifications;

b) ensuring compliance with applicable electromagnetic power density exposure requirements in case of proximity detection is used to address such requirements that require a lower maximum output power.

NOTE 1: $P\text{-}MPR_{f,c}$ was introduced in the $P_{CMAX,f,c}$ equation such that the UE can report to the gNB the available maximum output transmit power. This information can be used by the gNB for scheduling decisions.

NOTE 2: $P\text{-}MPR_{f,c}$ and maxUplinkDutyCycle-FR2 may impact the maximum uplink performance for the selected UL transmission path.

NOTE 3: MPE P-MPR Reporting, as defined in TS 38.306 [14], is an optional UE capability to report $P\text{-}MPR_{f,c}$ when the reporting conditions configured by gNB are met. This UE capability is applicable to all FR2 power classes.

The tolerance $T(\Delta P)$ for applicable values of $\Delta P$ (values in dB) is specified in Table 6.2.4-1.

TABLE 6.2.4-1

| $P_{UMAX,f,c}$ tolerance | | |
|---|---|---|
| Operating Band | $\Delta P$ (dB) | Tolerance $T(\Delta P)$ (dB) |
| n257, n258, n259, n260, n261, n262 | $\Delta P = 0$ | 0 |
| | $0 < \Delta P \le 2$ | 1.5 |
| | $2 < \Delta P \le 3$ | 2.0 |
| | $3 < \Delta P \le 4$ | 3.0 |
| | $4 < \Delta P \le 5$ | 4.0 |
| | $5 < \Delta P \le 10$ | 5.0 |
| | $10 < \Delta P \le 15$ | 7.0 |
| | $15 < \Delta P \le X$ | 8.0 |

NOTE:
X is the value such that $P_{umax,f,c}$ lower bound, $P_{Powerclass} - \Delta P - T(\Delta P) =$ minimum output power specified in clause 6.3.1

RP-213598 discusses one or more objectives and/or justifications for further enhance MIMO in Release 18 (Rel-18) are quoted below 3 Justification MIMO is one of the key technologies in NR systems and is successful in commercial deployment. In Rel-15/16/17, MIMO features were investigated and specified for both FDD and TDD systems, of which major parts were for downlink MIMO operation. In Rel-18, it is important to identify and specify necessary enhancements for uplink MIMO, while necessary enhancements on downlink MIMO that facilitate the use of large antenna array, not only for FR1 but also for FR2, would still need to be introduced to fulfil the request for evolution of NR deployments. This comprises the following areas of enhancement. With the introduction of features for UL panel selection in Rel-17, advanced UEs (e.g. CPE, FWA, vehicle, industrial devices) can benefit from higher UL coverage and average throughput with simultaneous UL multi-panel transmission. Finally, some further enhancement to facilitate UL multi-TRP deployments via two timing advances (TAs) and enhanced UL power control can offer additional UL performance improvement.

4 Objective 4.1 Objective of SI or Core Part WI or Testing Part WI

The detailed objectives are as follows:

RAN1:

Study, and if needed, specify the following items to facilitate simultaneous multi-panel UL transmission for higher UL throughput/reliability, focusing on FR2 and multi-TRP, assuming up to 2 TRPs and up to 2 panels, targeting CPE/FWA/vehicle/industrial devices (if applicable)

UL precoding indication for PUSCH, where no new codebook is introduced for multi-panel simultaneous transmission The total number of layers is up to four across all panels and total number of codewords is up to two across all panels, considering single DCI and multi-DCI based multi-TRP operation.

UL beam indication for PUCCH/PUSCH, where unified TCI framework extension in objective 2 is assumed, considering single DCI and multi-DCI based multi-TRP operation For the case of multi-DCI based multi-TRP operation, only PUSCH+PUSCH, or PUCCH+PUCCH is transmitted across two panels in a same CC.

One, some and/or all of the following terminology and assumptions may be used hereafter.

Base station (BS): a network central unit and/or a network node in New Radio (NR) that is used to control one or more transmission and/or reception points (TRPs) which are associated with one or more cells. Communication between a base station and one or more TRPs may be via fronthaul. Base station may be referred to as central unit (CU), eNB, gNB, and/or NodeB.

TRP: a TRP may provide network coverage and/or may directly communicate with UEs. A TRP may be referred to as distributed unit (DU) and/or network node.

Cell: a cell comprises one or more associated TRPs (e.g., coverage of the cell may comprise coverage of some and/or all associated TRP(s)). One cell may be controlled by one base station. Cell may be referred to as TRP group (TRPG).

In NR Rel-15/16 (NR Releases 15 and/or 16), a UE may perform uplink transmission via one UE panel. In NR Rel-17 (NR Release 17), a UE may perform uplink transmission via multiple UE panels in time division multiplexing (TDM) mechanism (in order to fulfill stringent reliability requirement, for example). For example, the UE may perform uplink transmission via one active UE panel in one timing (e.g., one slot). Through transmission on different UE panels, reliability of the transmission may be improved (and/or the transmission may fulfill more stringent reliability requirements). However, in NR Rel-18 (NR Release 18), with the introduction of more services requiring high data rate, higher rank uplink transmission may be considered. In some implementations, multiple UE panels may be utilized for concurrent (e.g., simultaneous) uplink transmission to provide higher data rate via spatial domain. For example, more than one active UE panel may be used (and/or considered) a given time (e.g., a UE may use multiple active UE panels for an uplink transmission in a given time). Alternatively and/or additionally, services with reliability and latency may also be improved by concurrent (e.g., simultaneous) uplink transmission via different UE panels (e.g., concurrently performing uplink transmission via different UE panels may fulfill more stringent reliability and/or latency requirements). Time-frequency resources for concurrent (e.g., simultaneous) transmissions via the multiple panels may be the same time-frequency resource. Alternatively and/or additionally, the time-frequency resources for concurrent (e.g., simultaneous) transmissions via the multiple panels may have at least partially overlapping time resources and/or at least partially overlapping frequency resources (such as where a time-frequency resource for a transmission via a first panel at least partially overlaps in time domain or frequency domain with a time-frequency resource for a transmission via a second panel). However, concurrent (e.g., simultaneous) uplink transmissions (on one carrier, for example) via more than one UE panel may require enhanced UE capability. Even when a network identifies and/or recognizes that a UE has capability for concurrent (e.g., simultaneous) uplink transmission via more than one UE panel, it may be unclear how, when and/or under which conditions the network may schedule UE to perform concurrent (e.g., simultaneous) uplink transmission via multiple UE panels. Alternatively and/or additionally, how the network can determine (e.g., be aware of) when concurrent (e.g., simultaneous) uplink transmission is not available (such as due to Maximum Possible Exposure (MPE) limitation and/or power limitation) may need further design. Without a proper design, the UE may consider one Downlink Control Information (DCI) scheduling uplink transmission via multiple UE panels to be an inconsistent DCI due to unavailable transmission via multiple UE panels or the UE may consider that the one DCI is scheduling an uplink transmission of one active panel (when the DCI is actually scheduling uplink transmission of multiple UE panels, for example) resulting in different understandings between the network and the UE. Thus, how to align the network and the UE (e.g., how to align understandings of the network and the UE) regarding concurrent (e.g., simultaneous) uplink transmission via multiple UE panels may require further design.

In some examples, a UE is capable of performing concurrent (e.g., simultaneous) uplink transmission via multiple UE panels (e.g., multiple separate and/or different UE panels). The UE may switch from concurrent (e.g., simultaneous) uplink transmission (e.g., concurrent uplink transmission via multiple UE panels) to single uplink transmission (e.g., uplink transmission via one of multiple UE panel at a given time). Alternatively and/or additionally, the UE may switch from single uplink transmission (e.g., uplink transmission via one multiple UE panel at a given time) to concurrent (e.g., simultaneous) uplink transmission (e.g., concurrent uplink transmission via multiple UE panels).

In NR, Physical Uplink Shared Channel (PUSCH) transmission may be non-codebook (NCB)-based or codebook (CB)-based. For CB-based PUSCH, a Sounding Reference Signal (SRS) resource set for CB PUSCH may be configured to UE (e.g., the UE may be configured with the SRS resource set for CB PUSCH) and a network may determine uplink channel condition and identify which UE beam is preferred (e.g., strong Reference Signal Received Power (RSRP) and/or less interference) based on measuring SRS in the SRS resource set. In some examples, the UE beam may be selected based on a determination (e.g., a determination based on measuring one or more SRSs in the SRS resource set) that the UE beam has a strong RSRP (e.g., a RSRP that is higher than a threshold and/or higher than other RSRPs of one or more other UE beams) and/or less interference (e.g., less interference than a threshold and/or less interference than one or more other UE beams). The network may schedule CB PUSCH via DCI indicating Transmit Precoding Matrix Index (TPMI) (for indicating precoding in UE side, for example) and SRS Resource Indicator (SRI) (for indicating which beam and/or power related control to use, for example).

For NCB-based PUSCH, an SRS resource set for NCB PUSCH may be configured to UE (e.g., the UE may be configured with the SRS resource set for NCB PUSCH) and a network may determine uplink channel condition and identify which UE beam is preferred (e.g., strong RSRP and/or less interference) based on a Channel State Information (CSI) report of the UE (e.g., a CSI report associated with the UE, such as a CSI report transmitted by the UE). In some examples, the UE beam may be selected based on a determination (e.g., a determination based on the CSI report of the UE) that the UE beam has a strong RSRP (e.g., a RSRP that is higher than a threshold and/or higher than other RSRPs of one or more other UE beams) and/or less interference (e.g., less interference than a threshold and/or less interference than one or more other UE beams). NCB-based PUSCH may be based on downlink/uplink (DL/UL) channel reciprocity. The network may schedule NCB PUSCH via DCI indicating SRI (for indicating which beam and power related control to use, for example). The UE may determine which precoding to use based on a Channel State Information based Reference Signal (CSI-RS) associated with the SRI.

Figure 12:
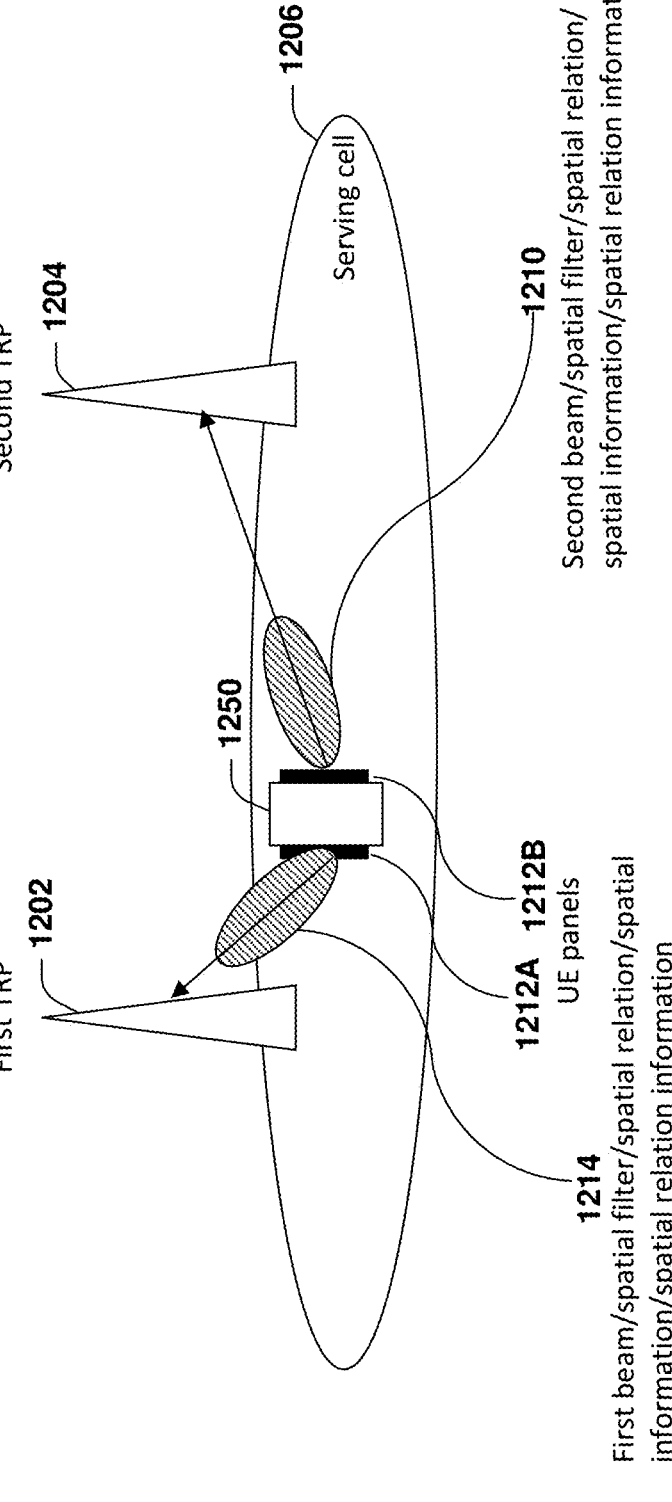
FIG. 12 is a diagram illustrating an exemplary scenario associated with a UE, a first TRP and/or a second TRP according to one exemplary embodiment.

In some examples, a UE may communicate with a plurality of TRPs comprising a first TRP and a second TRP. FIG. 12 illustrates a scenario 1200 in which the UE (shown with reference number 1250) communicates with the first TRP (shown with reference number 1202) and the second TRP (shown with reference number 1204) in a serving cell 1206 (e.g., a single serving cell). For example, in the scenario 1200, the first TRP 1202 and the second TRP 1204 may both be in the serving cell 1206.

Figure 13:
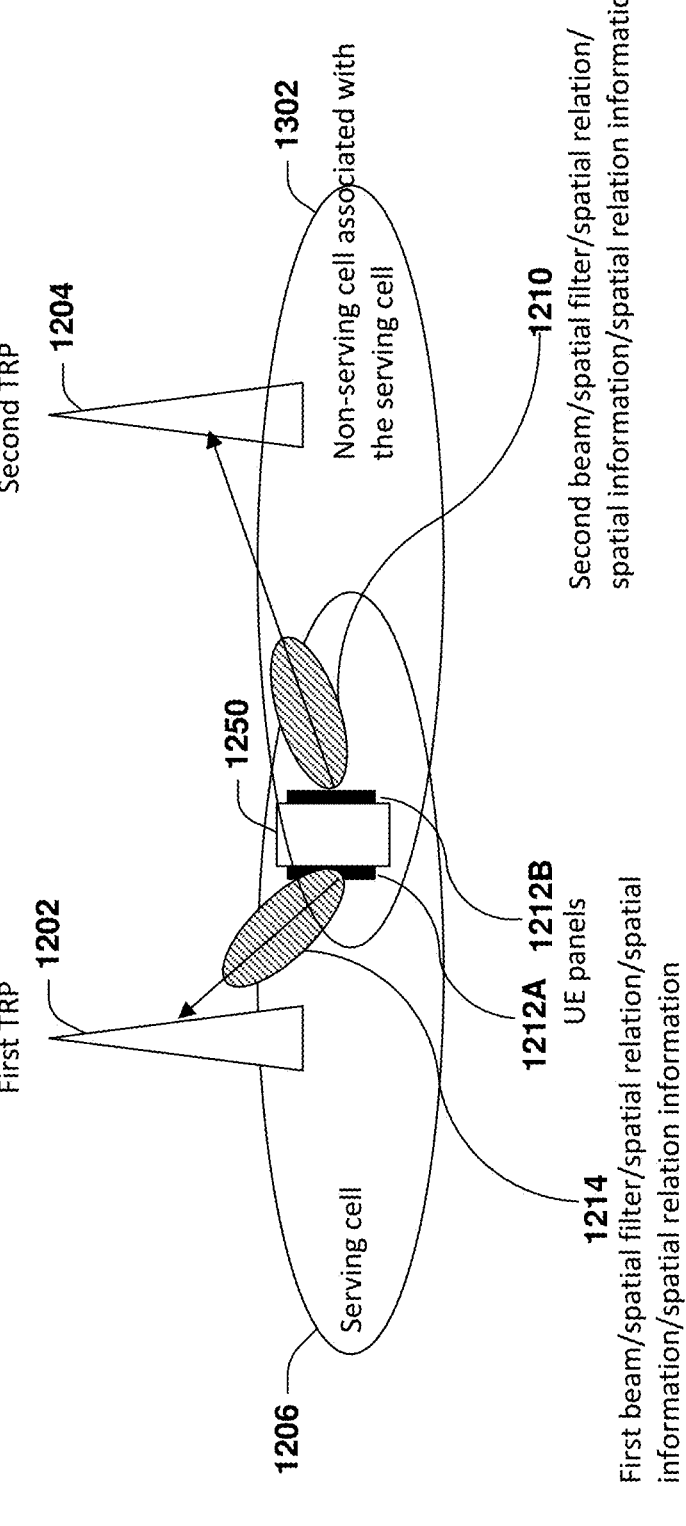
FIG. 13 is a diagram illustrating an exemplary scenario associated with a UE, a first TRP and/or a second TRP according to one exemplary embodiment.

FIG. 13 illustrates a scenario 1300 in which the UE 1250 communicates with the first TRP 1202 and the second TRP 1204, wherein the first TRP 1202 is in the serving cell 1206 and the second TRP 1204 is in a cell 1302, such as a non-serving cell and/or a neighbor cell. For example, rather than both the first TRP 1202 and the second TRP 1204 being in the serving cell 1206 (such as shown in the scenario 1200 of FIG. 12), the first TRP 1202 and the second TRP 1204 may be in different cells in the scenario 1300.

In some examples, such as in the scenario 1200 shown in FIG. 12 and in the scenario 1300 shown in FIG. 13, the UE 1250 may communicate with the first TRP 1202 via a first UE panel 1212A and/or the UE 1250 may communicate with the second TRP 1204 via a second UE panel 1212B. In some examples, communication between the first TRP 1202 and the UE 1250 may be via a first beam/spatial filter/spatial relation/spatial information/spatial relation information 1214. In the present disclosure, the term "beam/spatial filter/spatial relation/spatial information/spatial relation information" may correspond to a beam, a spatial filter, a spatial relation, spatial information and/or spatial relation information. In some examples, communication between the second TRP 1204 and the UE 1250 may be via a second beam/spatial filter/spatial relation/spatial information/spatial relation information 1210.

In some examples, such as in the scenario 1200 shown in FIG. 12 and in the scenario 1300 shown in FIG. 13, the UE may perform (e.g., transmit) a first uplink transmission via the first beam/spatial filter/spatial relation/spatial information/spatial relation information 1214 (e.g., the first uplink transmission may be transmitted to the first TRP 1202). In some examples, the UE may perform (e.g., transmit) a second uplink transmission via the second beam/spatial filter/spatial relation/spatial information/spatial relation information 1210 (e.g., the second uplink transmission may be transmitted to the second TRP 1204). The first uplink transmission and the second uplink transmission may be performed (e.g., transmitted by the UE) concurrently (e.g., simultaneously).

As for Physical Downlink Shared Channel (PDSCH) in NR Rel-15, UE may receive Medium Access Control (MAC) Control Element (CE) (e.g., discussed in Section 6.1.3.14 in 3GPP TS 38.321 V17.0.0) for indicating up to 8 Transmission Configuration Indicator (TCI) states among a maximum number of TCI states (e.g., a maximum number of configured TCI states), such as 128 configured TCI states. UE may receive DCI with TCI field indicating a code-point (e.g., one code-point) associated with the MAC CE indicating TCI state. In NR Rel-15, a beam indication for receiving a downlink (DL) transmission may consider (e.g., may only consider) transmission from a single TRP and/or transmission using a panel within a time duration (e.g., a time duration of at least one of one or more slots such as one slot, one or more mini-slots such as one mini-slot, etc.), such as from the perspective of UE.

In NR Rel-16, downlink transmission from multiple TRPs and/or multiple panels may be considered. For transmission from multiple TRPs and/or multiple panels, it may be implied that a single downlink transmission (e.g., transmission for a single Transport Block (TB)) may be performed using different beams from multiple TRPs and/or multiple panels (e.g., for transmission from multiple TRPs and/or multiple panels, it may be implied that a single downlink transmission may be performed using different beams from multiple TRPs and/or multiple panels). Alternatively and/or additionally, (for transmission from multiple TRPs and/or multiple panels, for example) it may be implied that a UE may receive multiple downlink transmissions from multiple TRPs and/or multiple panels within a time duration (e.g., a time duration of at least one of one or more slots such as one slot, one or more mini-slots such as one mini-slot, etc.). In NR Rel-16, one or more enhancements to ultra-reliable and low latency communications (URLLC) with consideration of multiple TRP scenario have been made. Alternatively and/or additionally, one or more Physical Downlink Shared Channel (PDSCH) repetition schemes may be used to improve reliability of receiving PDSCH. For example, the one or more PDSCH repetition schemes may comprise at least one of a Spatial Division Multiplexing (SDM) repetition scheme, a Frequency Division Multiplexing (FDM) repetition scheme, a mini-slot-based repetition scheme, a slot based repetition scheme, etc. With multiple TRP (mTRP) PDSCH, a TB (e.g., one TB) may be transmitted by multiple beams, TCI states and/or spatial relations. In order to indicate two TCI states for mTRP by a single DCI, a MAC CE (e.g., discussed in Section 6.1.3.24 in 3GPP TS 38.321

V17.0.0) may be used for associating one or more code-points of a TCI field to one or more TCI state IDs. In some examples, a MAC CE may associate up to 16 TCI state IDs (e.g., the MAC CE may associate one or more code-points of the TCI field to up to 16 TCI state IDs), and a field (e.g., field $P_i$, which may correspond to a field in a unified TCI state activation/deactivation MAC CE shown in FIG. 8) may indicate either one TCI state or two TCI states for a code-point of a TCI field (e.g., the code-point of the TCI field may be associated with one or two TCI states). In some examples, a UE may receive a DCI with a TCI field indicating a code-point (e.g., one code-point), and if the one code-point indicates one TCI state as MAC CE associating (e.g., if the MAC CE indicates that the one-code-point is associated with only one TCI state), the UE may consider single TRP (e.g., the UE may determine that the MAC CE and/or the on-code-point is associated with only a single TRP and/or may perform single TRP operation), while if the one code-point indicates two TCI states as MAC CE associating (e.g., if the MAC CE indicates that the one-code-point is associated with two TCI states), the UE may consider mTRP (e.g., the UE may determine that the MAC CE and/or the on-code-point is associated with multiple TRPs and/or may perform mTRP operation).

For uplink power control, a UE may determine PUSCH/ Physical Uplink Control Channel (PUCCH) transmit power (which may also be referred to as "transmission power") based on one or more formulas (e.g., discussed in Sections 7.1.1 and/or 7.2.1 in 3GPP TS 38.321 V17.0.0). In the present disclosure, the term PUSCH/PUCCH may refer to a PUSCH and/or a PUCCH. The following formula for calculating transmit power of PUSCH is quoted from Section 7.1.1 in 3GPP TS 38.321 V17.0.0):

$$P_{PUSCH,b,f,c}(i, j, q_d, l) =$$

$$\min\begin{cases} P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i,\,,l) \end{cases}$$

$$[\text{decibel−milliwatts (dBm)}]$$

In some examples, there is a UE configured maximum output power defined in 3GPP TS 38.101-2 V17.2.0. The UE may avoid performing a transmission that exceeds the UE configured maximum output power.

In some examples, there is a target power (e.g., $P_{O\_PUSCH,b,f,c}(j)$), which may be a sum of a nominal target power (e.g., $P_{O\_NOMINAL,PUSCH,f,c}(j)$) derived from Random Access Channel (RACH) procedure and a UE target power (e.g., $P_{O\_UE\_PUSCH,b,f,c}(j)$/P0). Target power may correspond to a target received power in network node (which may also be referred to as network side).

In some examples, there is a pathloss compensation (e.g., alpha/$\alpha_{b,f,c}(j)$).

In some examples, there is a pathloss value (e.g., $PL_{b,f,c}$ ($q_d$)) derived from pathloss Reference Signal (RS).

In some examples, there is a closed loop index (e.g., l) which may associate a Transmit Power Command (TPC) command in DCI to a closed loop. The TPC command may be accumulated to a current closed loop power control and/or may be used (e.g., directly used) as closed loop power control. The TPC command may be associated with a closed loop with index (l).

In Rel-16, in order to meet traffic with stringent reliability (e.g., URLLC traffic), uplink power control may be enhanced. gNB may have flexibility to adjust UE target power ($P_{O\_UE\_PUSCH,b,f,c}(j)$/P0) to be a more aggressive target received power (e.g., which may result in higher transmit power of a UE, for example). In an example, gNB may configure (e.g., previously configure) a UE with one or more second UE target powers which may be different or the same as one or more first UE target powers (with which the UE is currently configured, for example). Based on the one or more second UE target powers and/or the one or more first UE target powers), when gNB needs to schedule traffic (e.g., traffic with stringent reliability, such as URLLC traffic), gNB may transmit uplink grant (e.g., DCI format 0_1/0_2) providing information indicating which target power of the one or more first UE target powers and/or the one or more second UE target powers are to be used.

In NR Rel-17, there may be an attempt to have a unified beam indication framework for DL and UL, for UE-specific DL channel and/or signal, and/or for UE-specific UL channel and/or signal. A motivation (e.g., a motivation to have the unified beam indication framework) may be to reduce signaling overhead and have a unified framework for DL channels and/or signals and/or for UL channels and/or signals. A motivation (e.g., a motivation to have the unified beam indication framework) may be that a UE (in most real deployments, for example) may use one or more same UE beams for downlink reception and/or one or more same UE beams for uplink transmission. Alternatively and/or additionally, in a Frequency Range 2 (FR2) band (e.g., a typical FR2 band), since beam correspondence may be a major scenario and/or issue, it may be justified to have a joint beam (e.g., one joint beam) for DL and UL. However, due to some MPE issues for some UE beams (e.g., regulation considering maximum transmit power restriction toward human body with respect to some UE beams), joint beam for DL and UL cannot be guaranteed while separate beam indication for DL and UL may be useful for this scenario. As for separate DL/UL TCI state, with respect to signaling overhead, beam indication for two TCI states corresponding to DL TCI state and UL TCI state may be considered. Uplink Power Control (UL PC) may be based on one or more channel-specific parameters, one or more beam-specific parameters and/or one or more TCI state-specific parameters.

A UE may be configured with a channel-specific UL PC for each of PUSCH, PUCCH, and/or SRS. The UE transmits PUSCH, PUCCH, and/or SRS based on a channel-specific UL PC. In an example, the channel-specific UL PC is used when the UE provided with (and/or indicated by) a UL TCI state or joint TCI state that does not provide UL PC. In an example, the UE may be configured with a first channel-specific UL PC for PUSCH, a second channel-specific UL PC for PUCCH, and/or a third channel-specific UL PC for SRS. In one example, all PUSCH (regardless of which beam/TCI state, for example) are associated with the first channel-specific UL PC for PUSCH. In another example, the first channel-specific UL PC is merely associated with one or more PUSCHs that are associated with one or more TCI states (e.g., unified TCI state) for UL that do not comprise UL PC (e.g., a TCI state of a PUSCH comprising a UL PC may indicate that there is beam-specific UL PC). In an example, the first channel-specific UL PC may not be used for one or more PUSCHs that are associated with one or more TCI states (e.g., unified TCI state) for UL that comprise UL PC (e.g., the first channel-specific UL PC may not be used for one or more PUSCHs that are associated with one or more TCI states that are associated with beam-specific UL PC). One rationale for introducing and/or implementing channel-specific UL PC is to save signaling overhead (as there is no need or a reduced need to having each TCI state comprise a UL PC, for example). For example, each TCI state comprising up to three UL PCs for PUSCH, PUCCH, and SRS, respectively, may cause increased signaling overhead.

A UE may be configured with beam-specific UL PC for one or more TCI states. The UE transmits PUSCH, PUCCH, and/or SRS based on a beam-specific UL PC. The beam-specific UL PC is used when the UE is provided with (and/or indicated by) a UL TCI state and/or a joint TCI state comprising UL PC. In an example, the UE receives a beam indication signaling indicating a joint TCI state (e.g., one joint TCI state) and/or an UL TCI state, wherein the indicated TCI state (e.g., the joint TCI state and/or the UL TCI state indicated by the beam indication signaling) comprises UL PC (which may be referred to as a beam-specific UL PC). For PUSCH, PUCCH and/or SRS that are associated with (and/or share) the indicated TCI state (e.g., unified TCI state), the UE may transmit the PUSCH, the PUCCH, and/or the SRS based on UL PC (e.g., beam-specific UL PC) provided by the indicated TCI state.

In Rel-15, Power Headroom Report (PHR) is triggered when a pathloss change exceeds a threshold (and/or when one or more other conditions are met). After (and/or since) the triggered PHR, a first DCI (e.g., an earliest DCI) scheduling new uplink transmission is received at UE side (e.g., received by a UE), and the UE may transmit PHR for one or more cells on the new uplink transmission scheduled by the first DCI. The PHR on the new uplink transmission may be transmitted via PHR MAC CE.

Figure 14:
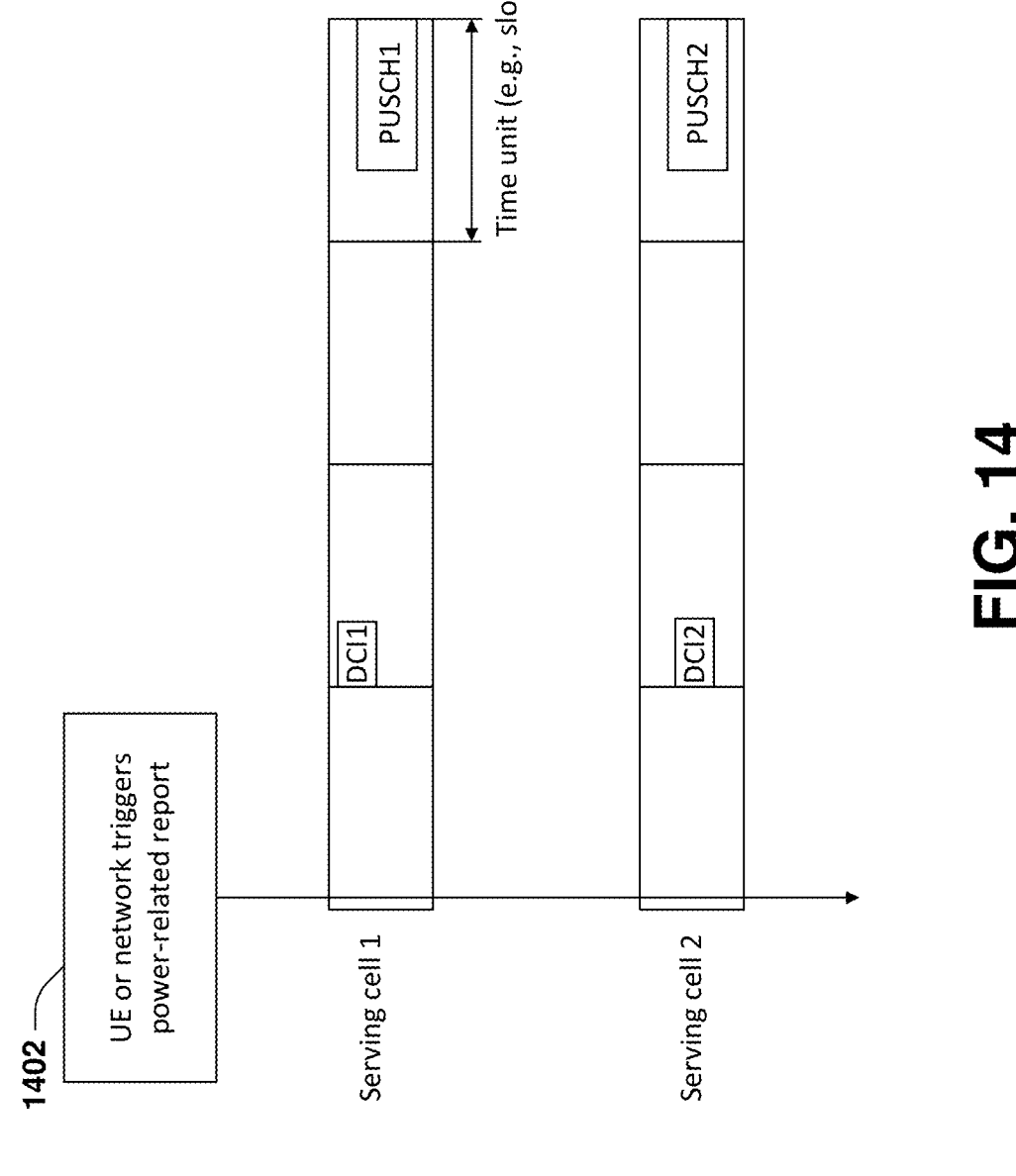
FIG. 14 is a diagram illustrating an exemplary scenario associated with serving cells according to one exemplary embodiment.

FIG. 14 illustrates an example scenario 1400 associated with two serving cells comprising serving cell 1 and serving cell 2. In the example scenario 1400, PHR may be triggered 1402 (e.g., the PHR may be triggered by the UE or a network node), and after the triggered PHR (e.g., after triggering 1402 the PHR), there are multiple DCIs (comprising DCI1 and DCI2) on the same Physical Downlink Control Channel (PDCCH) monitoring occasion in different serving cells. DCI1 (which is associated with serving cell 1, for example) may schedule PUSCH1 and/or DCI2 (which is associated with serving cell 2, for example) schedules PUSCH2. In the example scenario 1400 regardless of whether the UE transmits PHR on PUSCH1 or transmits PHR on PUSCH2, the PHR MAC CE (transmitted on PUSCH1 or PUSCH2, for example) may comprise information related to serving cell 1 and serving cell 2 (and also may comprise PHR derived based on transmit power of PUSCH1 and PHR derived based on transmit power of PUSCH2, for example), and/or the network node may determine, for each serving cell, a power difference between a current transmit power and UE's maximum power. However, when it comes to concurrent (e.g., simultaneous) uplink transmission (in Rel-18, for example), there may be a problem as the UE may transmit two PUSCHs concurrently (e.g., the two PUSCHs may at least partially overlap in time domain) in one serving cell (e.g., the UE may transmit the two PUSCHs concurrently, such as simultaneously, I the same serving cell).

Figure 15:
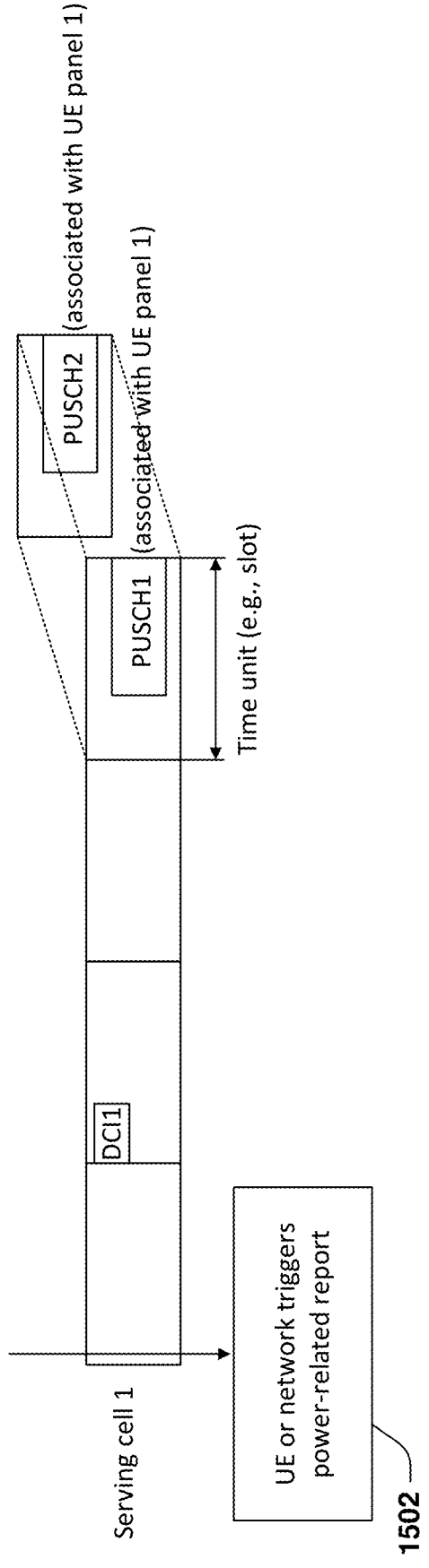
FIG. 15 is a diagram illustrating an exemplary scenario associated with a serving cell according to one exemplary embodiment.

FIG. 15 illustrates an example scenario 1500 associated with serving cell 1. In the example scenario 1500, PHR may be triggered 1502 (e.g., the PHR may be triggered by the UE or a network node), and after the triggered PHR (e.g., after triggering 1502 the PHR), there is a DCI (e.g., a single DCI) "DCI1" scheduling multiple TRPs. DCI1 may schedule PUSCH1 and PUSCH2. PUSCH1 and PUSCH2 may be transmitted concurrently (e.g., simultaneously). PUSCH1 may be associated with UE panel 1 (e.g., PUSCH1 may be transmitted via UE panel 1), and/or PUSCH2 may be associated with UE panel 2 (e.g., PUSCH2 may be transmitted via UE panel 2). In the example scenario 1500, when the network node receives a PHR MAC CE comprising PHR for serving cell 1, the network node does not know (and/or is not able to determine) whether the PHR for serving cell 1 is based on PUSCH1 or based on PUSCH2. In some examples (e.g., in legacy case), since there is one PHR for one serving cell, and the one PHR is based on an earliest overlapping uplink transmission as the slot for transmitting PHR MAC CE, however, as there are two overlapping scheduled PUSCH for serving cell1 (e.g., PUSCH1 and PUSCH 2), determining which PUSCH a PHR is based on may be difficult and/or impossible, and may lead to misalignment between the network node and UE (e.g., the UE generates a PHR based on PUSCH1, but the network node thinks that the PHR is based on PUSCH2, and makes one or more decisions based on the incorrect determination that the PHR is based on PUSCH2).

Figure 16:
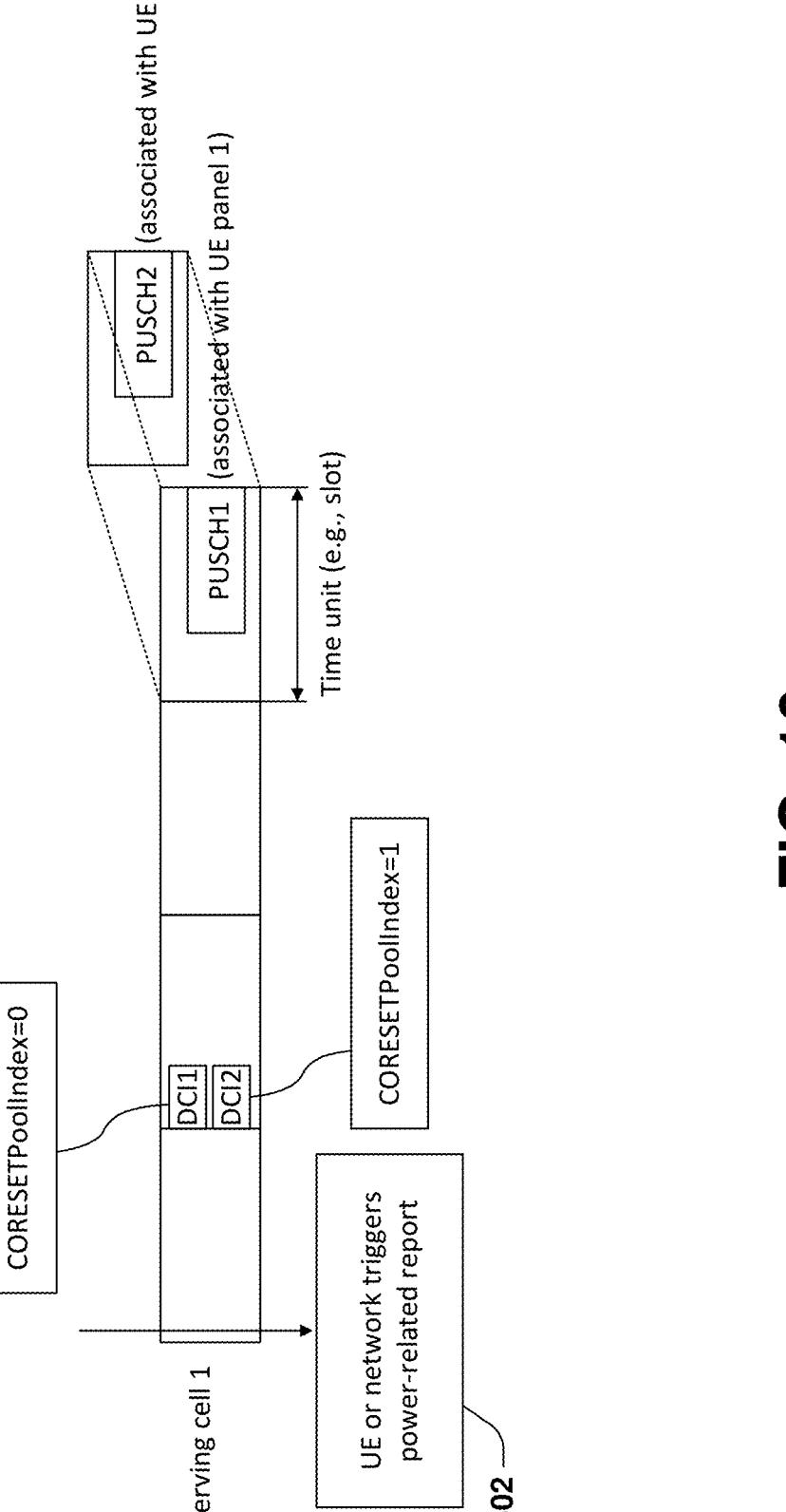
FIG. 16 is a diagram illustrating an exemplary scenario associated with a serving cell according to one exemplary embodiment.

FIG. 16 illustrates an example scenario 1600 associated with serving cell 1. In the example scenario 1600, PHR may be triggered 1602 (e.g., the PHR may be triggered by the UE or a network node), and after the triggered PHR (e.g., after triggering 1602 the PHR), there are multiple DCIs (comprising DCI1 and DCI2) scheduling a DCI (e.g., a single DCI) "DCI1" considering multiple DCI scheduling multiple TRPs. DCI1 may schedule PUSCH1 and DCI2 may schedule PUSCH2. PUSCH1 and PUSCH2 may be transmitted concurrently (e.g., simultaneously). PUSCH1 may be associated with UE panel 1 (e.g., PUSCH1 may be transmitted via UE panel 1), and/or PUSCH2 may be associated with UE panel 2 (e.g., PUSCH2 may be transmitted via UE panel 2). DCI1 is associated with a first Control Resource Set (CORESET) with CORESETPoolIndex=0 and DCI2 is associated with a second CORESET with CORESETPoolIndex=1. DCI1 and DCI2 may correspond to the same PDCCH monitoring occasion (e.g., DCI1 and DCI2 may be received, monitored and/or detected in the same PDCCH monitoring occasion). In some examples, a PDCCH monitoring occasion (e.g., one PDCCH monitoring occasion) with same starting orthogonal frequency-division multiplexing (OFDM) symbol may be for a corresponding CORESET for DCI1 and/or DCI2, respectively.

In some examples, there is a need to design a mechanism to enable the UE to determine which uplink transmission to use to generate a PHR for a serving cell.

In some examples, there is a need to align understanding between UE and gNB regarding which uplink transmission a reported PHR is for.

In some examples, a PHR MAC CE may be transmitted on a first cell (by a first UE, for example). There may be two PUSCHs being transmitted (by the first UE, for example) on a second cell. The two PUSCHs may overlap (e.g., at least partially overlap) with a slot for transmitting the PHR MAC CE.

In some examples, a UE (e.g., the first UE) is not configured with reporting two PHRs for one serving cell.

In some examples, a UE (e.g., the first UE) may be configured with reporting two PHRs for one serving cell.

In some examples, a UE (e.g., the first UE) has capability to concurrently (e.g., simultaneously) transmit two PUSCHs on one serving cell.

In some examples, a UE (e.g., the first UE) has capability to concurrently (e.g., simultaneously) transmit two PUCCHs on one serving cell.

A first concept of the present disclosure is that a UE determines (e.g., derives) a PHR for a second serving cell based on a first PUSCH. When the UE reports (e.g., transmits) a PHR MAC CE comprising the PHR for the second serving cell, an understanding of the UE and the network node on which PUSCH was used for determining the PHR may be aligned with each other (e.g., the UE and the network node may both correctly identify which PUSCH is associated with the PHR). The first concept includes some explicitly provided techniques and/or methods and/or some implicit and/or predetermined techniques and/or methods for determining the first PUSCH.

There are multiple (e.g., two) PUSCHs on the second serving cell. The multiplePUSCHs comprise the first PUSCH and a second PUSCH. In some examples, the first PUSCH and the second PUSCH at least partially overlap with each other in time domain (e.g., the first PUSCH and the second PUSCH are partially overlapped or fully overlapped in time domain). In some examples, the first PUSCH and the second PUSCH may at least partially overlap with each other in frequency domain or may not overlap with each other in frequency domain (e.g., the first PUSCH and the second PUSCH are partially overlapped or fully overlapped or non-overlapped in frequency domain). The UE transmits one or more PHRs and/or the PHR MAC CE on a third PUSCH in a slot. In some examples, the first PUSCH and the second PUSCH (on the second serving cell, for example) at least partially overlap with the slot for transmitting the PHR MAC CE. In some examples, a starting symbol of the second PUSCH is the same as the starting symbol of the first PUSCH.

The UE is configured to report a PHR (e.g., one PHR). For example, the UE may be configured to report a PHR (e.g., one PHR) for the second serving cell (and/or for one or more other serving cells in addition to the second serving cell, for example). In some examples, the UE transmits one or more PHRs for one or more corresponding serving cells. In some examples, the UE transmits one or more PHRs on the first serving cell or the second serving cell. In some examples, the one or more PHRs comprise the PHR for the second serving cell (and/or one or more other PHRs, for one or more other serving cells, in addition to the PHR for the second serving cell). In some examples, the one or more PHRs are transmitted via a PHR MAC CE.

In some examples, the first PUSCH is determined (e.g., derived) based on a smaller or larger index of a TRP-related index. The TRP-related index may be CORESETPoolIndex and/or SRS resource set index.

In some examples, the first PUSCH is determined (e.g., derived and/or selected for use in determining the PHR for the second serving cell) based on a smaller or larger index of a CORESETPoolIndex associated with CORESET for a DCI which schedules the first PUSCH. For example, the first PUSCH may be scheduled by a first DCI in a CORESET associated with CORESETPoolIndex=0 while the second PUSCH may be scheduled by a second DCI in a CORESET associated with CORESETPoolIndex=1. The first PUSCH may be determined (e.g., selected) for use in determining the PHR for the second serving cell based on a determination that the first PUSCH is scheduled by a DCI (e.g., the first DCI) in a CORESET that is associated with a smaller CORESETPoolIndex and/or CORESETPoolIndex=0 (e.g., CORESETPoolIndex=0 of the CORESET associated with the first DCI which schedules the first PUSCH is smaller than CORESETPoolIndex=1 of the CORESET associated with the second DCI which schedules the second PUSCH, and thus the first PUSCH, and not the second PUSCH, may be used to determine the PHR for the second serving cell).

In some examples, the first PUSCH is determined (e.g., derived and/or selected for use in determining the PHR for the second serving cell) based on a smaller or larger index of a SRS resource set index. The first PUSCH may correspond to a first SRS resource set and/or the second PUSCH may correspond to a second SRS resource set. Both the first SRS resource set and the second SRS resource set are associated with "non-codebook" based SRS resource sets or "codebook" based resource sets. The first SRS resource set is associated with a smaller SRS resource set index than the second SRS resource set. The first PUSCH may be determined (e.g., selected) for use in determining the PHR for the second serving cell based on a determination that the first PUSCH is scheduled by a DCI (e.g., and thus the first PUSCH, and not the second PUSCH, may be used to determine the PHR for the second serving cell).

The first PUSCH is determined (e.g., derived and/or selected for use in determining the PHR for the second serving cell) based on 1-st UL/joint TCI state and/or 2-nd UL/joint TCI state. In the present disclosure, the term "UL/joint" may refer to UL and/or joint. For example, a UL/joint TCI state may correspond to a TCI state that is a UL TCI state and/or is a joint TCI state. In some examples, the UE may receive an activation DCI for indicating a code-point (e.g., one code-point) comprising two UL/joint TCI states comprising 1-st UL/joint TCI state and 2-nd UL/joint TCI state. One of the two UL/joint TCI states may be associated with the first PUSCH and/or another of the two UL/joint TCI states may be associated with the second PUSCH. In some examples, the 1-st UL/joint TCI state and/or the 2-nd UL/joint TCI state may be based on an order of the code-point (e.g., the 1-st UL/joint TCI state and/or the 2-nd UL/joint TCI state may be based on increasing or decreasing order of octet index). In an example, the 1-st UL/joint TCI state may correspond to an initial TCI state in the code-point, and/or the 2-nd UL/joint TCI state may correspond to a TCI state following the 1-st UL/joint TCI state. In an example, the first PUSCH may be determined (e.g., selected) for use in determining the PHR for the second serving cell based on a determination that the first PUSCH is associated with the 1-st UL/joint TCI state (which may be determined based on the order of the code-point, for example).

The first PUSCH is determined (e.g., derived and/or selected for use in determining the PHR for the second serving cell) based on which TCI state is associated with a RS and/or a Physical Cell Identity (PCI) of a serving cell. For example, the UE may transmit the first PUSCH via 1-st UL/joint TCI state and may transmit the second PUSCH via 2-nd UL/joint TCI state. The 1-st UL/joint TCI state is associated with a RS and/or a PCI of a serving cell and the 2-nd UL/joint TCI state is associated with a RS and/or a PCI of non-serving cell. In an example, the first PUSCH may be determined (e.g., selected) for use in determining the PHR for the second serving cell based on serving cell criteria (e.g., based on a determination that the first PUSCH is associated with the RS and/or the PCI of the serving cell). For example, the second PUSCH may not be determined (e.g., selected) for use in determining the PHR for the second serving cell since the second PUSCH is associated with the RS and/or the PCI of the non-serving cell (rather than the serving cell, for example).

The first PUSCH is determined (e.g., derived and/or selected for use in determining the PHR for the second serving cell) based on which PUSCH carries the PHR MAC CE (which carries the PHR for the second serving cell, for example). This may require a single serving cell or the UE transmitting PHR MAC CE via one or more resources of a serving cell (e.g., the single serving cell) with concurrent (e.g., simultaneous) transmission. In some examples, there is no other serving cell (e.g., other than the single serving cell) with scheduled concurrent (e.g., simultaneous) UL transmission. In some examples, the first PUSCH may be determined (e.g., selected) for use in determining the PHR for the second serving cell based on a determination that the first PUSCH is to be used for transmitting the PHR MAC CE. In an example, if the UE determines to transmit PHR MAC CE via the first PUSCH, the PHR for the second serving cell may be based on a transmit power of the first PUSCH. Alternatively and/or additionally, if the UE determines to transmit PHR MAC CE via the second PUSCH, the PHR for the second serving cell may be based on a transmit power of the second PUSCH.

The first PUSCH is determined (e.g., derived and/or selected for use in determining the PHR for the second serving cell) based on which PUSCH is scheduled first (e.g., the first PUSCH may be selected based on a determination that the first PUSCH is before the second PUSCH, and/or based on a determination that a time at which the first PUSCH is scheduled is before a time at which the second PUSCH is scheduled) or an associated SRS resource set (for PUSCH) is scheduled first (e.g., the first PUSCH may be selected based on a determination that a SRS resource set for the first PUSCH is before a SRS resource set for the second PUSCH, and/or based on a determination that a time at which the SRS resource set for the first PUSCH is scheduled is before a time at which the SRS resource set for the second PUSCH is scheduled), or as associated UL/joint TCI state (for PUSCH) is scheduled first (e.g., the first PUSCH may be selected based on a determination that a UL/joint TCI state for the first PUSCH is before a UL/joint TCI state for the second PUSCH, and/or based on a determination that a time at which the UL/joint TCI state for the first PUSCH is scheduled is before a time at which the UL/joint TCI state for the second PUSCH is scheduled). In an example, when a scheduling DCI indicates information comprising "2-nd UL/joint TCI state then 1-st UL/joint TCI state", the first PUSCH is the PUSCH associated with 2-nd UL/joint TCI state. In an example, when a scheduling DCI indicates information as "second SRS resource set then first SRS resource set", the first PUSCH is the PUSCH associated with the second SRS resource set. In some examples, this may require single serving cell and/or UE transmitting PHR MAC CE via one or more resources of a serving cell with concurrent transmission (e.g., simultaneous transmission). In some examples, there is no other serving cell with scheduled concurrent (e.g., simultaneous) UL transmission. In an example, the first PUSCH is determined to be the PUSCH for transmitting the PHR MAC CE. If the UE determines to transmit PHR MAC CE via the first PUSCH, PHR for the (second) serving cell is based on transmit power of the first PUSCH. If the UE determines to transmit PHR MAC CE via the second PUSCH, PHR for the (second) serving cell is based on transmit power of the second PUSCH.

When it comes to flexibility for UE to determine (e.g., derive and/or select for use in determining the PHR for the second serving cell) the first PUSCH among the two concurrently (e.g., simultaneously) transmitted PUSCHs, there may be a need to indicate such information in the PHR MAC CE. For one or more serving cells associated with concurrent UL transmission, each PHR for each one of the one or more serving cell needs be transmitted in conjunction with and/or to be linked to information of which PUSCH is used for determining the PHR (e.g., the information, which may be transmitted with a PHR and/or linked to the PHR, may identify a PUSCH used to determine the PHR). For the two transmitted PUSCHs on a serving cell, UE may determine (e.g., derive and/or calculate) two PHRs based on the two transmitted PUSCHs, and determine (e.g., derive and/or select) a PHR for reporting for the serving cell (e.g., select one PHR from among the two PHRs to report for the serving cell). In some examples, the reported PHR (e.g., one reported PHR) may be PHR which is with absolute higher value or with absolute lower value (e.g., the reported PHR may be selected based on a determination that the reported PHR has a higher or lower absolute value compared to the other PHR of the two PHRs). In some examples, the reported PHR may be PHR which is with higher value or with lower value (e.g., the reported PHR may be selected based on a determination that the reported PHR has a higher or lower value compared to the other PHR of the two PHRs). In some examples, the two PHRs may be combined (e.g., averaged) to determine the reported PHR (e.g., the reported PHR may be average PHR of the two PHRs). When/after the UE determines the reported PHR, one or more bits (e.g., one bit), included in the PHR MAC CE, are used for indicating at least one of a PUSCH, TRP, (currently applied, for example) UL/joint TCI state, etc. associated with the reported PHR (e.g., at least one of the PUSCH, the TRP, the UL/joint TCI state, etc. indicated by the one or more bits may be used for determining the (reported) PHR). In some examples, one or more bits (e.g., one bit) for each PHR for each one serving cell of the one or more serving cells may be included in the PHR MAC CE (e.g., for each serving cell, there is one or more bits, such as one bit, for indicating at least one of a PUSCH, TRP, UL/joint TCI state, etc. associated with a PHR of a corresponding serving cell). There may be one or more octets for indicating information identifying which PUSCH is used for determining PHR. There may be one or more bits for indicating information identifying which PUSCH is used for determining PHR. For example, the first PUSCH and the second PUSCH are scheduled to be transmitted concurrently in the second serving cell. The first PUSCH may be associated with at least one of lower CORESETPoolIndex, lower SRS resources set index, 1-st UL/joint TCI state (of one code-point, for example), etc. and the second PUSCH is associated with at least one of higher CORESETPoolIndex, higher SRS resources set index, 2-nd UL/joint TCI state (of the one code-point), etc. There may be one or more bits (e.g., one bit) for the second serving cell, and the one or more bits (e.g., the one bit) identifies which PUSCH, of the first PUSCH and the second PUSCH, is used to determine the PHR for the second serving cell. For example, "0" may correspond to the first PUSCH (which is with characteristics as described above, for example), and "1" may correspond to the second PUSCH (which is with characteristics as described above, for example). PHR MAC CE may comprise one or more bits associated with the one or more serving cell (which is with concurrent UL transmission, for example). PHR MAC CE may comprise one or more bits associated with serving cells (e.g., active serving cells, all active serving cells and/or all serving cells) (including cells without concurrent UL transmission, for example).

In an example, the UE is configured with serving cells with serving cell indexes 0, 1, 2, 3, 4, 5, 6, 7, wherein serving cells 0 and 1 (e.g., serving cells with indexes 0 and 1) are configured with concurrent (e.g., simultaneous) UL transmissions. PHR MAC CE may comprise 2 bits for indicating information identifying which PUSCH is used for determining PHR for serving cells 0 and 1. PHR MAC CE may comprise 8 bits for indicating information identifying which PUSCH is used for determining PHR for serving cells 0 and 1, wherein 6 bits (of the 8 bits, for example) are reserved bits. The order of the 2 bits is based on order of serving cell index. In an example, if serving cells with concurrent UL transmission are serving cells 0 and 3, the two bits may correspond to serving cells 0 and 3.

In some examples, the UE may determine (e.g., derive and/or calculate) PHR for the second serving cell based on the first PUSCH and another PHR for the second serving cell based on the second PUSCH. The UE may determine a PHR (e.g., one PHR) with higher or lower absolute value (among the two PHRs, for example) for reporting (e.g., the UE may select the one PHR for reporting based on the PHR having a higher or lower absolute value compared to the other PHR of the two PHRs). With this 1 bit for indicating information identifying which PUSCH is used for determining PHR for the second serving cell, the UE has flexibility to determine which PHR reported is beneficial for network node for scheduling.

In some examples, the UE may transmit the same TB on the first PUSCH and the second PUSCH.

In some examples, the UE may transmit different TBs on the first PUSCH and the second PUSCH.

In some examples, the first PUSCH and the second PUSCH may correspond to the same Hybrid Automatic Repeat Request (HARQ) process or may correspond to different HARQ processes.

In some examples, first PUSCH and second PUSCH may be two repetitions associated with a scheduling DCI. In some examples, the scheduling DCI may comprise a specified field indicative of order of UL/joint TCI state associated with the first PUSCH and/or the second PUSCH. For example, 2 bits in the scheduling DCI may indicate "1-st UL/joint TCI state", "2-nd UL/joint TCI state", "1-st UL/joint TCI state then 2-nd UL/joint TCI state", and/or "2-nd UL/joint TCI state then 1-st UL/joint TCI state". In some examples, for "1-st UL/joint TCI state" and/or "2-nd UL/joint TCI state", the UE may determine (e.g., may know) these two indications are for single TRP scheduling (e.g., the UE may interpret "1-st UL/joint TCI state" and/or "2-nd UL/joint TCI state" as being associated with single TRP scheduling). In some examples, for "1-st UL/joint TCI state then 2-nd UL/joint TCI state" and/or "2-nd UL/joint TCI state then 1-st UL/joint TCI state", the UE may determine (e.g., may know) these two indications are for multiple TRP scheduling (e.g., the UE may interpret "1-st UL/joint TCI state then 2-nd UL/joint TCI state" and/or "2-nd UL/joint TCI state then 1-st UL/joint TCI state" as being associated with multiple TRP scheduling). The UE may determine whether to have concurrent (e.g., simultaneous) UL transmission based on another bit field in the scheduling DCI (e.g., multiplexing scheme of two PUSCHs are TDMed, SDMed or FDMed), configuration (e.g., the UE is not configured with concurrent UL transmissions) and/or another DCI (e.g., activation DCI for indicating one code-point comprising one UL/joint TCI state). In some examples, the UE may receive an activation DCI for indicating a code-point (e.g., one code-point) comprising two UL/joint TCI states comprising 1-st UL/joint TCI state and 2-nd UL/joint TCI state. In some examples, based on an order in the one code-point, which TCI state is 1-st UL/joint TCI state may be determined (e.g., which TCI state is 1-st UL/joint TCI state may be based on increasing or decreasing order of octet index). In this example, when the scheduling DCI indicates that "2-nd UL/joint TCI state then 1-st UL/joint TCI state", 2-nd UL/joint TCI state may be associated with the first PUSCH and 1-st UL/joint TCI state may be associated with the second PUSCH. In some examples, the first repetition of the two repetition may correspond to the PUSCH (e.g., the one PUSCH) associated with the 1-st UL/joint TCI state. Alternatively and/or additionally, the first repetition of the two repetitions may correspond to the PUSCH (e.g., the one PUSCH) associated with the 2-nd UL/joint TCI state. In some examples, the first repetition of the two repetitions may correspond to the PUSCH (e.g., the one PUSCH) associated with UL/joint TCI state associated with RS from PCI of serving cell (rather than PCI of non-serving cell, for example). In some examples, the first repetition is used for determining (e.g., deriving) PHR.

In some examples, the UE may be configured with reporting PHR associated with the first PUSCH (e.g., the UE may be configured with a configuration, wherein the configuration configures the UE to determine the PHR based on the first PUSCH and/or report the PHR). In some examples, based on the configuration, aligning understanding between UE and network may be achieved (e.g., the network may also have access to the configuration, and/or may know how the configuration works, such as where the network provides the UE with the configuration). In some examples, the UE may be configured (by the configuration, for example) to report PHR according to smaller or larger TRP-related index (e.g., the UE may be configured to determine the PHR based on a PUSCH associated with smaller or larger TRP-related index). In some examples, the UE may be configured (by the configuration, for example) to report PHR according to 1-st joint/UL TCI state or 2-nd joint/UL TCI state (e.g., the UE may be configured to determine the PHR based on a PUSCH associated with 1-st joint/UL TCI state or 2-nd joint/UL TCI state). In some examples, the UE may be configured (by the configuration, for example) to report PHR according to TCI state associated with PCI of serving cell or PCI of non-serving cell (e.g., the UE may be configured to determine the PHR based on a PUSCH associated with a PCI of a serving cell or a PCI of a non-serving cell). In some examples, the UE may be configured (by the configuration, for example) to report PHR according to PUSCH carrying PHR MAC CE (e.g., the UE may be configured to determine the PHR based on a PUSCH carrying a PHR MAC CE).

Figure 17:
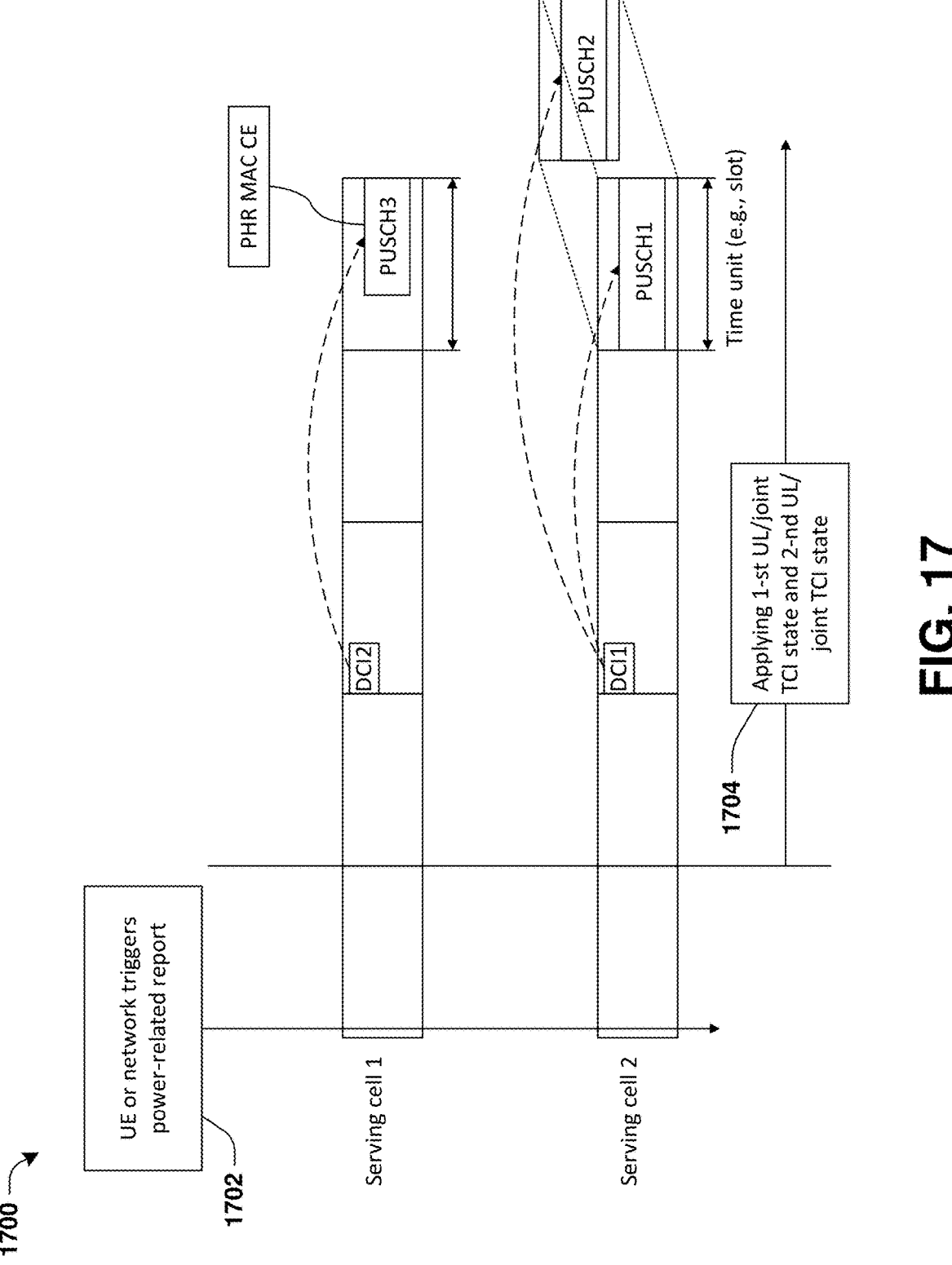
FIG. 17 is a diagram illustrating an exemplary scenario associated with serving cells according to one exemplary embodiment.

FIG. 17 illustrates an example scenario 1700 associated with serving cell 1 and serving cell 2. In the example scenario 1700, PHR may be triggered 1702 (e.g., the PHR may be triggered by the UE or a network node). The UE may apply 1704 1-st UL/joint TCI state and 2-nd UL/joint TCI state for serving cell 2 (and/or for one or more other serving cells in addition to serving cell 2). In some examples, the UE may apply 1704 1-st UL/joint TCI state and 2-nd UL/joint TCI state after triggering 1702 PHR. In some examples, if the UE is not configured with two SRS resource sets for same purpose (e.g., "non-codebook" or "codebook"), the UE may perform single TRP PUSCH transmission on serving cell 1. The applied beam and/or TCI state may be the 1-st UL/joint TCI state. The UE may receive an activating DCI indicating a TCI code-point comprising 1-st UL/joint TCI state and 2-nd UL/joint TCI state. For serving cell 1 being associated with a single SRS resource set for same purpose, the UE applies 1-st UL/joint TCI state for serving cell 1 (e.g., the UE applies 1-st UL/joint TCI state for serving cell 1 based on a determination that serving cell 1 is associated with only a single SRS resource set for non-codebook and/or only a single SRS resource set for codebook). In the example scenario 1700, the UE may transmit PUSCH3 via 1-st UL/joint TCI state. According to DCI1 indicating that PUSCH1 associated with 1-st UL/joint TCI state and PUSCH2 associated with 2-nd UL/joint TCI state, the UE transmits PUSCH1 via 1-st UL/joint TCI state and transmits PUSCH2 via 2-nd UL/joint TCI state. In some examples, if 1-st UL/joint TCI state comprises a first set of power control parameters, a first transmit power for PUSCH1 is determined (e.g., derived) based on the first set of power control parameters. In some examples, if 1-st UL/joint TCI state does not comprise a first set of power control parameters, a first transmit power for PUSCH1 is determined/(e.g., derived) based on a first Bandwidth Part (BWP)—specific set of power control parameters. In some examples, if 2-nd UL/joint TCI state comprises a second set of power control parameters, a second transmit power for PUSCH2 is determined/(e.g., derived) based on the second set of power control parameters. In some examples, if 2-nd UL/joint TCI state does not comprise a second set of power control parameters, a second transmit power for PUSCH2 is determined/(e.g., derived) based on a first or a second BWP-specific set of power control parameters. In some examples, if 1-st UL/joint TCI state comprises a first set of power control parameters, a third transmit power for PUSCH3 is determined/(e.g., derived) based on the first set of power control parameters. In some examples, if 1-st UL/joint TCI state does not comprise a first set of power control parameters, a third transmit power for PUSCH3 is determined/(e.g., derived) based on a third BWP-specific set of power control parameters. In some examples, the third BWP-specific set of power control parameters is associated with UL BWP in the serving cell1. In some examples, the first and/or the second BWP-specific set of power control parameters are associated with UL BWP in the serving cell2. In some examples, the UE determines PDCCH monitoring occasion for DCI2 is the earliest PDCCH monitoring occasion after the UE triggers 1702 PHR, and PUSCH3 is scheduled by DCI2. In some examples, the UE transmits PHR MAC CE on PUSCH3 (based on the determination that PDCCH monitoring occasion for DCI2 is the earliest PDCCH monitoring occasion after the UE triggers 1702 PHR and/or that PUSCH3 is scheduled by DCI2, for example). In some examples, the PHR MAC CE comprises at least one PHR for serving cell 1 and one PHR for serving cell2. In some examples, for serving cell 1 and serving cell 2, the UE is configured to report one PHR (e.g., only one PHR) for each serving cell. In some examples, the UE is not configured to report two PHRs for each serving cell. Based on determination of "the first PUSCH" and/or "the first repetition" above, PHR for serving cell 2 may be determined (e.g., the PHR for serving cell 2 may be determined based on the PUSCH selected using one or more of the techniques provided herein with respect to selecting the first PUSCH for use in determining PHR). The UE receives DCI1 scheduling concurrent (e.g., simultaneous) PUSCH1 and PUSCH2. PUSCH1 and PUSCH2 may comprise the same TB. The UE may determine a first maximum transmit power for PUSCH1 and a second maximum transmit power for PUSCH2. The UE may determine the first maximum transmit power and/or the second maximum transmit power such that a sum of the first maximum transmit power and the second maximum transmit power does not exceed (i) maximum transmit power for transmission on serving cell 2 and/or (ii) UE's maximum transmit/output power. Based on 1-st UL/joint TCI state being associated with PUSCH1, PHR for serving cell 2 may be based on PUSCH1, and PHR for serving cell 2 may be based on power difference between the first transmit power and the first maximum transmit power. In the example scenario 1700, the UE may not support (e.g., may not have capability for) reporting two PHRs for one serving cell. PUSCH1 and PUSCH2 at least partially overlap with each other in time domain. PUSCH1 and PUSCH2 at least partially overlap with each other in frequency domain or do not overlap with each other in frequency domain. PUSCH1 and PUSCH2 at least partially overlap with the slot, on the serving cell 1, for transmitting PHR MAC CE. 1-st UL/joint TCI state is associated with first SRS resource set or alternatively associated with second SRS resource set. 2-nd UL/joint TCI state is associated with second SRS resource set or alternatively associated with first SRS resource set. When PUSCH1 is scheduled to be associated with first SRS resource set, PUSCH1 may be transmitted via 1-st UL/joint TCI state. When PUSCH2 is scheduled to be associated with second SRS resource set, PUSCH2 may be transmitted via 2-nd UL/joint TCI state. In some examples, regardless of which SRS resource set a first SRI field in DCI1 is associated with, a PHR for serving cell 2 may be based on a first set of power control parameters associated with 1-st UL/joint TCI state.

Figure 18:
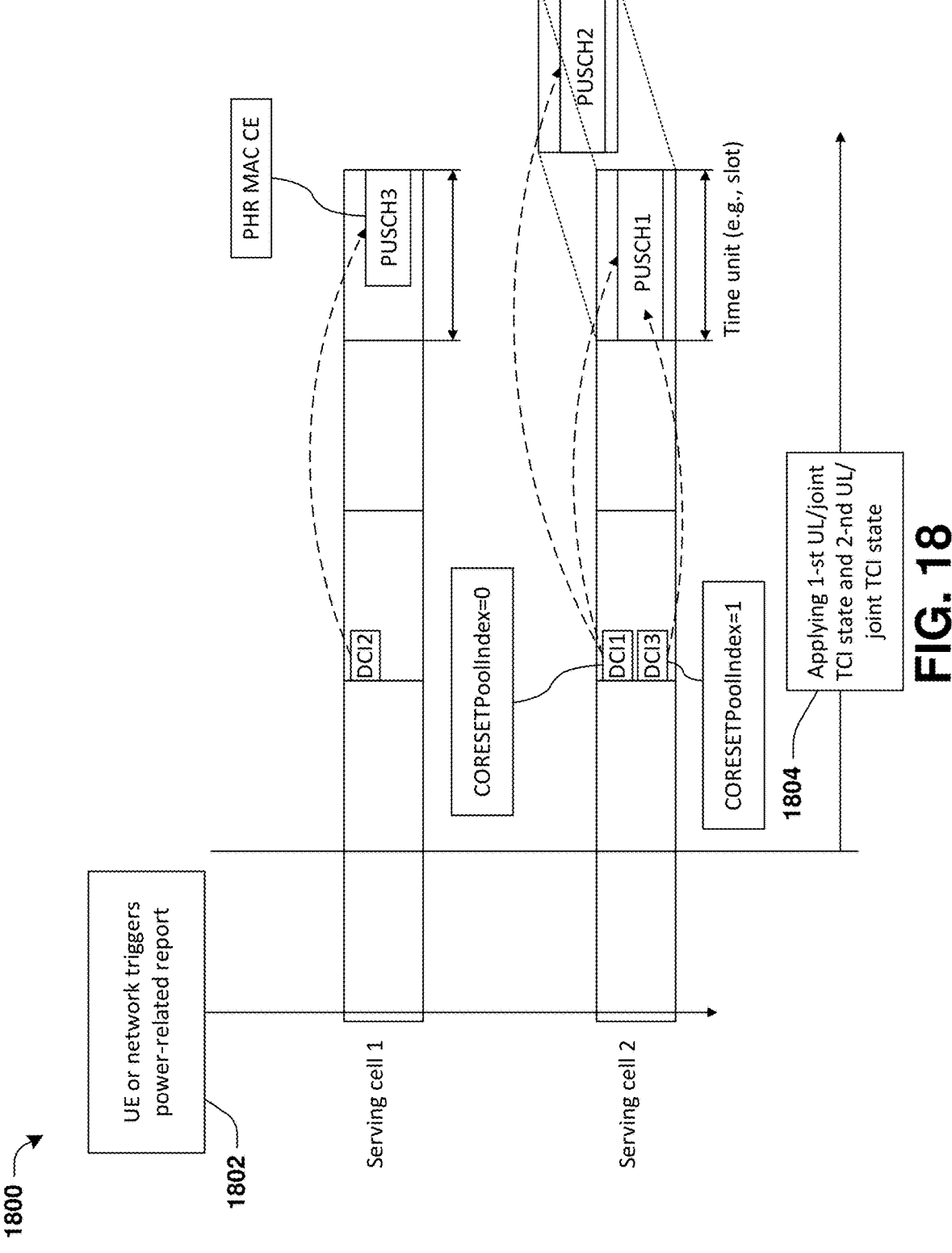
FIG. 18 is a diagram illustrating an exemplary scenario associated with serving cells according to one exemplary embodiment.

FIG. 18 illustrates an example scenario 1800 associated with serving cell 1 and serving cell 2. In the example scenario 1800, PHR may be triggered 1802 (e.g., the PHR may be triggered by the UE or a network node). The UE may apply 1804 1-st UL/joint TCI state and 2-nd UL/joint TCI state for serving cell 2 (and/or for one or more other serving cells in addition to serving cell 2). In some examples, the UE may apply 1804 1-st UL/joint TCI state and 2-nd UL/joint TCI state after triggering 1802 PHR. The UE may be configured with CORESETPoolIndex and/or multiple DCIs for scheduling multiple TRP PUSCHs. DCI1 and DCI3 are associated with different CORESETs with different CORE-SETPoolIndexes. In some examples, a first PDCCH monitoring occasion for CORESET of DCI1 and a second PDCCH monitoring occasion for CORESET of DCI3 may (i) fully overlap with each other in time domain, and (ii) start in the same symbol (e.g., the same starting symbol). DCI1 schedules PUSCH2 and DCI3 schedules PUSCH1. In some examples, if there is per CORESETPoolIndex unified TCI MAC CE, PUSCH1 is associated with the UL/joint TCI state associated with CORESETPoolIndex=1, and PUSCH2 is associated with UL/joint TCI state associated with the CORESETPoolIndex=0. Alternatively and/or additionally, the UE may receive a unified TCI MAC CE (e.g., one unified TCI MAC CE), wherein for each TCI code-point of a TCI field in DCI, the unified TCI MAC CE (e.g., the one unified TCI MAC CE) may indicate up to 2 TCI states for DL and/or up to 2 TCI states for UL. There may be 1-st UL/joint TCI state and 2-nd UL/joint TCI state associated with a TCI code-point of TCI field in DCI. In some examples, the 1-st UL/joint TCI state is associated with lower CORESET-PoolIndex and 2-nd UL/joint TCI state is associated with higher CORESETPoolIndex (e.g., CORESETPoolIndex of 1-st UL/joint TCI state is lower than CORESETPoolIndex of 2-nd UL/joint TCI state). In the example scenario 1800, when the UE transmits PHR MAC CE in PUSCH3, PHR for serving cell 2 may be based on PUSCH associated with CORESET with CORESETPoolIndex=0, and thus in this example, the PHR for serving cell 2 may be based on PUSCH 2. In some examples, for serving cell 1 and serving cell 2, the UE is configured to report one PHR (e.g., only one PHR) for each serving cell. In some examples, the UE is not configured to report two PHRs for each serving cell. PUSCH1 and PUSCH2 may comprise the same TB. The UE may determine a first maximum transmit power for PUSCH1 and a second maximum transmit power for PUSCH2. The UE may determine the first maximum transmit power and/or the second maximum transmit power such that a sum of the first maximum transmit power and the second maximum transmit power does not exceed (i) maximum transmit power for transmission on serving cell 2 and/or (ii) UE's maximum transmit/output power. The UE transmits PUSCH 2 based on UL/joint TCI state (e.g., activated and/or applied UL/joint TCI state) indicated by DCI format 1_1 or 1_2 associated with CORESETPoolIndex=0. The UE transmits PUSCH 1 based on another UL/joint TCI state (e.g., another activated and/or applied UL/joint TCI state) indicated by another DCI format 1_1 or 1_2 associated with CORESETPoolIndex=1. Based on CORESETPoolIndex=0 being associated with PUSCH2, PHR for serving cell 2 is based on PUSCH2 (e.g., PHR for serving cell 2 is based on power difference between the second transmit power and the second maximum transmit power). In the example scenario 1800, the UE may not support (e.g., may not have capability for) reporting two PHRs for one serving cell. PUSCH1 and PUSCH2 at least partially overlap with each other in time domain. PUSCH1 and PUSCH2 at least partially overlap with each other in frequency domain or do not overlap with each other in frequency domain. In some examples, PUSCH1 and PUSCH2 at least partially overlap with the slot, on the serving cell 1, for transmitting PHR MAC CE. In some examples, PUSCH1 and PUSCH2 have the same starting symbol.

In some examples, the UE may receive a first unified TCI MAC CE for associating a TCI code-point for CORESET-PoolIndex=0. The UE may receive a second unified TCI MAC CE for associating a TCI code-point for CORESET-PoolIndex=1. Distinguishing between the first unified TCI MAC CE and the second unified TCI MAC CE may be based on a CORESETPoolIndex of a CORESET for scheduling a PDSCH delivering the first unified TCI MAC CE and/or the second unified TCI MAC CE. In some examples, if the first unified TCI MAC CE is comprised in a PDSCH scheduled by PDCCH in CORESET with CORESETPoolIndex=0, the first unified TCI MAC CE is associated with CORESETPoolIndex=0, and/or TCI association in the first unified TCI MAC CE is applied for CORESETPoolIndex=0. Alternatively and/or additionally, a unified TCI MAC CE may comprise one or more bits (e.g., one bit) for identifying which CORESETPoolIndex is associated with the unified TCI MAC CE (e.g., to distinguish between CORESET-PoolIndexes associated with different unified TCI MAC CEs). In some examples, each TCI code-point of a TCI field in a DCI comprises up to 1 TCI state for UL and 1 TCI state for DL. Alternatively and/or additionally, the UE may receive a unified TCI MAC CE (e.g., one unified TCI MAC CE), wherein 1-st UL/joint TCI state is associated with CORESETPoolIndex=0 and 2-nd UL/joint TCI state is associated with CORESETPoolIndex=1. In some examples, each TCI code-point of a TCI field in a DCI comprises up to 2 TCI state for UL and 2 TCI state for DL. Other configurations and/or sizes associated with the TCI field of a TCI code-point are within the scope of the present disclosure.

A second concept of the present disclosure is that when (and/or once) a network node identifies a UE's capability as supporting concurrent (e.g., simultaneous) UL transmission (e.g., when the network node determines that the UE supports concurrent UL transmission), there may be a restriction in the network node that the network node shall configure the UE to report two PHRs for (at least) a serving cell. The network node may schedule concurrent (e.g., simultaneous) UL transmission on the serving cell. The network node may schedule concurrent (e.g., simultaneous) UL transmission via a single DCI. The simultaneous UL transmission comprises a first PUSCH and a second PUSCH. The first PUSCH and the second PUSCH are on a second serving cell. In some examples, the first PUSCH and the second PUSCH at least partially overlap with each other in time domain. In some examples, the first PUSCH and the second PUSCH at least partially overlap with each other in frequency domain or do not overlap with each other in frequency domain. The UE transmits one or more PHR or the PHR MAC CE on a third PUSCH in a slot. In some examples, the first PUSCH and the second PUSCH (on the second serving cell, for example) are at least partially overlap with the slot for transmitting the PHR MAC CE. In some examples, a starting symbol of the second PUSCH is the same as a starting symbol of the first PUSCH. The third PUSCH is transmitted on a first serving cell. The first serving cell may be the same as the second serving cell. When the network node configures a cell group, the network node shall configure the second serving cell in a second cell group, wherein the second cell group is configured with reporting two PHRs for one serving cell. For single DCI scheduling multiple TRP PUSCHs in different timings/slots on a third serving cell, the network node may configure the UE with the third serving cell either in the second cell group (configured with reporting two PHRs for one serving cell, for example) or the first cell group (which is not configured with reporting two PHRs for one serving cell, for example). For single DCI scheduling multiple PUSCHs with concurrent (e.g., simultaneous) transmission on the second serving cell, the network node (i) may configure the UE with the second serving cell in the second cell group (configured with reporting two PHRs, for example) and/or (ii) may not configure the UE with the second serving cell in the first cell group (which is not configured with reporting two PHRs for one serving cell, for example).

In an example, the network node may activate (e.g., implement and/or apply) the restriction based on a determination that one or more conditions are met. In some examples, the network node is restricted to configuring the UE to report two PHRs for the serving cell when the restriction is activated. In an example, the one or more conditions comprise a condition that the UE is scheduled with multiple PUSCHs with concurrent (e.g., simultaneous) UL transmission via a single DCI.

In some examples, the network node does not activate (e.g., implement and/or apply) the restriction when the network node schedules concurrent (e.g., simultaneous) UL transmissions via multiple DCIs (whereas the network node does activate the restriction when the network node schedules concurrent UL transmissions via a single DCI, for example). In some examples, when the network node configures the UE with CORESETPoolIndex or TRP-related index for UL scheduling, the network node is allowed to configure the UE to report two PHRs for (at least) the serving cell.

In some examples, the restriction may be activated (e.g., implemented and/or applied) when the UE does not support (e.g., does not have capability for) reporting two PHRs for (at least) the serving cell. This may happen in some scenarios where the UE's calculation capability does not support reporting two PHRs for the serving cell.

Alternatively and/or additionally, in the second concept, a restriction in the network node may be the network node shall schedule different starting symbols of two UL transmissions on a second serving cell (for a UE which supports concurrent UL transmissions, for example). The two UL transmissions (with different starting symbols) may partially overlap with each other (and/or may be scheduled to partially overlap with each other) in time domain. The UE determines (e.g., derives) PHR for the second serving cell based on an earlier UL transmission of the two UL transmissions (e.g., the UL transmission with the earlier starting symbol may be used to determine the PHR for the second serving cell).

Figure 19:
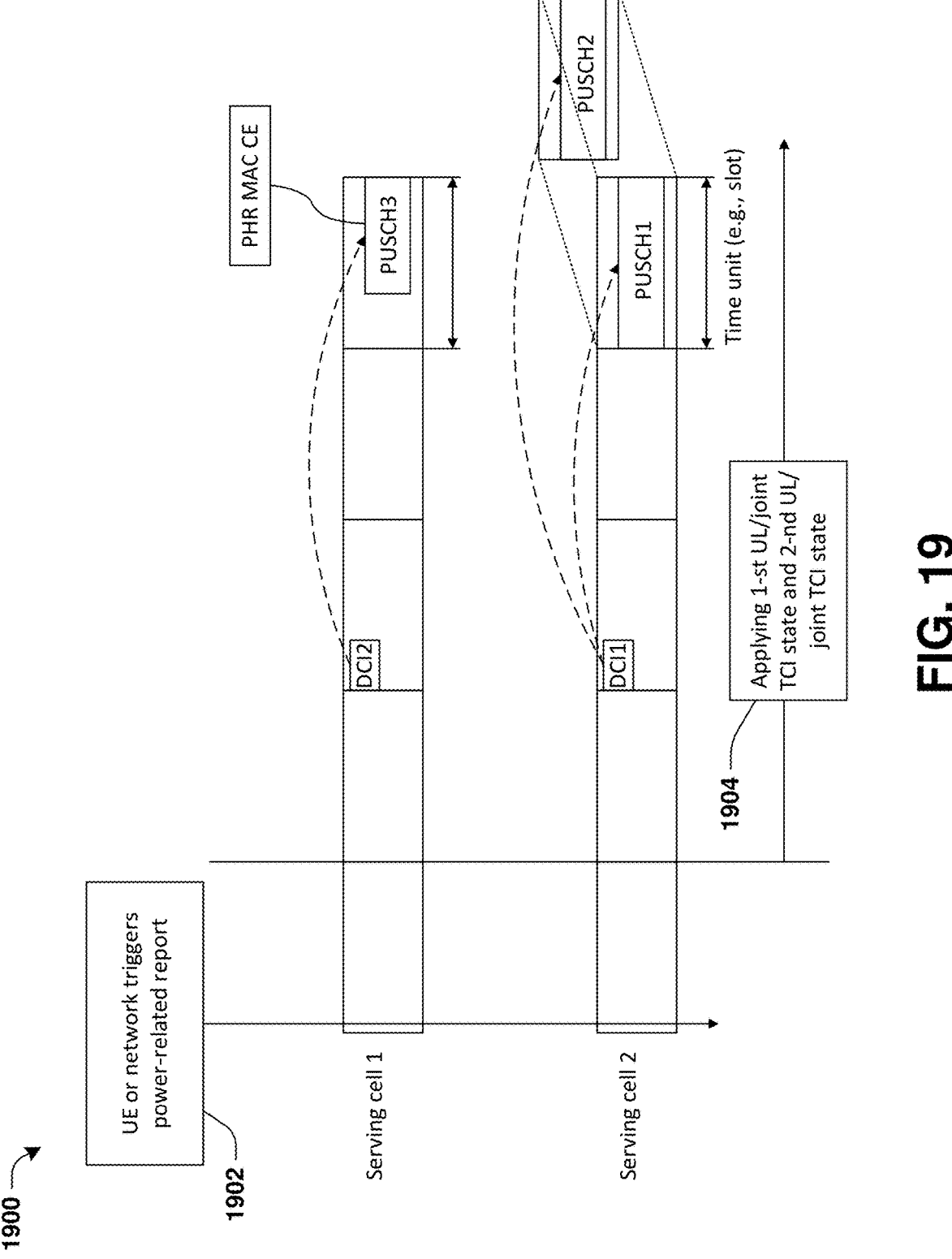
FIG. 19 is a diagram illustrating an exemplary scenario associated with serving cells according to one exemplary embodiment.

FIG. 19 illustrates an example scenario 1900 associated with serving cell 1 and serving cell 2. In the example scenario 1900, PHR may be triggered 1902 (e.g., the PHR may be triggered by the UE or a network node). The UE may apply 1904 1-st UL/joint TCI state and 2-nd UL/joint TCI state for serving cell 2 (and/or for one or more other serving cells in addition to serving cell 2). In some examples, the UE may apply 1904 1-st UL/joint TCI state and 2-nd UL/joint TCI state after triggering 1902 PHR. The network node may transmit DCI1 for scheduling PUSCH1 and PUSCH2 being transmitted concurrently (e.g., simultaneously), and starting symbols of PUSCH1 and PUSCH2 are different from each other (e.g., PUSCH1 starts at a different symbol compared to PUSCH2). Length of PUSCH1 may be different or the same as length of PUSCH2. In the example scenario 1900, even if DCI1 schedules simultaneous UL transmission on serving cell 2, the UE may determine PHR for serving cell 2 based on PUSCH1 (based on PUSCH1 starting earlier than PUSCH2, for example). In some examples, even if the UE does not support reporting two PHRs for one serving cell (e.g., serving cell 2), the UE and the network node may have same common understanding in determining which PUSCH is used for determining PHR for serving cell 2 (e.g., both the UE and the network node know that PUSCH1 is used to determine PHR for serving cell 2 since PUSCH1 starts earlier than PUSCH2, for example). For UE supporting reporting two PHRs for one serving cell (e.g., serving cell 2), the network node may schedule same starting symbol for concurrent (e.g., simultaneous) UL transmission.

In a first embodiment, in order to implement (e.g., achieve) scheduling concurrent (e.g., simultaneous) PUSCH in different symbols, a scheduling DCI may indicate two time patterns and/or two Start and Length Indicators (SLIVs) with different starting OFDM symbols. The two time patterns and/or two SLIVs may indicate one or more overlapping symbols for corresponding PUSCHs (e.g., the PUSCHs may overlap with each other at the one or more overlapping symbols). A first time pattern and/or SLIV may correspond to a time pattern and/or SLIV (of the two time patterns and/or two SLIVs) with an earlier starting symbol among the two time patterns and/or two SLIVs. A second time pattern and/or SLIV may correspond to a time pattern and/or SLIV (of the two time patterns and/or two SLIVs) with a last starting symbol among the two time patterns and/or two SLIVs. Based on the DCI indicating different starting symbols for concurrent (e.g., simultaneous) UL transmissions, the network node and the UE may determine PHR for a serving cell based on the earlier PUSCH (e.g., the PUSCH that starts earlier among concurrent PUSCHs) (where the earlier PUSCH at least partially overlaps with slot for transmitting PHR MAC CE, for example). In some examples, for UE supporting reporting two PHRs for one serving cell (e.g., serving cell 2), the network node may indicate two time patterns and/or two SLIVS with same or different starting OFDM symbols. Alternatively and/or additionally, for UE not supporting (e.g., not capable of) reporting two PHRs for one serving cell (e.g., serving cell 2), the network node may indicate two time patterns and/or two SLIVS with different starting OFDM symbols.

In a second embodiment, in order to implement (e.g., achieve) scheduling concurrent (e.g., simultaneous) PUSCH in different symbols, a Radio Resource Control (RRC) signaling, a MAC CE signaling, and/or a DCI signaling may indicate a starting offset. When a scheduling DCI indicates a time pattern and/or a SLIV, a first time pattern may correspond to the indicated time pattern and/or the SLIV, and/or a second time pattern may be determined (e.g., derived) based on the indicated time pattern (and/or the SLIV) and the (indicated) starting offset. In some examples, if (i) the starting offset is 2 symbols, and (ii) the scheduling DCI indicates a time pattern and/or SLIV starting from symbol 0 to symbol 9, a first time pattern for a first PUSCH may be from symbol 0 to symbol 9 and a second time pattern for a second PUSCH may be from symbol 2 to symbol 11 (e.g., a starting symbol of the second time pattern for the second PUSCH is offset from a starting symbol of the first time pattern for the first PUSCH by the starting offset of 2 symbols, where the first time pattern and the second time pattern may overlap from symbol 2 to symbol 9). Length of the first PUSCH is the same as the second PUSCH. The network node may indicate (and/or configure) the starting offset such that there is the first PUSCH and/or the second PUSCH do not exceed (and/or cross) a slot boundary (e.g., the first PUSCH and the second PUSCH may be scheduled such that an ending symbol of the first PUSCH and an ending symbol of the second PUSCH are in the slot that comprises the starting symbol of the first PUSCH and the starting symbol of the second PUSCH and/or such that the ending symbols do not exceed symbol 13 of the slot that comprises the starting symbol of the first PUSCH and the starting symbol of the second PUSCH). In some examples, the network node may configure one or more starting offsets (e.g., the network node may configure the UE with the one or more starting offsets). The network node may indicate a starting offset (e.g., one starting offset) among the one or more starting offsets based on the scheduling DCI. In some examples, the network node may configure a starting offset (e.g., a specific starting offset) to a UE (based on RRC signaling, for example), and the UE may determine the second time pattern based on the (specific) starting offset. In some examples, the starting offset may be configured based on a slot format and/or a frame structure. For UE supporting reporting two PHRs for one serving cell (e.g., serving cell 2), the network node may indicate starting offset or may not indicate starting offset (for saving signaling overhead, for example). For UE not supporting reporting two PHRs for one serving cell (e.g., serving cell 2), the network node may indicate starting offset.

Figure 20:
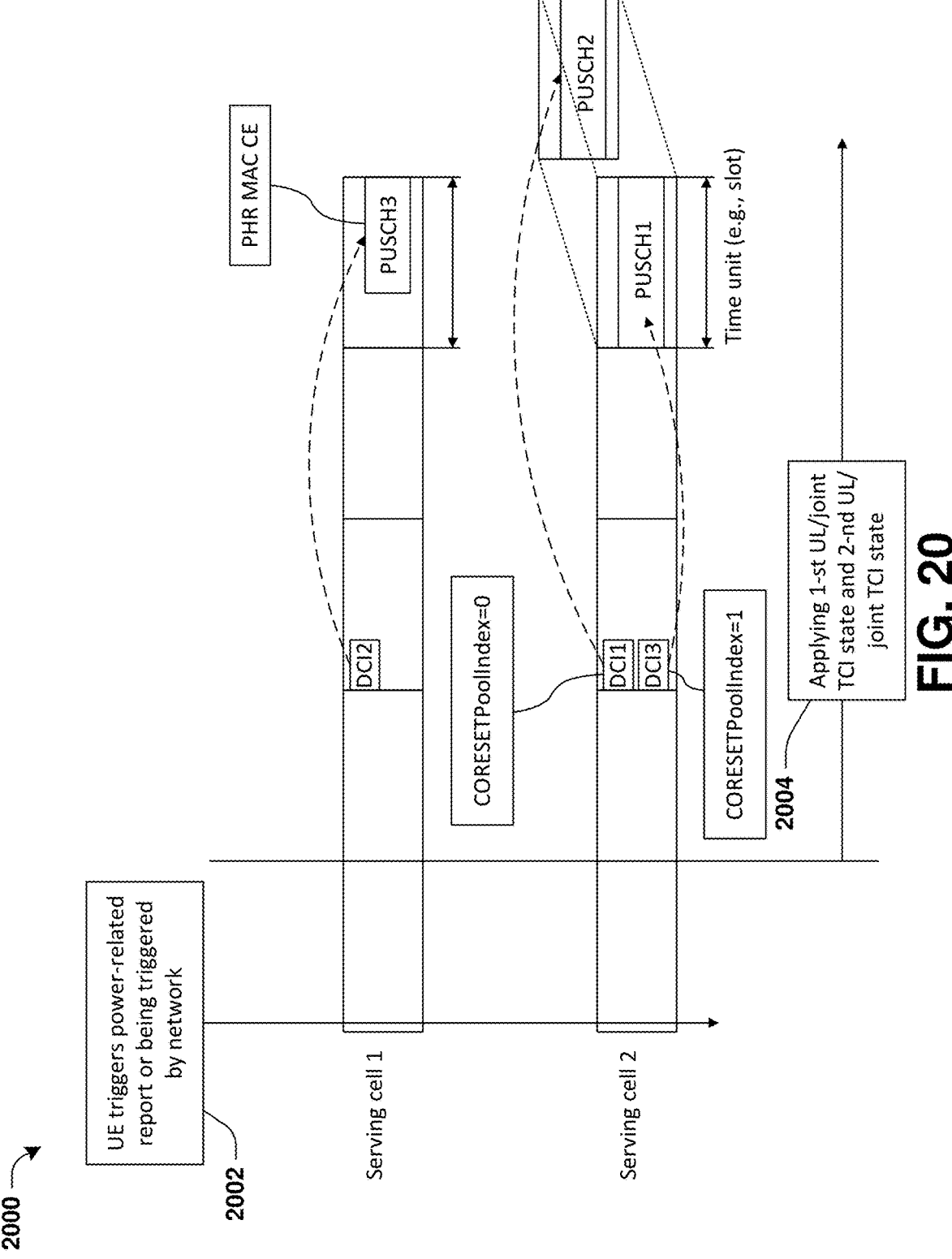
FIG. 20 is a diagram illustrating an exemplary scenario associated with serving cells according to one exemplary embodiment.

FIG. 20 illustrates an example scenario 2000 associated with serving cell 1 and serving cell 2. In the example scenario 2000, PHR may be triggered 2002 (e.g., the PHR may be triggered by the UE or a network node). The UE may apply 2004 1-st UL/joint TCI state and 2-nd UL/joint TCI state for serving cell 2 (and/or for one or more other serving cells in addition to serving cell 2). In some examples, the UE may apply 2004 1-st UL/joint TCI state and 2-nd UL/joint TCI state after triggering 2002 PHR. The network node may transmit DCI1 for scheduling PUSCH 2 and/or may transmit DCI3 for scheduling PUSCH1. PUSCH1 and PUSCH2 are scheduled to transmit concurrently, and starting symbols of PUSCH1 and PUSCH2 are scheduled in different symbols. Length of PUSCH1 may be different or the same as length of PUSCH2. In the example scenario 2000, the UE may determine PHR for serving cell 2 based on PUSCH1 (based on PUSCH1 starting earlier than PUSCH2, for example). In some examples, even if the UE does not support reporting two PHRs for one serving cell (e.g., serving cell 2), the UE and the network node may have same common understanding in determining which PUSCH is used for determining PHR for serving cell 2 (e.g., both the UE and the network node know that PUSCH1 is used to determine PHR for serving cell 2 since PUSCH1 starts earlier than PUSCH2, for example). For UE supporting reporting two PHRs for one serving cell (e.g., serving cell 2), the network node may schedule same starting symbol for concurrent (e.g., simultaneous) UL transmission.

Alternatively and/or additionally, in the second concept, a restriction in the network node may be the network node shall schedule concurrent UL transmissions, on a second serving cell, that (i) partially overlap with each other in time domain, and (ii) have different starting symbols (e.g., the network node may schedule the concurrent UL transmissions for a UE which supports concurrent UL transmissions but does not support reporting two PHRs for one serving cell). In an example, when a UE does not support reporting two PHRs for one serving cell, the network node is not allowed to schedule (e.g., is not configured to schedule and/or is prohibited and/or restricted from scheduling) concurrent UL transmissions that fully overlap in time domain.

One, some and/or all of the foregoing examples, concepts, techniques and/or embodiments can be formed and/or combined to a new embodiment.

In some examples, embodiments disclosed herein, such as embodiments described with respect to the first concept, the second concept, the first embodiment and the second embodiment, may be implemented independently and/or separately. Alternatively and/or additionally, a combination of embodiments described herein, such as embodiments described with respect to the first concept, the second concept, the first embodiment and/or the second embodiment, may be implemented. Alternatively and/or additionally, a combination of embodiments described herein, such as embodiments described with respect to the first concept, the second concept, the first embodiment and/or the second embodiment, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, in some examples, a TRP (mentioned in the foregoing description, for example) may be associated with a CORESET Pool (e.g. a coresetPoolIndex) of a Cell. In some embodiments, one, some and/or all instances of the term "TRP" in the present disclosure may be replaced with the term "CORESET pool". In some examples, for a UE performing single TRP operation on a Cell, the UE may receive and/or monitor signaling from the cell via a single CORESET pool. In some examples, for a UE performing multi-TRP operation on a Cell, the UE may receive and/or monitor signaling from the cell via multiple CORESET pools.

Alternatively and/or additionally, the TRP (mentioned in the foregoing description, for example) may be associated with a SRS resource (and/or a SRS resource set) of a Cell. In some embodiments, one, some and/or all instances of the term "TRP" in the present disclosure may be replaced with the term "SRS resource" and/or the term "SRS resource set".

In some examples, for a UE performing single TRP operation on a Cell, the UE may receive and/or monitor signaling on the cell via one activated TCI state. In some examples, for a UE performing multi-TRP operation on a Cell, the UE may receive and/or monitor signaling via multiple activated TCI states.

Alternatively and/or additionally, the TRP (mentioned in the foregoing description, for example) may be associated with one or more TCI states of a Cell. In some embodiments, one, some and/or all instances of the term "TRP" in the present disclosure may be replaced with the term "TCI state" and/or the term "one or more TCI states". In some examples, for a UE performing single TRP operation on a Cell, the UE may transmit SRS on the cell via one SRS resource. In some examples, for a UE performing multi-TRP operation on a Cell, the UE may transmit SRS via multiple SRS resources, wherein each of the multiple SRS resources may be associated with a (different) TRP.

Alternatively and/or additionally, the TRP (mentioned in the foregoing description, for example) may be associated with PUSCH or PUCCH. In some embodiments, one, some and/or all instances of the term "TRP" in the present disclosure may be replaced with the term "PUSCH" and/or the term "PUCCH". For a UE performing intra-cell mTRP operation on a Cell, the UE may perform UL transmission via multiple PUSCHs associated with the Cell. For a UE performing inter-cell mTRP operation on a Cell, the UE may perform UL transmissions via multiples PUSCHs associated with different Cells, wherein the UL transmissions may comprise transmitting a same TB on different PUSCHs associated with different Cells.

Alternatively and/or additionally, the TRP (mentioned in the foregoing description, for example) may be associated with a spatial relation info of a Cell. In some embodiments, one, some and/or all instances of the term "TRP" in the present disclosure may be replaced with the term "spatial relation info". For a UE performing single TRP operation on a Cell, the UE may activate (and/or may be indicated with) one spatial relation info (of the Cell, for example). For a UE performing multi-TRP operation on a Cell, the UE may activate (and/or may be indicated with) more than one spatial relation info (of the Cell, for example), wherein each spatial relation info of the more than one spatial relation info may be associated with a (different) TRP.

With respect to one or more embodiments herein, in some examples, a non-serving cell of a UE may be associated with (e.g., configured with) a PCI value different from PCI values of Serving Cells of the UE. A non-serving Cell may be a neighboring Cell of the UE.

With respect to one or more embodiments herein, in some examples, network is not allowed to schedule (e.g., is not configured to schedule and/or is prohibited and/or restricted from scheduling) concurrent uplink transmission (based on a pair of SRS resources, a pair of SRIs, and/or a pair of UL beam/spatial relation info/spatial filter) if one, some and/or all conditions of a set of conditions are met. The set of conditions may comprise (i) a condition that UE reports not supporting (e.g., not having capability for) concurrent (e.g., simultaneous) uplink transmission and/or that the UE does not report support for (e.g., capability for) concurrent (e.g., simultaneous) uplink transmission, (ii) a condition that UL channel quality is less (and/or worse) than a threshold (e.g., network's received L1-RSRP and/or L3-RSRP and/or Signal to Interference plus Noise Ratio (SINR) is worse than a threshold), (iii) a condition that UE's power-related report (e.g., PHR) does not include the pair of SRS resources, and/or that network receives UE's power related report, and/or (iv) a condition that network's received timing of concurrent (e.g., simultaneous) uplink transmissions from UE (e.g., timings of receptions of concurrent uplink transmissions from the UE) have a timing difference exceeding a threshold, (v) a condition that a difference between two Timing Advances (associated with the concurrent uplink transmissions, for example) for UE is larger than a threshold and/or (vi) a condition that a difference between two Time Alignments (associated with the concurrent uplink transmissions, for example) for UE is larger than a threshold.

With respect to one or more embodiments herein, in some examples, at least one symbol of one of two uplink channels/signals (e.g., the two PUSCHs comprising the first PUSCH and the second PUSCH0 overlaps (in time domain) with the other one of the two uplink channels/signals. In the present disclosure, the term "channels/signals" may refer to channels and/or signals. In some examples, one of the two uplink channels/signals is fully overlapped with the other one of the two uplink channels/signals in time domain.

With respect to one or more embodiments herein, in some examples, the two uplink channels/signals may be multiplexed (with each other, for example) in frequency domain. In some examples, the two uplink channels/signals may be multiplexed (with each other, for example) in spatial domain.

With respect to one or more embodiments herein, in some examples, no Physical Resource Block (PRB) of one of the two uplink channels/signals overlaps with any PRB of the other one of the two uplink channels/signals (in frequency domain).

With respect to one or more embodiments herein, in some examples, no resource element of one of the two uplink channels/signals overlaps with any resource element of the other one of the two uplink channels/signals (in frequency domain).

Alternatively and/or additionally, with respect to one or more embodiments herein, in some examples, at least one PRB or resource element of one of the two uplink channels/signals overlaps with a PRB or a resource element of the other one of the two uplink channels/signals (in frequency domain).

Alternatively and/or additionally, with respect to one or more embodiments herein, in some examples, all PRBs of one of the two uplink channels/signals overlap with (some or all PRBs of) the other one of the two uplink channels/signals (in frequency domain).

Alternatively and/or additionally, with respect to one or more embodiments herein, in some examples, all resource elements of one of the two uplink channels/signals overlap with (some or all resource elements of) the other one of the two uplink channels/signals (in frequency domain).

With respect to one or more embodiments herein, in some examples, the UE has at least two UE panels.

With respect to one or more embodiments herein, in some examples, the UE may perform concurrent (e.g., simultaneous) uplink transmission (via the at least two UE panels, for example).

With respect to one or more embodiments herein, in some examples, a first SRS resource (and/or a first SRS resource set) is associated with a first UE panel of the at least two UE panels.

With respect to one or more embodiments herein, in some examples, a second SRS resource (and/or a second SRS resource set) is associated with a second UE panel of the at least two UE panels.

With respect to one or more embodiments herein, in some examples, the UE may be configured with a first set of power control parameters.

With respect to one or more embodiments herein, in some examples, the UE may be configured with a second set of power control parameters.

With respect to one or more embodiments herein, in some examples, the first set of power control parameters is associated with the first UE panel of the at least two UE panels.

With respect to one or more embodiments herein, in some examples, the second set of power control parameters is associated with the second UE panel of the at least two UE panels.

With respect to one or more embodiments herein, in some examples, the first set of power control parameters may be indicative of (and/or may configure the UE with) a first target received power in network node (e.g., $P_0$), a first coefficient for pathloss compensation (e.g., alpha), and/or a first closed loop index. In some examples, the second set of power control parameters may be indicative of (and/or may configure the UE with) a second target received power in network node (e.g., $P_0$), a second coefficient for pathloss compensation (e.g., alpha), and/or a second closed loop index. In some examples, one, some and/or all parameters of the first set of power control parameters are different from the second set of power control parameters. In an example, the first target received power may be different from the second target received power, the first coefficient for pathloss compensation may be different from the second coefficient for pathloss compensation, and/or the first closed loop index may be different from the second closed loop index.

With respect to one or more embodiments herein, in some examples, the UE may have two different $P_{CMAX}$ (e.g., two UE maximum output power values) for the at least two panels.

With respect to one or more embodiments herein, in some examples, one of the two different $P_{CMAX}$ is associated with the first SRS resource (and/or the first SRS resource set).

With respect to one or more embodiments herein, in some examples, the other one of the two different $P_{CMAX}$ is associated with the second SRS resource (and/or the second SRS resource set).

In some embodiments, one, some and/or all instances of the term "beam" in the present disclosure may be replaced with the term "TCI state". In some embodiments, one, some and/or all instances of the term "TCI state" in the present disclosure may be replaced with the term "beam".

In some embodiments, examples provided herein relating to two (e.g., at least one of two PUSCHs, two PHRs, two time patterns, two SLIVs, etc.) may be changed to another number, such as three, four, etc. while staying within the scope of the present disclosure.

FIG. 21 is a flow chart 2100 according to one exemplary embodiment from the perspective of a UE in a wireless communication system. In step 2105, the UE determines which PUSCH to use for determining (e.g., calculating and/or deriving) PHR for a second serving cell based on one or more first characteristics of a first PUSCH and/or one or more second characteristics of a second PUSCH.

In one embodiment, the UE reports one PHR (e.g., only one PHR) for one serving cell.

In one embodiment, the UE does not support (e.g., does not have capability for) reporting two PHRs for one serving cell.

In one embodiment, the UE supports (e.g., has capability for) performing concurrent (e.g., simultaneous) UL transmission.

In one embodiment, the first PUSCH and the second PUSCH are on the second serving cell.

In one embodiment, the first PUSCH and the second PUSCH are scheduled via different beams.

In one embodiment, the first PUSCH and the second PUSCH are scheduled via different TCI states.

In one embodiment, the first PUSCH and the second PUSCH at least partially overlap with each other in time domain.

In one embodiment, the first PUSCH and the second PUSCH at least partially overlap with each other in frequency domain or do not overlap with each other in frequency domain.

In one embodiment, the first PUSCH is with a same starting symbol as the second PUSCH.

In one embodiment, the first PUSCH is associated with a first UE panel different than a second UE panel (e.g., a UL panel) associated with the second PUSCH.

In one embodiment, the UE transmits PHR MAC CE on the second serving cell or a first serving cell.

In one embodiment, the one or more first characteristics may comprise CORESETPoolIndex of CORESET for DCI scheduling and/or activating the first PUSCH.

In one embodiment, the one or more second characteristics may comprise CORESETPoolIndex of CORESET for DCI scheduling and/or activating the second PUSCH.

In one embodiment, the one or more first characteristics may comprise TRP-related index for the first PUSCH.

In one embodiment, the one or more second characteristics may comprise TRP-related index for the second PUSCH.

In one embodiment, the one or more first characteristics may comprise SRS resource set index associated with the first PUSCH.

In one embodiment, the one or more second characteristics may comprise SRS resource set index associated with the second PUSCH.

In one embodiment, the one or more first characteristics may comprise serving cell PCI associated with UL/joint TCI state for the first PUSCH.

In one embodiment, the one or more second characteristics may comprise serving cell PCI associated with UL/joint TCI state for the second PUSCH.

In one embodiment, the one or more first characteristics may comprise UL/joint TCI associated with the first PUSCH.

In one embodiment, the one or more second characteristics may comprise UL/joint TCI associated with the second PUSCH.

In one embodiment, the UE determines which PUSCH to use for determining (e.g., calculating and/or deriving) the PHR for the second serving cell based on which PUSCH (of the first PUSCH and the second PUSCH) transmits (e.g., carries) a PHR MAC CE (comprising the PHR for the second serving cell, for example). For example, the UE may determine to use the first PUSCH for determining (e.g., calculating and/or deriving) the PHR for the second serving cell based on a determination that the first PUSCH transmits (e.g., carries) the PHR MAC CE.

In one embodiment, the UE is configured with only the second serving cell (e.g., the UE may not be configured with a serving cell other than the second serving cell).

In one embodiment, the UE is configured with only the second serving cell with concurrent (e.g., simultaneous) UL transmission (e.g., the second serving cell may have configuration for concurrent UL transmission, and/or the UE may not be configured with a serving cell with concurrent UL transmission other than the second serving cell).

In one embodiment, the UE transmits a PHR MAC CE (comprising the PHR for the second serving cell, for example) on either the first PUSCH or the second PUSCH.

In one embodiment, the UE determines the PHR based on the first PUSCH (in response to determining to use the first PUSCH for determining the PHR). For example, the UE may determine (e.g., derive and/or calculate) the PHR based on a transmit power for the first PUSCH. For example, the UE may determine (e.g., derive and/or calculate) the PHR according to a power difference between a maximum transmit power and the transmit power for the first PUSCH.

Referring back to FIGS. 3 and 4, in one exemplary embodiment of a UE in a wireless communication system, the device 300 includes a program code 312 stored in the memory 310. The CPU 308 may execute program code 312 to enable the UE to determine which PUSCH to use for determining PHR for a second serving cell based on one or more first characteristics of a first PUSCH and/or one or more second characteristics of a second PUSCH. Furthermore, the CPU 308 can execute the program code 312 to perform one, some and/or all of the above-described actions and steps and/or others described herein.

FIG. 22 is a flow chart 2200 according to one exemplary embodiment from the perspective of a UE in a wireless communication system. In step 2205, the UE transmits a third PUSCH comprising a PHR MAC CE. The PHR MAC CE comprises a PHR for a second serving cell. The UE is scheduled and/or configured with a first PUSCH and a second PUSCH on the second serving cell. The first PUSCH and the second PUSCH start in same symbol (e.g., the first PUSCH and the second PUSCH each have the same starting symbol). The PHR for the second serving cell is determined (e.g., derived and/or calculated) based on (i) either transmit power of the first PUSCH or transmit power of the second PUSCH, and/or (ii) a transmit power of a PUSCH (e.g., the first PUSCH or the second PUSCH) which is associated with a defined TCI state.

In one embodiment, the defined TCI state is a 1-st UL/joint TCI state.

In one embodiment, the third PUSCH is transmitted in a first serving cell.

In one embodiment, the third PUSCH is the first PUSCH or the second PUSCH.

In one embodiment, the third PUSCH is transmitted in the second serving cell.

In one embodiment, the UE reports one PHR (e.g., only one PHR) for one serving cell and/or the UE does not support (e.g., does not have capability for) reporting two PHRs for one serving cell.

In one embodiment, the UE supports (e.g., has capability for) performing concurrent (e.g., simultaneous) UL transmission.

In one embodiment, the first PUSCH and the second PUSCH are on the second serving cell.

In one embodiment, the first PUSCH and the second PUSCH are scheduled via different beams.

In one embodiment, the first PUSCH and the second PUSCH are scheduled via different TCI states.

In one embodiment, the first PUSCH and the second PUSCH at least partially overlap with each other in time domain.

In one embodiment, the first PUSCH and the second PUSCH at least partially overlap with each other in frequency domain or do not overlap with each other in frequency domain.

In one embodiment, the first PUSCH is associated with a first UE panel different than a second UE panel (e.g., a UL panel) associated with the second PUSCH.

In one embodiment, the first PUSCH at least partially overlaps with a slot for (i) transmitting the third PUSCH and/or (ii) transmitting the PHR MAC CE.

In one embodiment, the second PUSCH at least partially overlaps with a slot (i) for transmitting the third PUSCH and/or (ii) transmitting the PHR MAC CE.

In one embodiment, when the UE is configured with CORESETPoolIndex for the second serving cell (and/or for one or more serving cells in addition to the second serving cell), the UE determines (e.g., derives and/or calculates) the PHR for the second serving cell based on a PUSCH, among the first PUSCH and the second PUSCH, that is scheduled by DCI in a CORESET associated with a lower CORESET-PoolIndex or associated with CORESETPoolIndex corresponding to 0. For example, the first PUSCH may be used to determine the PHR for the second serving cell based on a determination that a CORESETPoolIndex of a CORESET associated with a DCI that schedules the first PUSCH is lower than a CORESETPoolIndex of a CORESET associated with a DCI that schedules the second PUSCH. Alternatively and/or additionally, the first PUSCH may be used to determine the PHR for the second serving cell based on a determination that a CORESETPoolIndex of a CORESET associated with a DCI that schedules the first PUSCH is equal to 0.

In one embodiment, the first PUSCH is scheduled by a first DCI and the second PUSCH is scheduled by a second DCI.

In one embodiment, the first DCI is associated with a first CORESET, and/or the second DCI is associated with a second CORESET.

In one embodiment, PDCCH monitoring occasion for first DCI scheduling the first PUSCH is earlier than PDCCH monitoring occasion for second DCI scheduling the second PUSCH.

In one embodiment, starting symbol of PDCCH monitoring occasion for first DCI scheduling the first PUSCH is earlier than starting symbol of PDCCH monitoring occasion for second DCI scheduling the second PUSCH.

In one embodiment, PDCCH monitoring occasion for first DCI scheduling the first PUSCH is after PDCCH monitoring occasion for second DCI scheduling the second PUSCH.

In one embodiment, starting symbol of PDCCH monitoring occasion for first DCI scheduling the first PUSCH is after starting symbol of PDCCH monitoring occasion for second DCI scheduling the second PUSCH.

In one embodiment, PDCCH monitoring occasion for first DCI scheduling the first PUSCH is the same as PDCCH monitoring occasion for second DCI scheduling the second PUSCH.

In one embodiment, starting symbol of PDCCH monitoring occasion for first DCI scheduling the first PUSCH is the same as starting symbol of PDCCH monitoring occasion for second DCI scheduling the second PUSCH.

In one embodiment, in response to the PDCCH monitoring occasion for the first DCI being earlier than the PDCCH monitoring occasion for the second DCI, the UE determines (e.g., derives and/or calculates) the PHR for the second serving cell based on the first PUSCH.

In one embodiment, the first PUSCH and the second PUSCH are scheduled by a third DCI (e.g., a single DCI), wherein the third DCI is DCI format 0_1 or DCI format 0_2.

In one embodiment, the UE receives a fourth DCI with TCI field indicating (and/or activating) a TCI code-point (e.g., one TCI code-point), and/or the fourth DCI is DCI format 1_1 or 1_2.

In one embodiment, the third DCI indicates an association between the first and/or second PUSCH and a 1-st and/or 2-nd UL/joint TCI state (e.g., an association between the first PUSCH and the 1-st UL/joint TCI state and/or an association between the second PUSCH and the 2-nd UL/joint TCI state).

In one embodiment, the third DCI may indicate the first PUSCH is associated with 1-st or 2-nd UL/joint TCI state and the second PUSCH is associated with 2-nd or 1-st UL/joint TCI state.

In one embodiment, when the fourth DCI activates two UL/joint TCI states, the UE, based on the third DCI, determines to perform a multiple TRP PUSCH transmission (e.g., a PUSCH transmission using multiple TRPs, such as concurrently) or to perform a single TRP PUSCH transmission (e.g., a PUSCH transmission using a single TRPs).

In one embodiment, when the third DCI indicates 1-st UL/joint or 2-nd UL/joint TCI state (and/or does not indicate both 1-st UL/joint or 2-nd UL/joint TCI state), the third DCI may schedule single TRP PUSCH transmission.

In one embodiment, when the third DCI indicates both 1-st and 2-nd UL/joint TCI state, the third DCI schedules multiple TRP PUSCH transmission.

In one embodiment, the TCI code-point (e.g., the one TCI code-point) is associated with two UL/joint TCI states, wherein 1-st UL/joint TCI state of the two UL/joint TCI states is associated with a UL/joint TCI state, of the TCI code-point, with a first octet index and a 2-nd UL/joint TCI state is associated with another UL/joint TCI state, of the TCI code-point with a second octet index, wherein the first octet index is lower than the second octet index.

In one embodiment, the UE receives a fifth DCI after the fourth DCI, wherein the fifth DCI indicates/activates another TCI code-point (e.g., another one TCI code-point) and the another TCI code-point indicates another two UL/joint TCI states.

In one embodiment, among the another two UL/joint TCI states, 1-st UL/joint TCI state is the UL/joint TCI state which is with lower octet index.

In one embodiment, when the UE applies the another two UL/joint TCI states activated by the fifth DCI, 1-st UL/joint TCI state is associated with the one UL/joint TCI state with lower octet index associated with the another two UL/joint TCI states.

In one embodiment, before the UE applied the another two UL/joint TCI states activated by the fifth DCI, 1-st UL/joint TCI state is associated with the one UL/joint TCI state with lower octet index associated with original two UL/joint TCI states associated with the fourth DCI.

In one embodiment, the UE may determine a first maximum transmit power for transmitting the first PUSCH and may determine a second maximum transmit power for transmitting the second PUSCH.

In one embodiment, the first maximum transmit power may be the same as or different than a second maximum transmit power.

In one embodiment, when the PHR for the second serving cell is determined (e.g., derived and/or calculated) based on the first PUSCH, the PHR is determined (e.g., derived and/or calculated) based on a power difference between the first maximum transmit power and a first transmit power (e.g., the first transmit power may be used to transmit the first PUSCH).

In one embodiment, when the PHR for the second serving cell is determined (e.g., derived and/or calculated) based on the second PUSCH, the PHR is determined (e.g., derived and/or calculated) based on a power difference between the second maximum transmit power and a second transmit power (e.g., the second transmit power may be used to transmit the second PUSCH).

In one embodiment, based on an indication of the third DCI, 1-st UL/joint TCI state is associated with the first PUSCH and/or 2-nd UL/joint TCI state is associated with the second PUSCH.

In one embodiment, the UE determines a first transmit power for the first PUSCH based on an indication (e.g., an indication of one or more parameters and/or other information) in the third DCI. The indication (e.g., the indication of the one or more parameters and/or the other information) is included in (and/or indicated by) a first SRI field which is associated with the first PUSCH.

In one embodiment, the UE determines a second transmit power for the second PUSCH based on an indication (e.g., an indication of one or more parameters and/or other information) in the third DCI. The indication (e.g., the indication of the one or more parameters and/or the other information) is included in (and/or indicated by) a second SRI field which is associated with the second PUSCH.

In one embodiment, the UE determines a first transmit power for the first PUSCH based on one or more power control parameters indicated by 1-st UL/joint TCI state (e.g., Uplink-powerControlId-r17 and/or PUSCH-PathlossRefer-enceRS-Id in 1-st UL/joint TCI state).

In one embodiment, the UE determines a second transmit power for the second PUSCH based on one or more power control parameters indicated by 2-nd UL/joint TCI state (e.g., Uplink-powerControlId-r17 and/or PUSCH-Pathloss-ReferenceRS-Id in 2-nd UL/joint TCI state).

In one embodiment, if 1-st UL/joint TCI state does not comprise power control parameters, the UE determines a first transmit power for the first PUSCH based on one or more first BWP-specific power control parameters (e.g., a first Uplink-powerControlId-r17, in BWP-UplinkDedicated, corresponding to one or more power control parameters).

In one embodiment, if 2-nd UL/joint TCI state does not comprise power control parameters, the UE determines a second transmit power for the second PUSCH based on one or more second BWP-specific power control parameters (e.g., a second Uplink-powerControlId-r17, in BWP-Up-linkDedicated, corresponding to one or more power control parameters).

In one embodiment, 1-st UL/joint TCI state is associated with a UL-TCIState-r17 (e.g., one UL-TCIState-r17) with a UL-TCIState-Id-r17 (e.g., one UL-TCIState-Id-r17) or a DLorJoint-TCIState-r17 (e.g., one DLorJoint-TCIState-r17) with a TCI-StateId (e.g., one TCI-StateId).

In one embodiment, 2-nd UL/joint TCI state is associated with one UL-TCIState-r17 (e.g., one UL-TCIState-r17) with another UL-TCIState-Id-r17 (e.g., another one UL-TCIState-Id-r17) or a DLorJoint-TCIState-r17 (e.g., one DLorJoint-TCIState-r17) with another TCI-StateId (e.g., another one TCI-StateId).

In one embodiment, one or more power control param-eters (indicated by 1-st UL/joint TCI state and/or 2-nd UL/joint TCI state, for example) comprise UE target power (e.g., $P_{O\_UE\_PUSCH,b,f,c}($ ), and/or P0), pathloss compensa-tion (e.g., alpha, and/or $\alpha_{b,f,c}(j)$), pathloss RS, and/or closed loop index.

In one embodiment, the UE determines the first transmit power based on UE target power (e.g., $P_{O\_UE\_PUSCH,b,f,c}(j)$, or P0), pathloss compensation (e.g., alpha, and/or $\alpha_{b,f,c}(j)$), pathloss RS, and/or closed loop index associated with 1-st UL/joint TCI state and/or associated with the one or more first BWP-specific power control parameters.

In one embodiment, the UE determines the second trans-mit power based on at least UE target power ($P_{O\_UE\_PUSCH,b,f,c}(U)$, or P0), pathloss compensation (alpha, or $\alpha_{b,f,c}(j)$), pathloss RS, and/or closed loop index associated with 2-nd UL/joint TCI state or associated with the second BWP-specific power control parameters.

In one embodiment, the one or more first BWP-specific power control parameters may be the same as the one or more second BWP-specific power control parameters.

In one embodiment, there may be only one or more first BWP-specific power control parameters for the first transmit power and the second transmit power (e.g., the one or more first BWP-specific power control parameters, and not the one or more second BWP-specific power control param-eters, are used to determine the second transmit power).

Referring back to FIGS. 3 and 4, in one exemplary embodiment of a UE in a wireless communication system, the device 300 includes a program code 312 stored in the memory 310. The CPU 308 may execute program code 312 to enable the UE to transmit a third PUSCH comprising a PHR MAC CE, wherein the PHR MAC CE comprises a PHR for a second serving cell, wherein the UE is scheduled and/or configured with a first PUSCH and a second PUSCH on the second serving cell, wherein the first PUSCH and the second PUSCH start in same symbol, and wherein the PHR for the second serving cell is determined based on (i) either transmit power of the first PUSCH or transmit power of the second PUSCH, and/or (ii) transmit power of a PUSCH which is associated with a defined TCI state. Furthermore, the CPU 308 can execute the program code 312 to perform one, some and/or all of the above-described actions and steps and/or others described herein.

Figure 23:
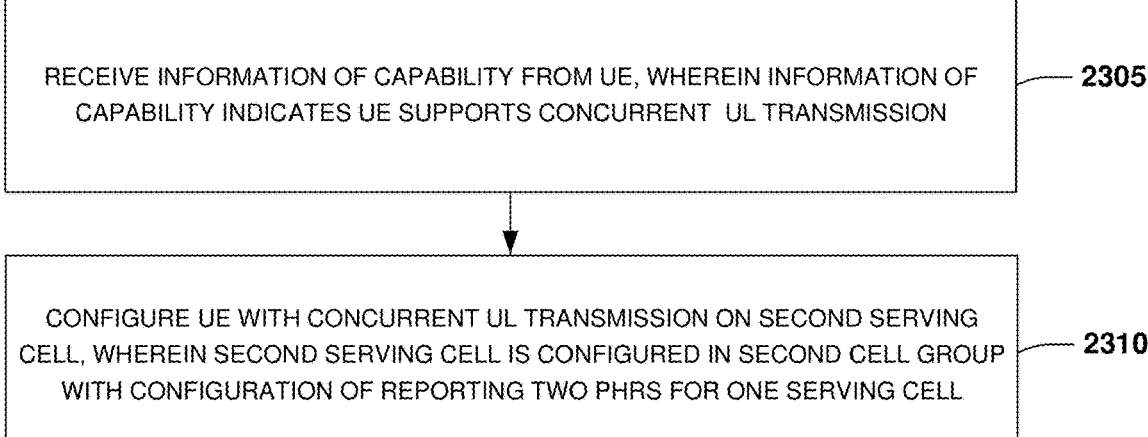
FIG. 23 is a flow chart according to one exemplary embodiment.

FIG. 23 is a flow chart 2300 according to one exemplary embodiment from the perspective of a network node in a wireless communication system. In step 2305, the network node receives an information of capability from a UE, wherein the information of capability indicates the UE supports concurrent (e.g., simultaneous) UL transmission (and/or indicates other information in addition to the UE supporting concurrent UL transmission). In step 2310, the network node configures the UE with concurrent (e.g., simultaneous) UL transmission on a second serving cell, wherein the second serving cell is configured in a second cell group with configuration of reporting two PHRs for one serving cell.

In one embodiment, the network node is not allowed to configure the UE with the second serving cell in a first cell group without configuration of reporting two PHRs for one serving cell.

In one embodiment, based on or in response to there is simultaneous UL transmission on the second serving cell, the network node is not allowed to configure the UE with the second serving cell in a first cell group without configuration of reporting two PHRs for one serving cell, and/or the network node shall configure the UE to report two PHRs (at least) for the second serving cell.

Referring back to FIGS. 3 and 4, in one exemplary embodiment of a network node in a wireless communication system, the device 300 includes a program code 312 stored in the memory 310. The CPU 308 may execute program code 312 to enable the network node (i) to receive an information of capability from a UE, wherein the information of capability indicates the UE supports concurrent UL transmission, and (ii) to configure the UE with concurrent UL transmission on a second serving cell, and wherein the second serving cell is configured in a second cell group with configuration of reporting two PHRs for one serving cell. Furthermore, the CPU 308 can execute the program code 312 to perform one, some and/or all of the above-described actions and steps and/or others described herein.

FIG. 24 is a flow chart 2400 according to one exemplary embodiment from the perspective of a UE in a wireless communication system. The UE is configured, by a network node, to report one PHR for one serving cell (e.g., report only one PHR for one serving cell). In step 2405, the UE triggers a first PHR. In some examples, the UE triggers the first PHR for the second serving cell. In some examples, the UE triggers the first PHR in response to a pathloss change (associated with the first PHR, for example) exceeding a threshold. In step 2410, the UE receives one or more uplink grants indicative of a first PUSCH and a second PUSCH on the second serving cell, wherein the first PUSCH at least partially overlaps with the second PUSCH in time domain. In some examples, the one or more uplink grants may be indicative of transmission of the first PUSCH and the second PUSCH on the second serving cell. In an example, the one or more uplink grants may be indicative of one or more resources to use for transmitting the first PUSCH and the second PUSCH on the second serving cell. In step 2415, the UE selects the first PUSCH, from among the first PUSCH and the second PUSCH, based on one or more first characteristics of the first PUSCH and/or one or more second characteristics of the second PUSCH. For example, the first PUSCH may be selected (based on the one or more first characteristics and/or the one or more second characteristics) for use in determining the first PHR associated with the second serving cell. In step 2420, the UE determines the first PHR for the second serving cell based on the first PUSCH. For example, the UE may determine the first PHR based on the first PUSCH (e.g., based on a transmit power of the first PUSCH) in response to selecting the first PUSCH (e.g., in response to selecting the first PUSCH for use in determining the first PHR associated with the second serving cell). In step 2425, the UE transmits a PHR MAC CE to the network node. The PHR MAC CE comprises the first PHR (and/or one or more other PHRs and/or other information in addition to the first PHR, for example).

In one embodiment, the UE does not support (e.g., does not have capability for) reporting two PHRs for one serving cell. For example, the UE may support reporting only one PHR for one serving cell.

In one embodiment, the first PUSCH and the second PUSCH each have the same starting symbol. For example, a starting symbol of the first PUSCH is the same as a starting symbol of the second PUSCH (e.g., both the first PUSCH and the second PUSCH start at the same symbol).

In one embodiment, the first PUSCH is scheduled via a first beam and/or a first TCI state, and the second PUSCH is scheduled via a second beam and/or a second TCI state. The first beam is different than the second beam, and/or the first TCI state is different than the second TCI state.

In one embodiment, the first PUSCH is associated with a first UE panel, and the second PUSCH is associated with a second UE panel (e.g., a UL panel) different than the first UE panel.

In one embodiment, transmitting the PHR MAC CE is performed on a first serving cell (e.g., the PHR MAC CE is transmitted on the first serving cell different than the second serving cell).

In one embodiment, transmitting the PHR MAC CE is performed in a first slot, the first PUSCH at least partially overlaps with the first slot (in time domain, for example), and the second PUSCH at least partially overlaps with the first slot (in time domain, for example). For example, the first PUSCH may be scheduled (and/or configured) (by the one or more uplink grants, for example) to at least partially overlap with the first slot. Alternatively and/or additionally, the second PUSCH may be scheduled (and/or configured) (by the one or more uplink grants, for example) to at least partially overlap with the first slot.

In one embodiment, the UE receives one or more second uplink grants indicative of a third PUSCH and a fourth PUSCH on a third serving cell. The third PUSCH and the fourth PUSCH are separated in time domain (e.g., the third PUSCH does not overlap with the fourth PUSCH in time domain). the UE selects the third PUSCH from among the third PUSCH and the fourth PUSCH. For example, the UE may select the third PUSCH for use in determining a second PHR associated with the third serving cell. The UE determines the second PHR for the third serving cell based on the third PUSCH (e.g., in response to selecting the third PUSCH).

In one embodiment, the third PUSCH at least partially overlaps with the first slot (in time domain, for example), the fourth PUSCH at least partially overlaps with the first slot (in time domain, for example), and the third PUSCH is selected from among the third PUSCH and the fourth PUSCH based on the third PUSCH being earlier than the fourth PUSCH (e.g., a starting symbol of the third PUSCH is before a starting symbol of the fourth PUSCH).

In one embodiment, the third PUSCH is selected from among the third PUSCH and the fourth PUSCH based on the third PUSCH at least partially overlapping with the first slot (and/or based on the fourth PUSCH not overlapping with the first slot).

In one embodiment, the one or more first characteristics comprise a first CORESET pool index of a first CORESET for a first DCI scheduling the first PUSCH.

In one embodiment, the one or more second characteristics comprise a second CORESET pool index of a second CORESET for a second DCI scheduling the second PUSCH.

In one embodiment, the first PUSCH is selected from among the first PUSCH and the second PUSCH based on the first CORESET pool index (associated with the first PUSCH, for example) being lower than the second CORESET pool index (associated with the second PUSCH, for example).

In one embodiment, the first PUSCH is selected from among the first PUSCH and the second PUSCH based on the first CORESET pool index (associated with the first PUSCH, for example) being equal to 0.

In one embodiment, the one or more first characteristics comprise a first TRP-related index associated with the first PUSCH.

In one embodiment, the one or more second characteristics comprise a second TRP-related index associated with the second PUSCH.

In one embodiment, the first PUSCH is selected from among the first PUSCH and the second PUSCH based on the first TRP-related index being lower than the second TRP-related index.

In one embodiment, the one or more first characteristics comprise a first SRS resource set index associated with the first PUSCH.

In one embodiment, the one or more second characteristics comprise a second SRS resource set index associated with the second PUSCH.

In one embodiment, the first PUSCH is selected from among the first PUSCH and the second PUSCH based on the first SRS resource set index being lower than the second SRS resource set index.

In one embodiment, the one or more first characteristics comprise a first serving cell PCI associated with a first TCI state associated with the first PUSCH. The first TCI state may correspond to a UL/joint TCI state (e.g., a UL TCI state for UL and/or a joint TCI state for UL and/or DL) for the first PUSCH).

In one embodiment, the one or more second characteristics comprise a second serving cell PCI associated with a second TCI state associated with the second PUSCH (e.g., the second TCI state may correspond to a UL/joint TCI state for the second PUSCH).

In one embodiment, the first PUSCH is selected from among the first PUSCH and the second PUSCH based on the first serving cell PCI being associated with a serving cell and/or the second serving cell PCI being associated with a non-serving cell.

In one embodiment, the UE receives a beam indication DCI associated with activating the first TCI state associated with the first PUSCH and/or the second TCI state associated with the second PUSCH. For example, the beam indication DCI may indicate (and/or instruct) activating the first TCI state and/or the second TCI state. In some examples, the beam indication DCI may indicate (and/or instruct) activating 1-st UL/joint TCI state and/or 2-nd UL/joint TCI state.

In one embodiment, the first PUSCH is selected from among the first PUSCH and the second PUSCH based on the first TCI state corresponding to a defined (e.g., predefined) TCI state (e.g., based on a determination that the first TCI state corresponds to the defined TCI state. For example, the defined TCI state may be 1-st UL/joint TCI state. In some examples, whether the first TCI state corresponds to the defined TCI state (e.g., 1-st UL/joint TCI state) may be based on the beam indication DCI and/or a code-point associated with the first TCI state.

In one embodiment, a second MAC CE is indicative of the first TCI state and the second TCI state.

In one embodiment, the second MAC CE is used to associate a TCI state field in the beam indication DCI to one or more TCI states. For example, the second MAC CE may indicate that the first TCI state is associated with at least a first portion of data indicated by the TCI state field, and/or that the second TCI state is associated with at least a second portion of data indicated by the TCI state field.

In one embodiment, the first TCI state associated with the first PUSCH is in one first octet of the second MAC CE (e.g., the one first octet of the second MAC CE is indicative of the first TCI state).

In one embodiment, the second TCI state associated with the second PUSCH is in one second octet of the second MAC CE (e.g., the one second octet of the second MAC CE is indicative of the second TCI state).

In one embodiment, an identifier (e.g., an octet ID) of the one first octet is lower than an identifier (e.g., an octet ID) of the one second octet.

In one embodiment, the first PUSCH is selected from among the first PUSCH and the second PUSCH based on the identifier (e.g., the octet ID) of the one first octet (which indicates the first TCI state, for example) being lower than the identifier (e.g., the octet ID) of the one second octet (which indicates the second TCI state, for example).

Referring back to FIGS. 3 and 4, in one exemplary embodiment of a UE in a wireless communication system, the device 300 includes a program code 312 stored in the memory 310. The CPU 308 may execute program code 312 to enable the UE (i) to trigger a first PHR, (ii) to receive one or more uplink grants indicative of a first PUSCH and a second PUSCH on a second serving cell, wherein the first PUSCH at least partially overlaps with the second PUSCH in time domain, (iii) to select the first PUSCH, from among the first PUSCH and the second PUSCH, based on one or more first characteristics of the first PUSCH and/or one or more second characteristics of the second PUSCH, (iv) to determine the first PHR for the second serving cell based on the first PUSCH and (v) to transmit a PHR MAC CE, comprising the first PHR, to a network node that configured the UE to report one PHR for one serving cell. Furthermore, the CPU 308 can execute the program code 312 to perform one, some and/or all of the above-described actions and steps and/or others described herein.

FIG. 25 is a flow chart 2500 according to one exemplary embodiment from the perspective of a network node in a wireless communication system. In step 2505, the network node receives a capability information (e.g., information of capability) from a UE, wherein the capability information indicates the UE supports concurrent UL transmission. In some examples, the capability information may be indicative of other information (e.g., one or more features and/or parameters supported by the UE, one or more capability characteristics of the UE, etc.) in addition to the UE supporting concurrent UL transmission. In step 2510, the network node configures the UE with a first concurrent (e.g., simultaneous) UL transmission on a first serving cell, wherein the first serving cell is configured in a second cell group, and the second cell group has a configuration for reporting multiple PHRs for one serving cell (e.g., two PHRs for one serving cell), such as a configuration for reporting multiple PHRs for one serving cell in at least one of a single message (e.g., a single PHR MAC CE), a single slot, a single transmission, within a threshold duration of time, etc. In some examples, the first concurrent UL transmission may comprise UL transmissions performed using different UE panels concurrently, and/or may be scheduled by the network node. Alternatively and/or additionally, the network node may provide the UE with one or more parameters and/or configurations for the UE to use to perform the first concurrent UL transmission.

In one embodiment, the network node is not allowed to configure the UE with the first serving cell in a cell group that does not have a configuration for reporting multiple PHRs (e.g., two PHRs) for one serving cell. For example, the network node may not be configured to configure the UE with the first serving cell in a cell group that does not have a configuration for reporting multiple (e.g., two) PHRs and/or the network node may be prohibited and/or restricted from configuring the UE with the first serving cell in a cell group that does not have a configuration for reporting multiple (e.g., two) PHRs. Alternatively and/or additionally, a flag may be activated. The flag may be associated with a state in which the network node is blocked from configuring the UE with the first serving cell in a cell group that does not have a configuration for reporting multiple PHRs (e.g., two PHRs) for one serving cell. The network node may activate the flag based on (e.g., in response to) the UE being configured with the first concurrent UL transmission on the first serving cell. In some examples, when the flag is activated, the network does not configure (and/or knows not to configure) the UE with the first serving cell in a cell group that does not have a configuration for reporting multiple (e.g., two) PHRs.

In one embodiment, based on the UE being configured with the first concurrent UL transmission on the first serving cell, the network node does not configure the UE with the first serving cell in a cell group that does not have a configuration for reporting multiple (e.g., two) PHRs for one serving cell.

In one embodiment, based on (e.g., in response to) the UE being configured with the first concurrent UL transmission on the first serving cell (and/or based on, such as in response to, the first concurrent UL transmission being scheduled on the first serving cell and/or the first concurrent UL transmission being performed on the first serving cell), the network node is not allowed to configure (e.g., is not configured to configure and/or is prohibited and/or restricted from configuring) the UE with the first serving cell in a cell group that does not have a configuration for reporting multiple (e.g., two) PHRs for one serving cell.

In one embodiment, the first serving cell is configured in the second cell group that has the configuration for reporting multiple (e.g., two) PHRs for one serving cell based on (e.g., in response to) the UE supporting concurrent UL transmission. For example, the network node may configure the first serving cell in the second cell group that has the configuration for reporting multiple (e.g., two) PHRs for one serving cell based on (e.g., in response to) the UE supporting concurrent UL transmission.

In one embodiment, regardless of whether or not the UE supports reporting multiple (e.g., two) PHRs for one serving cell (and/or regardless of whether or not the UE reports support for reporting multiple PHRs for one serving cell), the network node is not allowed to configure (e.g., is not configured to configure and/or is prohibited and/or restricted from configuring) the UE with the first serving cell in a cell group that does not have a configuration for reporting multiple (e.g., two) PHRs for one serving cell (based on the UE being configured with the first concurrent UL transmission on the first serving cell, for example).

Referring back to FIGS. 3 and 4, in one exemplary embodiment of a network node in a wireless communication system, the device 300 includes a program code 312 stored in the memory 310. The CPU 308 may execute program code 312 to enable the network node (i) to receive a capability information from a UE, wherein the capability information indicates the UE supports concurrent UL transmission, and (ii) to configure the UE with a first concurrent UL transmission on a first serving cell, wherein the first serving cell is configured in a second cell group, and the second cell group has a configuration for reporting multiple (e.g., two) PHRs for one serving cell. Furthermore, the CPU 308 can execute the program code 312 to perform one, some and/or all of the above-described actions and steps and/or others described herein.

FIG. 26 is a flow chart 2600 according to one exemplary embodiment from the perspective of UE in a wireless communication system. In step 2605, the UE transmits a capability information to a network node, wherein the capability information indicates the UE supports concurrent (e.g., simultaneous) UL transmission. In step 2610, the UE receives (from the network node, for example) a configuration for a first concurrent UL transmission on a first serving cell (e.g., the configuration may comprise one or more parameters and/or configurations for the UE to use to perform the first concurrent UL transmission). In some examples, the first concurrent UL transmission may comprise UL transmissions performed using different UE panels concurrently, and/or may be scheduled by the network node. The first serving cell is configured in a second cell group, and the second cell group has a configuration for reporting multiple (e.g., two) PHRs for one serving cell, such as a configuration for reporting multiple PHRs for one serving cell in at least one of a single message (e.g., a single PHR MAC CE), a single slot, a single transmission, within a threshold duration of time, etc.

In one embodiment, the UE does not expect that the first serving cell is configured in a cell group that does not have a configuration for reporting multiple PHRs for one serving cell. For example, the UE may not monitor for a configuration that configures the UE with a serving cell in a cell group that does not have a configuration for reporting multiple PHRs for one serving cell. In an example, the UE does not expect that the first serving cell is configured in a cell group that does not have a configuration for reporting multiple PHRs for one serving cell based on the UE being configured with the first concurrent UL transmission on the first serving cell.

In one embodiment, the UE transmits a second capability information to the network node, wherein the second capability information indicates the UE supports reporting multiple (e.g., two) PHRs for one serving cell. In one embodiment, when UE transmits the capability information indicating the UE supports concurrent uplink (UL) transmission, the second capability information is transmitted and indicates the UE supports reporting multiple (e.g., two) PHRs for one serving cell.

In one embodiment, when the UE transmits the capability information (indicating support for concurrent UL transmission, for example) to the network node, the capability information indicates concurrent support for both concurrent (e.g., simultaneous) UL transmission and reporting multiple PHRs for one serving cell (and/or concurrently indicates support for both concurrent UL transmission and reporting multiple PHRs for one serving cell). For example, the UE may support concurrent (e.g., simultaneous) UL transmission while supporting reporting multiple PHRs.

In one embodiment, when the UE transmits the capability information (indicating support for concurrent UL transmission, for example) to the network node, regardless of whether or not the capability information indicates the UE supports reporting multiple PHRs for one serving cell, the UE does not expect that the first serving cell is configured in a cell group that does not have a configuration for reporting multiple PHRs for one serving cell (based on the UE being configured with the first concurrent UL transmission on the first serving cell, for example). For example, the UE may not monitor for a configuration that configures the UE with a serving cell in a cell group that does not have a configuration for reporting multiple PHRs for one serving cell.

Referring back to FIGS. 3 and 4, in one exemplary embodiment of a UE in a wireless communication system, the device 300 includes a program code 312 stored in the memory 310. The CPU 308 may execute program code 312 to enable the UE (i) to transmit a capability information to a network node, wherein the capability information indicates the UE supports concurrent UL transmission, and (ii) to receive a configuration for a first concurrent UL transmission on a first serving cell, wherein the first serving cell is configured in a second cell group, and the second cell group has a configuration for reporting multiple (e.g., two) PHRs for one serving cell. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 21-26. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 21-26, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling the UE and/or the network node to have an aligned understanding of a reported PHR, a TRP associated with the reported PHR, and/or a PUSCH used to determine the reported PHR. For example, the UE and/or the network node determining incorrect information (e.g., the network node determining that the reported PHR is based on PUSCH2 when it is actually based on PUSCH1) may lead to (incorrect) actions being performed by the UE and/or the network node based upon the incorrect information, which may lead to delays, errors and/or service interruptions. However, using the techniques provided herein, the UE and the network node may (both) correctly determine the reported PHR, the TRP associated with the reported PHR, and/or the PUSCH used to determine the reported PHR.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method for a User Equipment (UE), the method comprising:
   triggering a first Power Headroom Report (PHR);
   receiving one or more uplink grants indicative of a first Physical Uplink Shared Channel (PUSCH) and a second PUSCH on a first serving cell, wherein the first PUSCH at least partially overlaps with the second PUSCH in time domain with the same starting symbol;
   selecting the first PUSCH for determining the first PHR for the first serving cell, from among the first PUSCH and the second PUSCH, based on at least one of one or more first characteristics of the first PUSCH or one or more second characteristics of the second PUSCH; and
   transmitting a PHR Medium Access Control (MAC) Control Element (CE) comprising the first PHR.

2. The method of claim 1, wherein:
   the UE does not support reporting two PHRs for one serving cell.

3. The method of claim 1, wherein:
   the first PUSCH is scheduled via at least one of a first beam or a first Transmission Configuration Indicator (TCI) state;
   the second PUSCH is scheduled via at least one of a second beam or a second TCI state; and
   at least one of the first beam is different than the second beam or the first TCI state is different than the second TCI state.

4. The method of claim 1, wherein:
   the first PUSCH is associated with a first UE panel; and
   the second PUSCH is associated with a second UE panel different than the first UE panel.

5. The method of claim 1, wherein:
   transmitting the PHR MAC CE is performed on a second first serving cell.

6. The method of claim 1, wherein:
   transmitting the PHR MAC CE is performed in a first slot;
   the first PUSCH at least partially overlaps with the first slot; and the second PUSCH at least partially overlaps with the first slot.

7. The method of claim 6, comprising:
   receiving one or more second uplink grants indicative of a third PUSCH and a fourth PUSCH on a third serving cell, wherein the third PUSCH and the fourth PUSCH are separated in time domain;
   selecting the third PUSCH from among the third PUSCH and the fourth PUSCH; and
   determining a second PHR for the third serving cell based on the third PUSCH,
   wherein at least one of:
      the third PUSCH at least partially overlaps with the first slot, the fourth PUSCH at least partially overlaps with the first slot, and the third PUSCH is selected from among the third PUSCH and the fourth PUSCH based on the third PUSCH being earlier than the fourth PUSCH; or
      the third PUSCH is selected from among the third PUSCH and the fourth PUSCH based on the third PUSCH at least partially overlapping with the first slot.

8. The method of claim 1, wherein at least one of:
   the one or more first characteristics comprise a first Control Resource Set (CORESET) pool index of a first CORESET for a first Downlink Control Information (DCI) scheduling the first PUSCH;
   the one or more second characteristics comprise a second CORESET pool index of a second CORESET for a second DCI scheduling the second PUSCH;
   the one or more first characteristics comprise a first Transmission/Reception Point (TRP)-related index associated with the first PUSCH;
   the one or more second characteristics comprise a second TRP-related index associated with the second PUSCH;
   the first PUSCH is selected from among the first PUSCH and the second PUSCH based on the first TRP-related index being lower than the second TRP-related index;
   the one or more first characteristics comprise a first Sounding Reference Signal (SRS) resource set index associated with the first PUSCH;
   the one or more second characteristics comprise a second SRS resource set index associated with the second PUSCH;
   the first PUSCH is selected from among the first PUSCH and the second PUSCH based on the first SRS resource set index being lower than the second SRS resource set index;
   the one or more first characteristics comprise a first serving cell Physical Cell Identity (PCI) associated with a first Transmission Configuration Indicator (TCI) state associated with the first PUSCH;
   the one or more second characteristics comprise a second serving cell PCI associated with a second TCI state associated with the second PUSCH;
   the first PUSCH is selected from among the first PUSCH and the second PUSCH based on the first TCI state corresponding to a defined TCI state; or
   the method comprises receiving a beam indication DCI associated with activating at least one of the first TCI state associated with the first PUSCH or the second TCI state associated with the second PUSCH.

9. The method of claim 8, wherein:

a second MAC CE is indicative of the first TCI state and the second TCI state; and at least one of:

the second MAC CE is used to associate a TCI state field in the beam indication DCI to one or more TCI states;

the first TCI state associated with the first PUSCH is indicated via one first octet of the second MAC CE;

the second TCI state associated with the second PUSCH is indicated via one second octet of the second MAC CE; or an identifier of the one first octet is lower than an identifier of the one second octet.

10. A method for a network node, the method comprising:

receiving a capability information from a User Equipment (UE), wherein the capability information indicates the UE supports concurrent uplink (UL) transmission; and configuring the UE with a first concurrent UL transmission on a first serving cell, wherein:

the first serving cell is configured in a second cell group;

the second cell group has a configuration for reporting multiple Power Headroom Reports (PHRs) for one serving cell; and the network node is not allowed to configure the UE with the first serving cell in a cell group that does not have a configuration for reporting multiple PHRs for one serving cell.

11. The method of claim 10, comprising:

based on the UE being configured with the first concurrent UL transmission on the first serving cell, not configuring the UE with the first serving cell in a cell group that does not have a configuration for reporting multiple PHRs for one serving cell.

12. The method of claim 10, wherein:

based on the UE being configured with the first concurrent UL transmission on the first serving cell, the network node is not allowed to configure the UE with the first serving cell in a cell group that does not have a configuration for reporting multiple PHRs for one serving cell.

13. The method of claim 10, wherein at least one of:

the first serving cell is configured in the second cell group that has the configuration for reporting multiple PHRs for one serving cell based on the UE supporting concurrent UL transmission; or regardless of whether or not the UE supports reporting multiple PHRs for one serving cell, the network node is not allowed to configure the UE with the first serving cell in a cell group that does not have a configuration for reporting multiple PHRs for one serving cell.

14. A method for a User Equipment (UE), the method comprising:

triggering a first Power Headroom Report (PHR);

receiving a Medium Access Control (MAC) Control Element (CE) indicating association between a code-point of a TCI state field in a Downlink Control Information (DCI) to one or more Transmission Configuration Indicator (TCI) states comprising a first TCI state and a second TCI state, wherein:

the first TCI state is indicated via one first octet of the MAC CE;

the second TCI state is indicated via one second octet of the MAC CE; and an identifier of the one first octet is lower than an identifier of the one second octet;

receiving a beam indication DCI scheduling downlink assignment and indicating the code-point;

receiving one or more uplink grants indicative of a first Physical Uplink Shared Channel (PUSCH) and a second PUSCH on a first serving cell, wherein the first PUSCH at least partially overlaps with the second PUSCH in time domain with the same starting symbol, and the first PUSCH is associated with the first TCI state and the second PUSCH is associated with the second TCI state;

based upon the UE not being configured to report two PHRs, selecting the first PUSCH for determining the first PHR for the first serving cell, from among the first PUSCH and the second PUSCH, based on the first TCI state corresponding to a TCI state, associated with the code-point, that is in octet with lower identifier; and transmitting a PHR Medium Access Control (MAC) Control Element (CE) comprising the first PHR.

15. The method of claim 14, wherein:

the UE does not support reporting two PHRs for one serving cell.

16. The method of claim 14, wherein:

the first PUSCH is associated with a first UE panel; and the second PUSCH is associated with a second UE panel different than the first UE panel.

17. The method of claim 14, wherein:

transmitting the PHR MAC CE is performed on a second serving cell.

18. The method of claim 14, wherein:

transmitting the PHR MAC CE is performed in a first slot;

the first PUSCH at least partially overlaps with the first slot; and the second PUSCH at least partially overlaps with the first slot.

19. The method of claim 18, comprising:

receiving one or more second uplink grants indicative of a third PUSCH and a fourth PUSCH on a third serving cell, wherein the third PUSCH and the fourth PUSCH are separated in time domain; and selecting the third PUSCH from among the third PUSCH and the fourth PUSCH.

20. The method of claim 19, comprising:

determining a second PHR for the third serving cell based on the third PUSCH, wherein at least one of:

the third PUSCH at least partially overlaps with the first slot, the fourth PUSCH at least partially overlaps with the first slot, and the third PUSCH is selected from among the third PUSCH and the fourth PUSCH based on the third PUSCH being earlier than the fourth PUSCH; or the third PUSCH is selected from among the third PUSCH and the fourth PUSCH based on the third PUSCH at least partially overlapping with the first slot.

* * * * *